United States Patent [19]

Tanaka et al.

[11] Patent Number: 5,684,994
[45] Date of Patent: Nov. 4, 1997

[54] RESOURCE ASSIGNMENT APPARATUS

[75] Inventors: Akira Tanaka, Kyoto; Junko Irimajiri, Hirakata; Nobuki Tominaga, Kyoto, all of Japan

[73] Assignee: Matsushita Electric Industrial Co., Osaka-fu, Japan

[21] Appl. No.: 325,998

[22] Filed: Oct. 19, 1994

[30] Foreign Application Priority Data

Oct. 20, 1993 [JP] Japan .................... 5-262814

[51] Int. Cl.⁶ .................................................. G06F 9/40
[52] U.S. Cl. ............................. 395/705; 395/674
[58] Field of Search .......................... 395/650, 700, 395/800, 705, 674

[56] References Cited

U.S. PATENT DOCUMENTS

| | | | |
|---|---|---|---|
| 4,885,684 | 12/1989 | Austin et al. | 395/706 |
| 4,961,141 | 10/1990 | Hopkins et al. | 395/706 |
| 5,179,702 | 1/1993 | Spix et al. | 395/650 |
| 5,226,164 | 7/1993 | Nadas et al. | 395/800 |
| 5,274,811 | 12/1993 | Borg et al. | 395/700 |
| 5,280,593 | 1/1994 | Bullions, IV et al. | 395/375 |
| 5,367,696 | 11/1994 | Abe | 395/800 |
| 5,497,499 | 3/1996 | Garg et al. | 395/800 |

FOREIGN PATENT DOCUMENTS 373361  6/1990  European Pat. Off. ............... 395/705

OTHER PUBLICATIONS

"Register Allocation & Spilling Via Graph Coloring," G.J. Chaitin, Proceeding of the ACM Symposium on Compiler Construction, Jun. 1992, pp. 98–105.

"Spill Code Minimization Techniques for Optimizing Compilers," Bernstein et al., SIGPLAN 1989, IBM Israel Science & Technology Technicon City Haifa, Israel.

"Programming Gengo Shorikei," Register Assignment, pp. 420–423, Iwanami Books.

"The Priority-Based Coloring Approach to Register Allocation", by F. Chow et a., 10872 ACM Transactions on Programming languages and Systems, 12(1990) Oct., No. 4.

"Design Considerations for IBM Personal Computer Professional FORTRAN, an Optimizing Compiler", by M.L. Roberts et al., 8204 IBM Systems Journal, 24(1985) No. 1.

"Register Allocation Via Coloring", by Chaitin et al., 10871 Computer Languages 6(1981).

*Primary Examiner*—Alvin E. Oberley
*Assistant Examiner*—Alice Y. Park
*Attorney, Agent, or Firm*—Price, Gess & Ubell

[57] ABSTRACT

A resource assignment apparatus for use with a software compiler or translator for compiling or translating a high-level source program into a machine language program, wherein the resource assignment apparatus assigns the variables in the high-level source program to system resources consisting of registers, memory, and the like. The resource assignment apparatus generates assignments consisting of the variables and their live ranges and finds the interference cost incurred when assigning these various assignments to each of the various resources, consisting of data registers, address registers, memory, and the like. The apparatus sorts the assignments into groups whereby these interference costs will be the lowest. The resource element minority assignment unit then carries out the assigning of each of these groups of sorted assignment. The various assignments with live ranges which interfere are assigned to different resource elements. When there are a number of resource elements to which an assignment can be assigned, the apparatus determines which is the most appropriate resource element, and assigns the assignment to this most appropriate resource element. When there is no resource element for which assigning is possible, the assignment is then moved to another resource group.

58 Claims, 28 Drawing Sheets

FIG. IA

```
        a = b ;
   if ( b >= 10)  goto LBL1
        c = 20 + a
        d = a — b
        goto LBL2
LBL1 :  c = e — a
        d = a — e LBL2 :  b = c ;
        e = b — d ;
```

②    if(b>=10) GOTO LBL1

③        c=20+a;

④        d=a−b;

LBL1:    GOTO LBL2

⑤        c=e−a;

⑥        d=a−e;

LBL2:

| ASSIGNMENT | a | b2 | c | d | e1 | e2 | b1 |
|---|---|---|---|---|---|---|---|
| REGISTER | R0 | R2 | R2 | R1 | R1 | R0 | Mem |

FIGURE 3C

```
            mov    R0,mem   ⎫ ①
    x11
       ╲mov    R2,mem   ⎫
         cmp    R2,#10   ⎬ ②
         jge    LBL1     ⎭
    x12
       ╲mov    R2,R0    ⎫ ③
         add    R2,#20   ⎭ mov    R1,R0    ⎫
         mov    R0,mem   ⎪
         sub    R1,R0    ⎬ ④
         jmp    LBL2     ⎭
LBL1:
       ╱mov    R2,R1    ⎫ ⑤
    x13  sub    R2,R0    ⎭ sub    R0,R1    ⎫ ⑥
         mov    R1,R0    ⎭
LBL2:
        (mov    R2,R2)   ⎬ ⑦ x14╲mov    R0,R2    ⎫
    x15╲sub    R0,R1    ⎬ ⑧
         mov    R1,R0    ⎭
```

BASIC BLOCK 1
```
a=*s+100;
b=*q-100;
c=*r+200;
f1(c);
d=c/b;
```

BASIC BLOCK 2
```
if(a!=d)GOTO LBL1
f2(b,*r);
```

BASIC BLOCK 3
```
LBL1:
e=b-*r;
f=e+10;
g=f*15;
Ret=g;
```

FIGURE 9 o21
o22  mov Mem. *
o23  mov D0. *
     mov A0. *
o24
     add Mem. *
     add D0. *
     add A0. * sub Mem. *
     sub D0. *
     sub A0. * cmp Mem. *
     cmp D0. *
     cmp A0. * mul Mem. *
     mul D0. *
     mul A0. * div Mem. *
     div A0. *

| C(x,AR, SUBSTITUTION) =1 | C(x,DR, SUBSTITUTION) =1 | C(x,Mem, SUBSTITUTION) =3 |
|---|---|---|
| C(x,AR,ADDITION) =1 | C(x,DR,ADDITION) =1 | C(x,Mem,ADDITION) =3 |
| C(x,AR, SUBTRACTION) =1 | C(x,DR, SUBTRACTION) =1 | C(x,Mem, SUBTRACTION) =3 |
| C(x,AR, COMPARISON) =1 | C(x,DR, COMPARISON) =1 | C(x,Mem, COMPARISON) =3 |
| C(x,AR, MULTIPLICATION) =2 | C(x,DR, MULTIPLICATION) =1 | C(x,Mem, MULTIPLICATION) =3 |
| C(x,AR,DIVISION) =2 | C(x,DR,DIVISION) =1 | C(x,Mem,DIVISION) =3 |
| C(x,AR,INDIRECT REFERENCE) =1 | C(x,DR,INDIRECT REFERENCE) =2 | C(x,Mem,INDIRECT REFERENCE) =3 |
| C(x,AR,FUNCTION CALL) =1 | C(x,DR,FUNCTION CALL) =1 | C(x,Mem,FUNCTION CALL) =3 |

Ov (g) = { }   Ov (Ret) = { }

R1 (f) = {e, g}   R1 (g) = {f, Ret}

R1 (Ret) = {g}

FIGURE 12
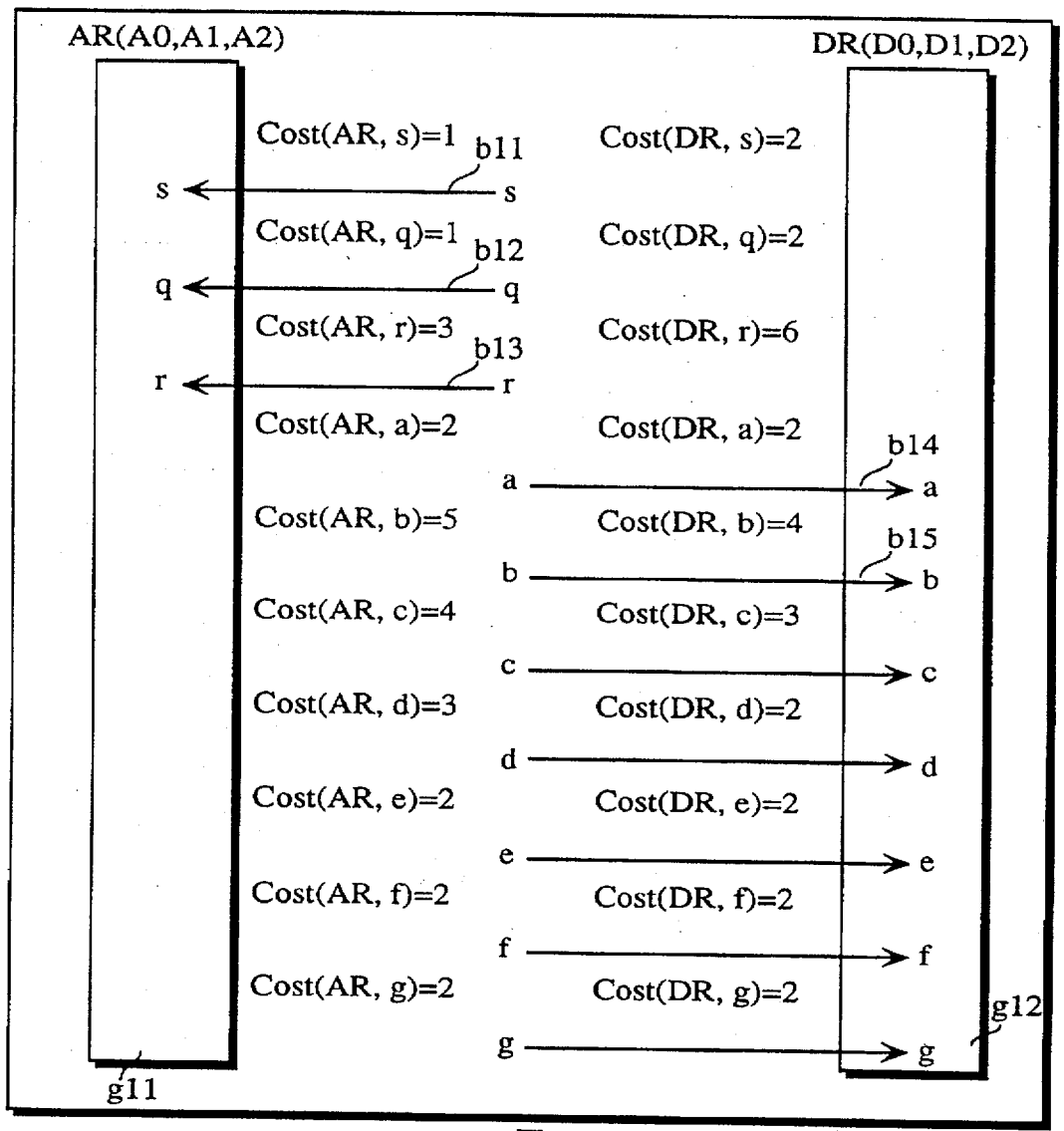
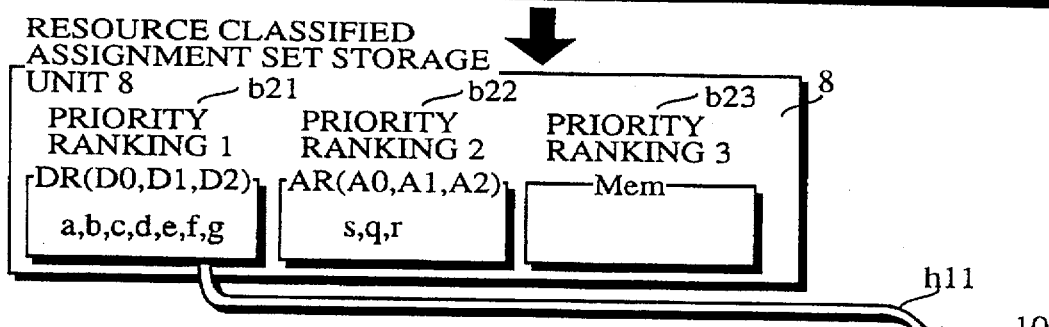
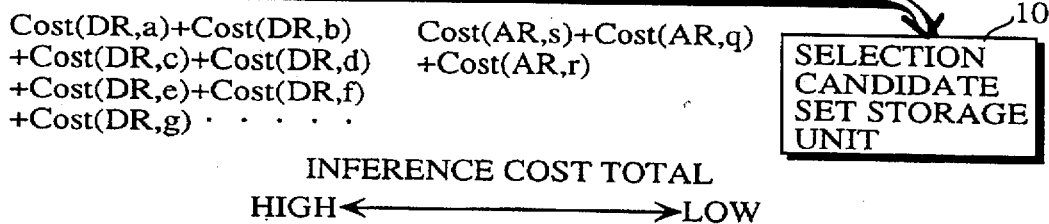

FIGURE 22

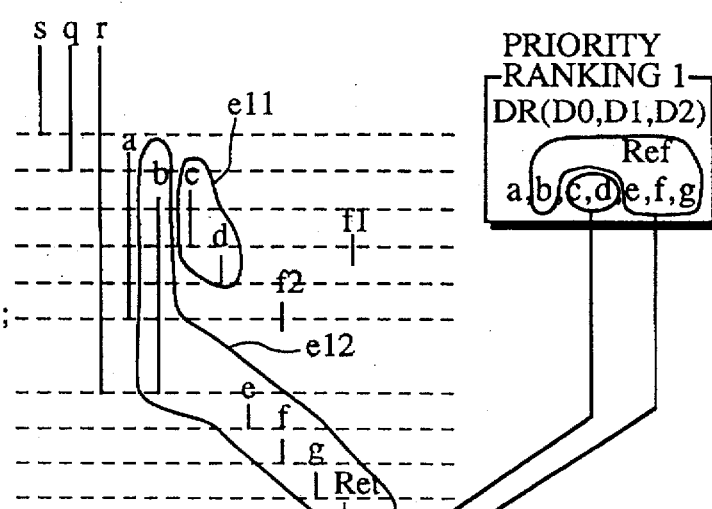

```
a=*s+100;
b=*q-100;
c=*r+200;
f1(c);
d=c/b;
if(a1=d)f2(b,*r);

c=b-*r;
f=c+10;
g=f*15;
Ret=g;
```

| D0 | D1 | D2 |
|---|---|---|
| 0 | 0 | 0 |

GLOBAL PROFIT VALUE TABLE FOR GLOBAL GROUP G1 c,d

GLOBAL GROUP G1

| D0 | D1 | D2 |
|---|---|---|
| 1.5 | 0 | 0 |

GLOBAL LOSS VALUE TABLE FOR GLOBAL GROUP G1

| D0 | D1 | D2 |
|---|---|---|
| 1 | 0 | 0 | b,e,f,g,Ret

GLOBAL GROUP G2

GLOBAL PROFIT VALUE TABLE FOR GLOBAL GROUP G2

| D0 | D1 | D2 |
|---|---|---|
| 0.7 | 0 | 0 |

GLOBAL LOSS VALUE TABLE FOR GLOBAL GROUP G2

| D0 | D1 | D2 |
|---|---|---|
| 0 | 0 | 0 | a

GLOBAL GROUP G3

GLOBAL PROFIT VALUE TABLE FOR GLOBAL GROUP G3

| D0 | D1 | D2 |
|---|---|---|
| 0.4 | 0 | 0 |

GLOBAL LOSS VALUE TABLE FOR GLOBAL GROUP G3

1

RESOURCE ASSIGNMENT APPARATUS

BACKGROUND OF THE INVENTION

1. Field of the Invention

The present invention relates to a resource assignment apparatus which assigns the variables in a program to resources such as registers and memory, to be used by a compiler when compiling a program written in a high-level language into machine language.

2. Description of the Related Art

In recent years, there have been many improvements in the efficiency of program development by writing programs in high-level programming languages, such as C language.

By using high-level programming languages, the programmer can express such processes as the storage, operation and transmission of numerical values as operations (steps) taking the variables as operands. Since these variables are defined voluntarily by the programmer, and comprise of the necessary number of figures, the operator can describe the program freely. When compiled, these described programs (known as source programs) become machine language programs which can be understood by the computer. Operations in such machine language programs are expressed as machine language instructions, and since these machine language instructions take the registers and memory as operands, it becomes necessary to assign the above variables to the registers and memory. This assigning process is known as the resource assignment process.

Before describing the resource assignment process under the prior art, several of the terms to be used will be explained.

Live Range

The live range, in its widest sense, refers to the range for which the stored value of the variables is valid, while in its narrowest sense, it refers to the range of the program from the step in which values are substituted into the variable to the step in which these substituted values are used.

FIGS. 1A and 1B show one example of a source program and the corresponding live ranges. The live ranges are shown by lines s1, s2, and s3 in FIG. 1B. The defining step and final using step mentioned above are known respectively as the starting point and the end point and are expressed in the drawing by the points p1, p2, p3, p4, p5 etc. In FIG. 1B, there are two starting points for each of the variables c and d, but this is because variables c, d are defined in terms of the two processes p1 and p2 in the decision statement if (b≧10) {process p1} else {process p2}.

Assignment

The assignment of resources can be simply the taking of a variable, but, since the assignment can be to several separate resource elements for each respective live range, when there are several live ranges for one variable, this specification takes an assignment as the combination of a variable and live range.

Priority Value

This is the parameter for deciding the order of resource assignment. The following aspects of the program for each assignment; activity ratios, the loop-nesting depth level of loop processes, live ranges, and combinations of them are reflected in the priority value.

An example of a priority value calculation based on the activity ratio of the assignment is given below as {numerical equation 1}.

{Numerical Equation 1}
priority value=activity ratio=(number of def+number of use)/length of live range.

[def] and [use] here refer respectively to the step whereby a value is substituted into the assignment, and to the step whereby this substituted value is used.

The loop-nesting depth level of a loop process may also be used in this calculation of priority value. Also, if there are other assignments whose live ranges interfere, then other assignment numbers may also be used in calculating assignment priority value.

Resource Element

This refers to the smallest unit among the elements in the computer hardware to which an assignment can be assigned. Buffers for temporarily storing a value, individual registers, memory elements of a single address in the memory are all examples of this. The number 0 register, the number 1 register, the memory at address 10 and the memory at address 101 are all different resource elements.

Resource

This refers to a group of resource elements which perform the same function.

For example, resources consist of memory and registers. Registers can be subdivided into address registers, data registers, global registers and local registers which all perform a given function. Additionally, memory can be subdivided in terms of fulfilling the functions of high-speed memory and low-speed memory. If it is possible to subdivide the resource elements in this way into groups which perform the same function, then each of these subdivisions becomes a resource.

Interference Graph

The interference graph is a graph to show pictorially the interference between the live ranges of two or more assignments. The interference graph has the assignments as its vertices, and shows the assignments (vertices) where the live ranges interfere as joined together as their edges.

Degree of Vertex

The number of edges joining one vertex in the interference graph.

FIG. 2 shows a construction of a compiler. This compiler is comprised of a syntax analysis apparatus 21, an optimizing apparatus 22, a resource assignment apparatus 23, and a code generation apparatus 24. The following is an explanation of the different components of this compiler with reference to the construction in FIG. 2, and to the tables FIGS. 3A, 3B and 3C.

The syntax analysis apparatus 21 executes the lexical analysis, the syntax analysis and the meaning analysis for the source program stored as a file in the storage apparatus (not shown in the figure), and converts the source program into an intermediate language program.

The optimizing apparatus 22 executes the optimizing of the intermediate language program with the object of minimizing the program size and the process execution time when finally generating the machine language program. Since the details of this optimizing are not the gist of this invention, they have been omitted, and only the aspects which are especially related to the resource assignment have been explained. The optimizing operation includes a basic block conversion operation, control flow analysis, and data flow analysis. Basic block conversion refers to the divided of the program to be processed into basic blocks.

This is a simplified explanation of this division process. First of all, the optimizing apparatus 22 refers to the first step in the intermediate language program, steps having a direction given by an either unconditional or a conditional jump, and steps coming directly after an unconditional or conditional jump and regards them as the leaders. Then the optimizing apparatus 22 extracts all of the program steps starting from the first leader and continues as far as the line coming before the next leader or the end of the program. The set of instructions obtained by this extraction process is known as a basic block, and becomes the unit of the following processes.

The control flow analysis analyzes the control flow within every basic block. The data flow analysis analyzes where each variable was substituted and where each variable was used within each separate block. By referring to the results of these analyses, the live ranges of the variables are obtained.

The resource assignment apparatus 23 is an algorithm for assigning resources, which assigns the registers and memory to the assignments in the intermediate language program by using a graph coloring method by means of graph degeneration. The graph coloring method by means of graph degeneration is an algorithm which executes the classification of every vertex in the interference graph with approximately the least number of colors, according to the principle where, in color classifying, every vertex which is joined to the edge is painted in a different color. The assignments in the program shown in FIG. 3A are assigned to the resource elements by the resource assignment process shown in FIG. 3B. In these drawings, the assignment a shown in FIG. 3A is shown as being assigned to resource element R0, while assignment b2 is shown as being assigned to resource element R2.

The code generation apparatus 24 executes the machine language instruction conversion for every step in the program in its intermediate language state shown in FIG. 3A, and converts this program in an intermediate language state into a machine language program (shown in FIG. 3C) that can be understood by the target machine. The machine code program which is the result of this conversion by the code generation apparatus 24 is called the object program. The machine language instructions in this object program and the corresponding instructions in the program of FIG. 3A are shown by the symbols (1), (2), (3), (4) etc.. In the above machine language instruction conversion, the resource assignment results shown in FIG. 3B are used as the machine language instruction operands. Also the transmission instructions in the drawing x11, x12, x13, x14, x15 etc. are generated by the code generation apparatus 24 so that the processing of every step in the program shown in FIG. 3A can be realized as machine language instructions. Also, depending on the results of the resource allocation, it can be that several of these transmission instructions become unnecessary. In FIG. 3C, since in (7) assignments b2 and c are both assigned to the same register, then this is an example of where transmission instruction generation becomes unnecessary.

The following is an explanation of the resource assignment apparatus 23. The details of the resource assignment process using the graph coloring method mention above are described by the following documents.

[1] A. V. Aho, R. Sethi, J. D. Ullman; "Compilers Principles, Techniques and Tools" Addison-Wesley, 1986

[2] Chaitin..; "Register allocation and spilling via graph coloring", proceeding of the ACM Symposium on Compiler Construction (June 1982), 98–105.

[3] Chaitin..; "Register allocation and spilling via graph coloring", U.S. Pat. No. 4,571,678, Feb. 18, 1986.

[4] Frederick Chow, John Hennessy; "Register Allocation by Priority-based Coloring", Computer Systems Laboratory, Stanford University.

[5] David Bernstein, . . . Ron Y. Pinter; "Spill code minimization techniques of optimizing compilers", SIGPLAN 1989, IBM Israel Science and Technology Technion City Haifa, Israel.

[6] Masataka Sasa; "Programming Gengo Shorikei", Register Assignment p420–p423, Iwanami Books.

The construction of the aforementioned resource assignment apparatus 23 is shown in FIG. 4. As shown in FIG. 4, the resource assignment apparatus 23 is comprised of an assignment generation unit 41 for generating the assignments in accordance with the process results of the optimizing apparatus 22, an assignment storage unit 42 for storing the assignments generated by the assignment generation unit 41, a priority value calculator 43 for calculating by means of the equation given above as {numerical equation 1}, and storing, the priority value of every assignment stored in the assignment storage unit 42, a live range information storage unit 44 for storing the information about the live ranges, as shown in FIG. 1B, for every assignment and the information as to how these live ranges interfere, a expansion unit 45 for expanding all of the assignments stored in the storage unit 42 in the interference graph, a buffer 46 for the expansion by the expansion unit 45, a stack 47 for piling up all the assignments once they have been expanded by the expansion unit 45, a control unit 40 for executing the resource assignment by means of the above method graph coloring method according to the graph degeneration, and a storage unit 48 for storing the assignment result in the form shown in FIG. 3B.

FIGS. 5A, 5B, and 6A through 6I are explanation tables for explaining the method graph coloring method according to the graph degeneration. The following is an explanation of the operational process of the resource assignment apparatus 23 with reference to these drawings. The number of registers for which assignment is possible is given as 3, with the assignments which cannot be assigned to these registers being assigned to the memory.

The aforementioned expansion unit 45 expresses the assignments shown in FIG. 3A and the interference between the live ranges between these assignments in the interference graph, as shown in FIG. 5A. In this kind of interference graph, the extent to which every assignment interferes with the live range of which other assignments is shown as the degree of vertex. Also, as is shown in FIG. 1B, when the starting point and end point of live ranges in one step are the same (assignments b2 and c in FIG. 1B), in order to regard them as one assignment, then the control unit 40 combines the corresponding vertices as shown in FIG. 5B, thus simplifying the interference graph. After accomplishing the simplification, then the modulation of the vertices is executed. The degree of vertex is referred to as being low for vertices with under 3 registers and as being high for vertices with 3 or more registers. This modulation of degree is used as the formation condition in the graph degeneration. The graph degeneration, as indicated by the arrows y11, y12, is carried out so that the vertices of low degree are removed in order of priority value as calculated in {numerical equation 1}, from lowest to highest priority value, with the assignment of the removed vertices being the piling up in the stack area in last in, first out order, with the result of the removal of e2 and d and the transformation of the interference graphs shown in FIGS. 5B and 6A being shown in FIG. 6B.

Since all the vertices in FIG. 6B are of high degree, the above formation condition is not satisfied. Therefore, from among these vertices, the assignment having the lowest priority value b1 is assigned to the memory and is removed, as shown by the arrow y13. By removing b1, the interference graph is transformed so as to equal the one shown in FIG. 6C, where once again, the above formation condition is satisfied. Graph degeneration is again repeated for the state shown in FIG. 6C, and all of the assignments are piled up in the stack, as shown in FIG. 6D. After this piling up process has been completed, then the resource assignment process is executed. First of all, as shown in FIG. 6E, assignment a is assigned to register R0. Next, as shown in FIGS. 6F and 6G, assignments e1 and b2c are assigned to registers R1 and R2. The following assignments e2 and d interfere with the live range of b2c, but, since they do not interfere with the live ranges of assignments a and e1, then e2 is assigned to the lowest number register R0 for which assignment is possible, as shown in FIG. 6H, while assignment d is assigned to register R1, as shown in FIG. 6I. By means of this kind of assignment process, sets of assignments whose live ranges interfere with each other can be assigned to different registers.

The above assignments a, b2, c, d, e1, e2, and b1 are all assigned to resource elements by the resource assignment process, but, for high-level languages such as C language, there are registers for which the combination with assignments is already decided. These are used to improve the efficiency of function call operations, and are known as argument registers, return value registers and broken registers.

Argument registers are registers for transferring arguments when there is a function call. Assignments used as arguments in the source program are assigned to these argument registers.

Return value registers are registers for returning the return value of the function call. Assignments used for returning the return value in the source program are allocated to these return value registers.

Broken registers are registers for assigning the assignments for which it is not necessary to save and restore the stored values at the start and end of the function call. The object of these broken registers is overhead reduction for the function call. When an above function call is executed, according to the process within the called function, there is the possibility that the content of every register will be changed, and that before or after the function call, it will be necessary to save and restore the content of the registers. However, since this saving and restoring function for every register will increase the overheads of the function call, then, by setting beforehand the broken registers for which saving and restoring are unnecessary, and assigning the assignments for which it is inconsequential whether the stored value is changed to the broken registers, the saving and restoring operations can be rationalized.

However, for resource assignment apparatuses constructed according to the prior art, there has been the problem that resource allocation can increase execution time and the memory size of the object program.

The root of this problem has been that the results of the assignment process have not correctly reflected the priority value of the assignments. In order that the number of def and use instructions and the loop-nesting depth level be properly reflected in the priority value, it is desirable to have high priority value assignments assigned to the registers. However, taking an assignment a of the lowest degree but of the highest priority value, and an assignment b of the highest degree but of the lowest priority value as a combined single vertex for the assignment ab, it can be seen by calculating the priority value according to (no. of def+no. of use)/length of live range for this combined vertex for assignment ab that the priority value will be of an intermediate value and the degree will be the highest, meaning that assignment ab can become an assignment which will be forcibly removed. By forcibly removing ab, then the assignment of the highest priority value a which should be assigned to the first register will end up being assigned to the memory. If a high priority value assignment is assigned to the memory, then the steps which use these assignments as operands will all be changed into machine language instructions which take the memory as operands. Operands used as machine language memory instructions are usually of low operational speed and take up a large amount of memory space, increasing the execution time and memory size of the object program.

Additionally, when the resources are split up into 3 or more functions, then there is the problem in that resource assignment cannot be achieved in accordance with the functions of the resources.

For example, for a target machine which is attempting to execute resource assignment, there are an equal number of data registers and address registers. Under the prior art, assignment is only separated into registers and memory used only when there is an insufficient number of registers, so that this second set of registers, the address registers, cannot be used. That is to say, under the prior art, resource assignment executed when considering several kinds of resource is incomplete.

There has also been the problem of not be able to execute resource assignment using the stored values of the argument registers, the return value registers and the broken registers as they are. These registers are originally set so that function calls can be executed efficiently.

The graph coloring method is an approximate algorithm for executing the most suitable color classification of the vertices in the interference graph. Since the argument registers, the return value registers and the broken registers are resource elements to which assignments are assigned before the execution of the algorithm, then these registers are regarded as colored vertices in the interference graph. In order to realize resource assignment which can use the stored values of the argument registers, return value registers and the broken registers as they are, then it becomes necessary to build the colored vertices into the interference graph and to execute a coloring process using that color for other vertices if it is valid, but this will deviate the limits of the graph coloring method. For the above reason, it is normally necessary to prepare separately the argument registers, the return value registers and the broken registers as assignable registers so that they may be used. Therefore, to use the stored values of the argument registers, the return value registers and the broken registers then a transmission instruction for assignable register use becomes necessary. If this kind of transmission instruction becomes necessary, then the necessary memory size and the execution time of the object program are increased by the amount used by this instruction.

The effect of the aforementioned problems can be disregarded as being of an insignificant level when there is an abundant supply of registers. However, when there are a only limited number of registers, such as with many built-in microprocessors, or when there are a small number of registers of several different kinds which fulfill different functions, then the effect of these problems becomes significant.

SUMMARY OF THE INVENTION

The first object of the present invention is to provide a resource assignment apparatus which is able to assign assignments to resource elements in order of priority ranking and, by limiting as much as possible the generation of transmission instructions, can restrict as far as possible the memory size and execution time needed by an object program.

The second object of the present invention is to provide a resource assignment apparatus which can use resources distinguishing between the functions that they perform, when there are 2 or more kinds of resource.

The third object of the present invention is to provide a resource assignment apparatus which can minimize the necessary amount of generated transmissions.

The first object of the invention can be achieved by a resource assignment apparatus used by a compiler which compiles programs written in a high-level language into programs written in machine language for assigning assignments which are a pairing of variables and live ranges in a program to separate resource elements which make up resources, divided up according to function, such as registers and memory, according to a priority value of the assignment, comprising: an assignment storage unit for storing the assignments in a program and their priority values; a first resource element assigning unit for taking an assignment with a highest priority value from the assignment storage unit and assigning the assignment with the highest priority value to a resource element; an assigning result storage unit for storing assigning results; an assignment retrieval unit for retrieving from the assignment storage unit an assignment which has a next highest priority value after a priority value of an assignment which has just been assigned; an interfering assignment extraction unit for extracting assignments whose live ranges interfere with a live range of the assignment retrieved by the assignment retrieval unit; a same resource remaining resource element determination unit for determining whether there are any resource elements of resources which perform a same function as each of the resource elements to which the assignments extracted by the interfering assignment extraction unit have been assigned by referring to the assigning result storage unit; a coherent assignment retrieval unit for retrieving the assignments for which, by referring to the starting point and end point of the live range, a starting point is coincident with the end point of the assignment retrieved by the assignment retrieval unit and assignments for which an end point is coincident with the starting point of the assignment retrieved by the assignment retrieval unit; a succession resource element determination unit for determining the resource element to which the assignments retrieved by the coherent assignment retrieval unit are assigned, by referring to the assigning result storage unit; a second resource assigning unit for assigning, when there is only one resource element determined by the same resource remaining element determination unit, the assignment retrieved by the assignment retrieval unit to the resource element, for assigning the assignment taken by the assignment retrieval unit to any resource element which is the determination result of the same resource remaining resource element determination unit and, moreover, the determination result of the succession resource element determination unit, when there is a plurality of resource elements determined by the same resource remaining resource element determination unit and a resource element determined by the succession resource element determination unit exists, and for storing the assignment result in the assignment result storage unit; and a control unit for repeatedly having the assignment retrieval unit activated, until all of the assignments have been assigned.

The second resource element assigning unit may comprise: a first assigning unit for assigning, when there is only one resource element determined by the same resource remaining resource element determination unit, the assignment taken by the assignment retrieval unit to the resource element; a second assigning unit for assigning the assignment taken by the assignment retrieval unit to any of the resource elements determined by the same resource remaining resource element determination unit when there is a plurality of resource elements determined by the same resource remaining resource element determination unit and there is no corresponding resource element determined by the succession resource element determination unit; and a third assigning unit for assigning the assignment taken by the assignment retrieval unit to any of the resource elements determined as the determination result of the same resource remaining resource element determination unit and, moreover, determined as the determination result of the succession resource element determination unit, when there is a plurality of resource elements determined by the same resource remaining resource element determination unit and a resource element determined by the succession resource element determination unit exists.

The resource assignment apparatus may further comprise: a profit value calculation unit for calculating the profit value which shows how memory size and/or execution time are reduced for a machine language program after compiling if an assignment is assigned to one of the resource elements determined by the same resource remaining resource element determination unit, for each of the resource elements determined by the same resource remaining resource element determination unit; a loss value calculation unit for calculating the loss value which shows how memory size and/or execution time are increased for a machine language program after compiling if an assignment is assigned to one of the resource elements determined by the same resource remaining resource element determination unit, for each of the resource elements determined by the same resource remaining resource element determination unit; and a greatest difference resource element determination unit for calculating a difference between the profit value and the loss value and determining which resource elements have a greatest difference; wherein the third assigning unit may assign the assignments retrieved by the assignment retrieval unit to one of the resource elements determined by the greatest difference resource element determination unit.

The profit value calculation unit may calculate the profit value for the resource element determined by the succession resource element determination unit based on the priority values of the assignments assigned to the resource element, with the profit values of the resource elements aside from the resource element determined by the succession resource element determination unit being set to equal 0.

The resource assignment apparatus may further comprise: a secondary interfering assignment extraction unit for retrieving assignments which have live ranges which interfere with the live ranges of the assignments retrieved by the coherent assignment retrieval unit, but are not the retrieved results of the interfering assignment extraction unit; and a first loss occurring resource element determination unit for determining to which resource elements the assignments which are the retrieval results of the secondary interfering assignment retrieval unit are assigned, by referring to the assigning result storage unit, wherein the loss value calculation unit may calculate loss values of the resource elements determined by the first loss occurring resource element determination unit based on the priority values of the assignments determined by the coherent assignment determination unit and, moreover, whose live range interferes with the live range of the assignment which is assigned to each of the resource elements, with the loss values of all of the resource elements aside from the resource element determined by the loss occurring resource element determination unit being set at 0.

The resource assignment apparatus may further comprise: a global group creation unit for retrieving a plurality of assignments whose live ranges are connected one after another, out of the assignments stored in the assignment storage unit, and setting the retrieved assignments as a global group; a global group retrieval unit for retrieving a global group which contains the assignment retrieved by the assignment retrieval unit, when there are a plurality of resource elements determined by the greatest resource element determination unit; a global profit value calculation unit for calculating a global profit value which shows how memory size and/or execution time are reduced if an as yet unassigned assignment is assigned to a common resource element, for each of the resource elements determined by the same resource remaining resource element determination unit; and a global loss calculation unit for calculating a global loss value which shows how memory size and/or execution time are increased if an as yet unassigned assignment is assigned to a common resource element, for each of the resource elements determined by the same resource remaining resource element determination unit; wherein, for a case when a plurality of resource elements are determined by the greatest difference resource element determination unit, the third assigning unit may calculate a difference between the global profit value and the global loss value, and then assigns the taken assignment to a resource element for which the difference is greatest.

The global profit value calculation unit may comprise: a first global group retrieval unit for retrieving, once the assignment retrieval unit has retrieved an assignment, a global group to which the retrieved assignment belongs; a global profit value storage unit for storing a total of the profit values for every resource element corresponding to a global group as the global profit value; and a first total value managing unit for adding, once the profit value calculation unit has calculated the profit value of a resource element for the assignment, the profit value to the global profit value of the resource element.

The global loss calculation unit may comprise: an interfering global group retrieval unit for retrieving, once the assignment retrieval unit has retrieved an assignment, global groups which contain the assignments which are the retrieval results of the interfering assignment retrieval unit in regard to the taken assignment; a second total storage unit for storing the total of the priority values of the assignments belonging to the global group as the global loss value corresponding to every resource element; and a second total managing unit for adding, once the profit value calculation unit has calculated the profit value of the resource element for the assignment retrieved by the assignment retrieval unit, the priority value of assignment for the resource element which is the retrieval result of the interfering assignment retrieval unit to the total of the global loss value for the resource element.

In the way described above, the present invention can assign assignments to resource elements without transgressing the order of priority values, and can reduce the execution time and memory size of a machine language program. When resource assignment is carried out for a target machine with a small number of registers, then the improvements in execution time and memory size described above become especially noticeable.

The second object of the present invention can be achieved by a resource assignment apparatus used by a compiler which compiles programs written in a high-level language into programs written in machine language for assigning assignments which are a pairing of variables and live ranges in a program written in programming language to separate resource elements which make up resources, divided up according to function, such as registers and memory, according to a priority value of the assignment, comprising: a cost storage unit for storing for every resource a cost which shows code size and/or execution time of every instruction used by the resource; a cost retrieval unit for retrieving the cost for every resource by referring to the cost storage unit, for each of the instructions in a program which are used in the live range of a variable in one assignment; a cost totalling unit for totalling the costs retrieved by the cost retrieval unit of each of the assignments for each resource; a priority value calculation unit for calculating the priority value based on the cost total value calculated for each of the assignments and the live ranges of the various assignments; an assignment storage unit for storing the assignments in a program and their priority values; a first resource element assigning unit for taking an assignment with a highest priority value from the assignment storage unit and assigning the assignment with the highest priority value to a resource element; an assigning result storage unit for storing assigning results; an assignment retrieval unit for retrieving from the assignment storage unit an assignment which has a next highest priority value after a priority value of an assignment which has just been assigned; an interfering assignment extraction unit for extracting assignments whose live ranges interfere with a live range of the assignment retrieved by the assignment retrieval unit; a same resource remaining resource element determination unit for determining whether there are any resource elements of resources which perform the same function as each of the resource elements to which the assignment extracted by the interfering assignment extraction unit has been assigned by referring to the assigning result storage unit; a coherent assignment retrieval unit for retrieving the assignments for which, by referring to the starting point and end point of the live range, a starting point is coincident with the end point of the assignment taken by the assignment retrieval unit and assignments for which an end point is coincident with the same starting point of the assignment taken by the assignment retrieval unit; a succession resource element determination unit for determining the resource elements to which the assignments retrieved by the coherent assignment retrieval unit are assigned, by referring to the assigning result storage unit; a second resource assigning unit for assigning, when there is only one resource element determined by the same resource remaining element determination unit, the assignment retrieved by the assignment retrieval unit to the resource element, for assigning the assignment taken by the assignment retrieval unit to any resource element which is the determination result of the succession resource element determination unit and, moreover, the determination result of the same resource remaining resource element determination unit, when there is a plurality of resource elements determined by the same resource remaining resource element determination unit and a resource element determined by the succession resource element determination unit exists, and for storing the assigning result in the assigning result storage unit; and a control unit for repeatedly having the assignment retrieval unit activated, until all of the assignments have been assigned.

The resource assignment apparatus may further comprise: a resource classified assignment supply unit for supplying all of the assignments which can be assigned to the same resource to the assignment storage unit, wherein the resource classified assignment supply unit may comprise: a resource determination unit for determining which resource has a lowest total cost, out of the totalled costs for the various assignments calculated by the cost totalling unit; a resource classified group conversion unit for referring to the various assignments and the resources which correspond to the assignments determined by the resource determination unit and converting into groups the assignments obtained as having the same determination results to form resource classified groups; a resource classified group selection unit for selecting one group out of the several resource classified groups formed by the resource classified group conversion unit; a resource classified group writing unit for writing the resource classified group selected by the resource classified group selection unit into the assignment storage unit; and a control unit for indicating a selection of a next resource classified group, when the all the assignments stored in the assignment storage unit have been taken by the assignment retrieval unit.

The resource assignment apparatus may further comprise: a resource classified group cost totalling unit for totalling the total cost values of the assignments found by the cost totalling unit for each of the resource classified groups formed by the resource classified group conversion unit, wherein the resource classified group selection unit may select a resource classified group with a highest total cost totalled by the group cost totalling unit, out of as yet unselected resource classified groups.

The same resource remaining resource element determination unit may further comprise: a first resource classified group determination unit for determining the resource classified group to which the assignment retrieved by the assignment retrieval unit belongs; a second resource classified group determination unit for determining, when all of the resource elements of the resource corresponding to the resource classified group have been assigned assignments retrieved by the interfering assignment retrieval unit, the resource classified group for an assignment with a higher cost value total for the assignment than the first determined resource but, moreover, with a lowest total cost value; and a first transference unit for transferring, once the second resource classified group determination unit has determined a resource classified group, an assignment retrieved by the assignment retrieval unit from the resource classified group determined by the first resource classified group determination unit to the resource classified group determined by the second resource classified group determination unit.

The cost totalling unit may further comprise: a loop-nesting depth level retrieval unit for retrieving the loop-nesting depth level of the loop processes for the various instructions using the variable in one assignment; wherein the cost totalling unit may add the loop-nesting depth level to the cost retrieved by the cost retrieval unit.

In the way described above, since the present invention can determine precisely to which resource's resource elements assignments should be assigned based of the costs, and can perform resource assignment so that the special functions present in certain resources can be reflected in the machine language instructions. For the program development for integrated use microprocessors which are equipped with a plurality of resources with different functions for reducing limiting the hardware cost, by using the compiler of the present invention, it becomes possible to generate a machine language program which makes full use of the different functions featured in such a microprocessor.

The third object of the present invention can be achieved by a resource assignment apparatus used by a compiler which compiles programs written in a high-level language into programs written in machine language for assigning assignments which are a pairing of variables and live ranges in a program written in programming language to resource elements which make up resources, divided up according to function, such as registers and memory, according to a priority value of the assignment, comprising: a reserved assignment extraction unit for extracting assignments in the program which should be assigned to a previously determined resource element; a reserved resource element storage unit for storing the resource elements to which the assignments extracted by the reserved assignment extraction means should be assigned; a reserved assigning unit for assigning the assignments extracted by the reserved assignment extraction unit to the corresponding resource elements out of the resource elements stored by the reserved resource element storage unit, and having the assigning results stored by the assigning result storage unit; an assignment storage unit for storing the assignments in a program and their priority values; a first resource element assigning unit for taking an assignment with a highest priority value from the assignment storage unit and assigning an assignment with the highest priority value to a resource element; an assigning result storage unit for storing assigning results; an assignment retrieval unit for retrieving from the assignment storage unit an assignment which has a next highest priority value after a priority value of an assignment which has just been assigned; an interfering assignment extraction unit for extracting assignments whose live ranges interfere with a live range of the assignment retrieved by the assignment retrieval unit; a same resource remaining resource element determination unit for determining whether there are any resource elements of resources which perform a same function as each of the resource elements to which the assignments extracted by the interfering assignment extraction unit have been assigned by referring to the assigning result storage unit; a coherent assignment retrieval unit for retrieving the assignments for which, by referring to the starting point and end point of the live range, a starting point is coincident with the end point of the assignment taken by the assignment retrieval unit and assignments for which an end point is coincident with the starting point of the assignment taken by the assignment retrieval unit; a succession resource element determination unit for determining the resource elements to which the assignments retrieved by the coherent assignment retrieval unit can be assigned, by referring to the assigning result storage unit; a second resource assigning unit for assigning, when there is only one resource element determined by the same resource remaining element determination unit, the assignment retrieved by the assignment retrieval unit to the resource element, for assigning the assignment taken by the assignment retrieval unit to any resource element which is the determination result of the same resource remaining resource element determination unit and, moreover, the determination result of the succession resource element determination unit, when there is a plurality of resource elements determined by the same resource remaining resource element determination unit and a resource element determined by the succession resource element determination unit exists, and for storing the assigning result in the assigning result storage unit; and a control unit for repeatedly having the assignment retrieval means activated, until all of the assignments have been assigned.

The second resource element assigning unit may comprise: a first assigning unit for assigning, when there is only one resource element determined by the same resource remaining resource element determination unit, the assignment taken by the assignment retrieval unit to the resource element; a second assigning unit for assigning the assignment taken by the assignment retrieval unit to any of the resource elements determined by the same resource remaining resource element determination unit when there is a plurality of resource elements determined by the same resource remaining resource element determination unit and there is no corresponding resource element determined by the succession resource element determination unit; and a third assigning unit for assigning the assignment taken by the assignment retrieval unit to any of the resource elements determined as the determination result of the same resource remaining resource element determination unit and, moreover, determined as the determination result of the succession resource element determination unit, when there is a plurality of resource elements determined by the same resource remaining resource element determination unit and a resource element determined by the succession resource element determination unit exists.

The resource assignment apparatus may further comprise: a profit value calculation unit for calculating the profit value which shows how memory size and/or execution time are reduced for a machine language program after compiling if an assignment is assigned to one of the resource elements determined by the same resource remaining resource element determination unit, for each of the resource elements determined by the same resource remaining resource element determination unit; a loss value calculation unit for calculating the loss value which shows how memory size and/or execution time are increased for a machine language program after compiling if an assignment is assigned to one of the resource elements determined by the same resource remaining resource element determination unit, for each of the resource elements determined by the same resource remaining resource element determination unit; and a greatest difference resource element determination unit for calculating a difference between the profit value and the loss value and determining which resource elements have a greatest difference; wherein the third assigning means may assign the assignments retrieved by the assignment retrieval unit to one of the resource elements determined by the greatest difference resource element determination unit.

The profit value calculation means may calculate the profit value for the resource element determined by the succession resource element determination unit based on the priority values of the assignments assigned to the resource element, with the profit values of the resource elements aside from the resource element determined by the succession resource element determination means being set to equal 0.

The resource assignment apparatus may further comprise: a secondary interfering assignment extraction unit for retrieving assignments which have live ranges which interfere with the live ranges of the assignments retrieved by the coherent assignment retrieval unit, but are not the retrieved results of the interfering assignment extraction unit; and a first loss occurring resource element determination unit for determining to which resource elements the assignments which are the retrieval results of the secondary interfering assignment retrieval unit are assigned, by referring to the assigning result storage unit; wherein the loss value calculation unit may calculate loss values of the resource elements determined by the first loss occurring resource element determination unit based on the priority values of the assignments determined by the coherent assignment determination unit and, moreover, whose live range interferes with the live range of the assignment which is assigned to each of the resource elements, with the loss values of all of the resource elements aside from the resource element determined by the loss occurring resource element determination unit being set at 0.

The resource assignment apparatus may further comprise: a global group creation unit for retrieving a plurality of assignments whose live ranges are connected one after another, out of the assignments stored in the assignment storage unit, and setting the retrieved assignments as a global group; a global group retrieval unit for retrieving a global group which contains the assignment retrieved by the assignment retrieval unit, when there are a plurality of resource elements determined by the greatest resource element determination unit; a global profit value calculation unit for calculating a global profit value which shows how memory size and/or execution time are reduced if an as yet unassigned assignment is assigned to a common resource element, for each of the resource elements determined by the same resource remaining resource element determination unit; and a global loss calculation unit for calculating a global loss value which shows how memory size and/or execution time are increased if an as yet unassigned assignment is assigned to a common resource element, for each of the resource elements determined by the same resource remaining resource element determination unit; wherein for a case when a plurality of resource elements are determined by the greatest difference resource element determination unit, the third assigning unit may calculate a difference between the global profit value and the global loss value, and then assigns the taken assignment to a resource element for which the difference is greatest.

The global profit value calculation means comprises: a first global group retrieval unit for retrieving, once the assignment retrieval unit has retrieved an assignment, a global group to which the retrieved assignment belongs; a global profit value storage unit for storing a total of the profit values for every resource element corresponding to a global group as the global profit value; and a first total value managing unit for adding, once the profit value calculation unit has calculated the profit value of a resource element for the assignment, the profit value to the global profit value of the resource element.

The global loss calculation means may comprise: an interfering global group retrieval unit for retrieving, once the assignment retrieval unit has retrieved an assignment, global groups which contain the assignments which are the retrieval results of the interfering assignment retrieval means in regard to the taken assignment; a second total storage unit for storing the total of the priority values of the assignments belonging to the global group as the global loss value corresponding to every resource element; and a second total managing unit for adding, once the profit value calculation unit has calculated the profit value of the resource element for the assignment retrieved by the assignment retrieval unit, the priority value of assignment for the resource element which is the retrieval result of the interfering assignment retrieval unit to the total of the global loss value for the resource element.

In the way described above, the resource assigning can be executed so as to render the generation of machine language instructions which are transmission instructions unnecessary, and so the execution time and memory size of the machine language program can be reduced.

BRIEF DESCRIPTION OF THE DRAWINGS

These and other objects, advantages and features of the invention will become apparent from the following description thereof taken in conjunction with the accompanying drawings which illustrate a specific embodiment of the invention. In the drawings:

FIGS. 3A, 3B and 3C are tables showing the operational process of the compiler.

FIG. 9 is an table showing the inference value table.

FIGS. 11A and 11B are tables showing the referred results of the simultaneous existence assignment reference unit 5 and the coherent relation reference unit 6.

FIG. 12 is a table showing the aspects of the sorting of assignments by resource classification by the resource classified assignment set selection unit 9.

FIG. 22 is a drawing showing the global profit value table and the global loss value table.

DESCRIPTION OF THE PREFERRED EMBODIMENT

Figure 1:
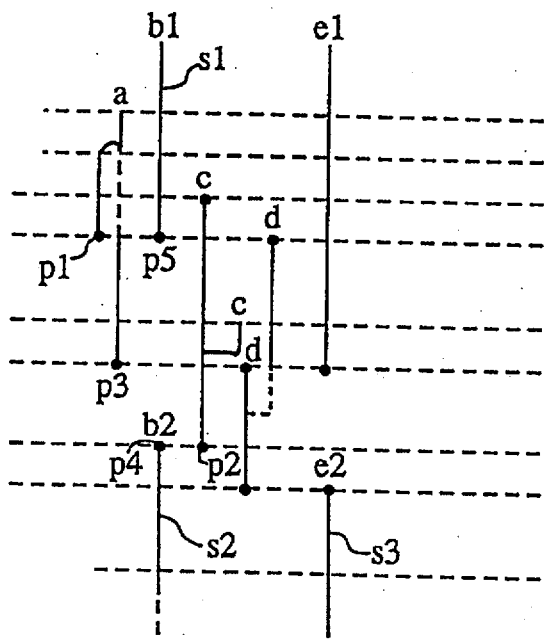
FIGS. 1A and 1B are tables showing the program and the assignments corresponding to those in the program.
Figure 2:
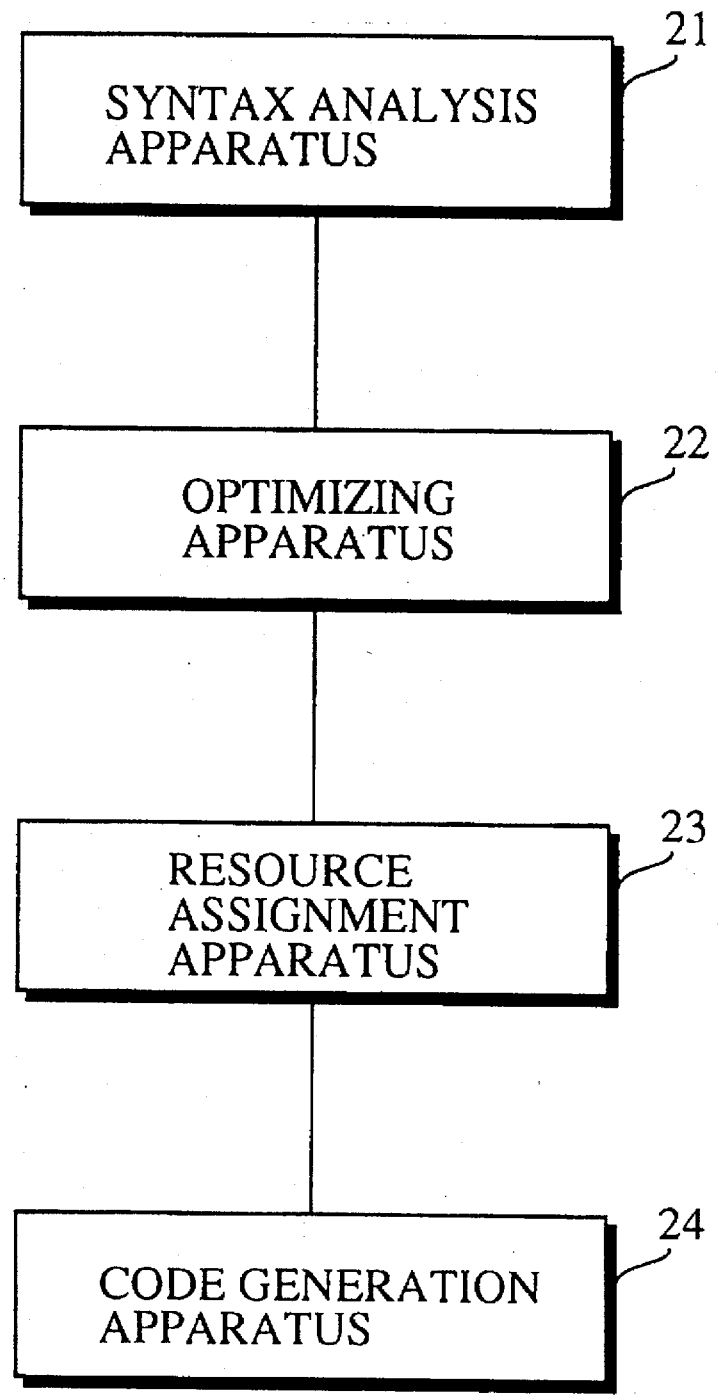
FIG. 2 shows a construction of the compiler.
Figure 4:
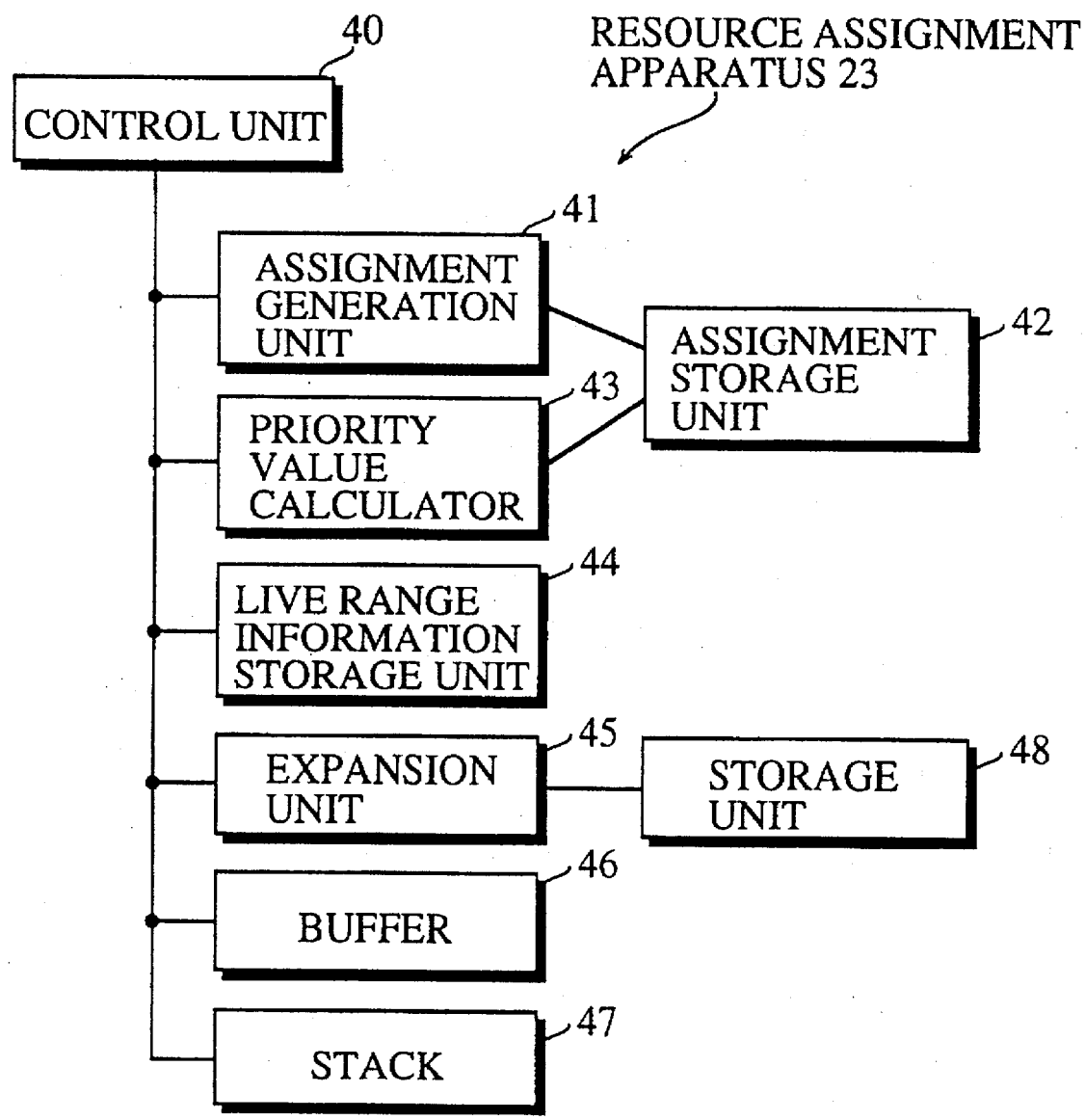
FIG. 4 is a drawing showing a construction of a resource assignment apparatus 23 according to the prior art.
Figure 5A:
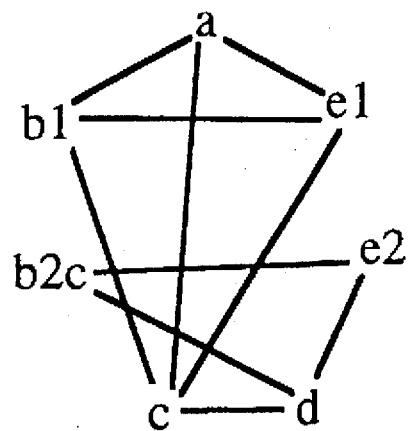
FIGS. 5A and 5B are drawings showing an interference graph and the way the same interference graph is changed by combining the vertices.
Figure 5B:
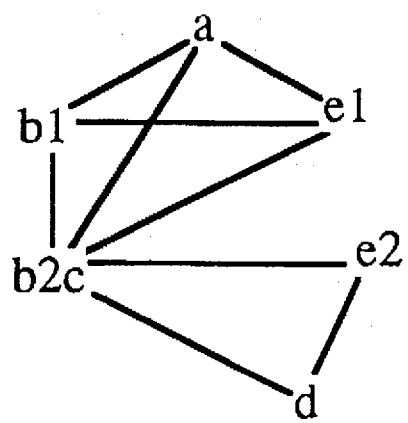
Figure 6A:
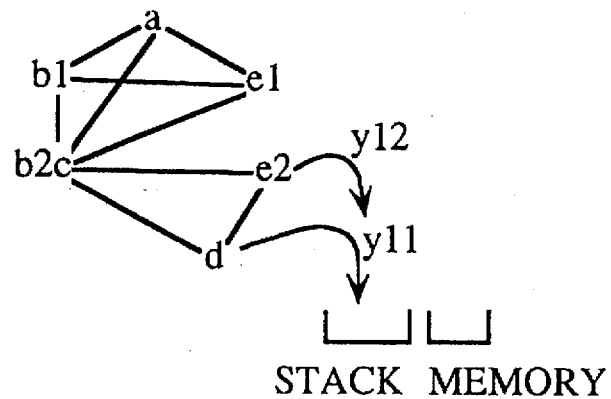
FIGS. 6A, 6B, 6C, 6D, 6E, 6F, 6G, 6H, and 6I are drawings showing the progression of the graph degeneration of the interference graph.
Figure 6B:
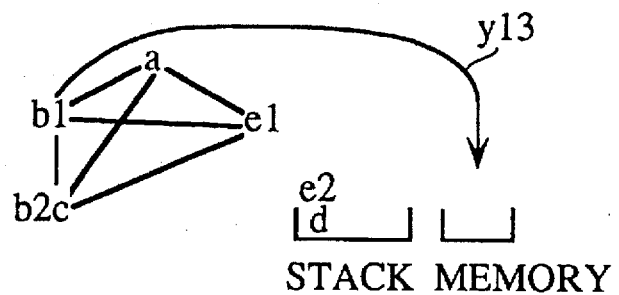
Figure 6C:
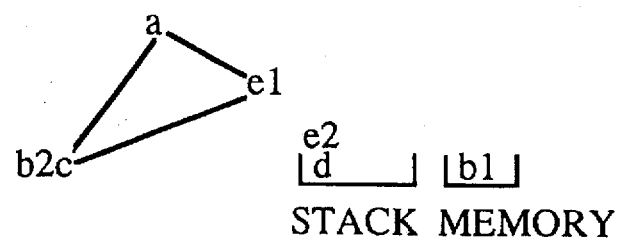
Figure 6D:
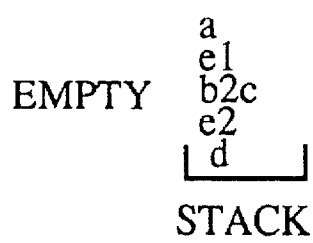
Figure 6E:
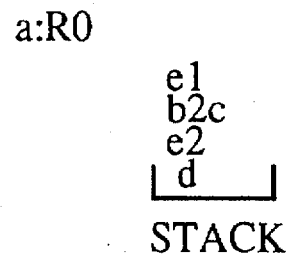
Figure 6F:
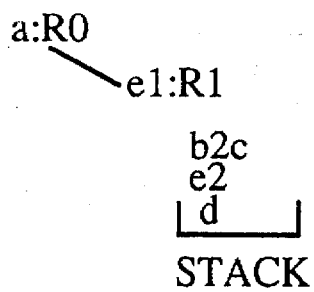
Figure 6G:
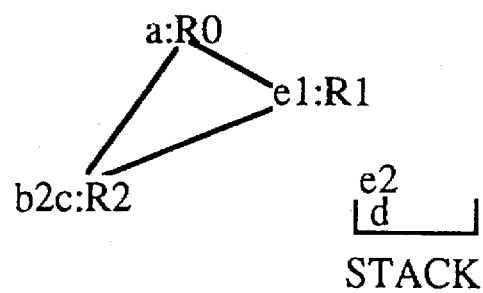
Figure 6H:
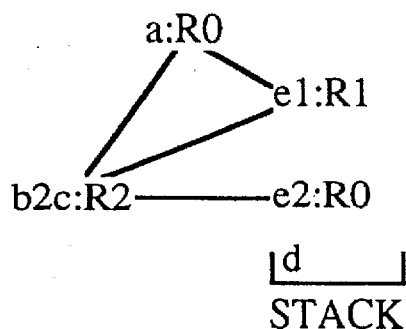
Figure 6I:
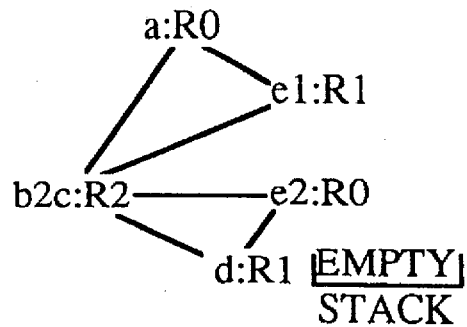
Figure 7:
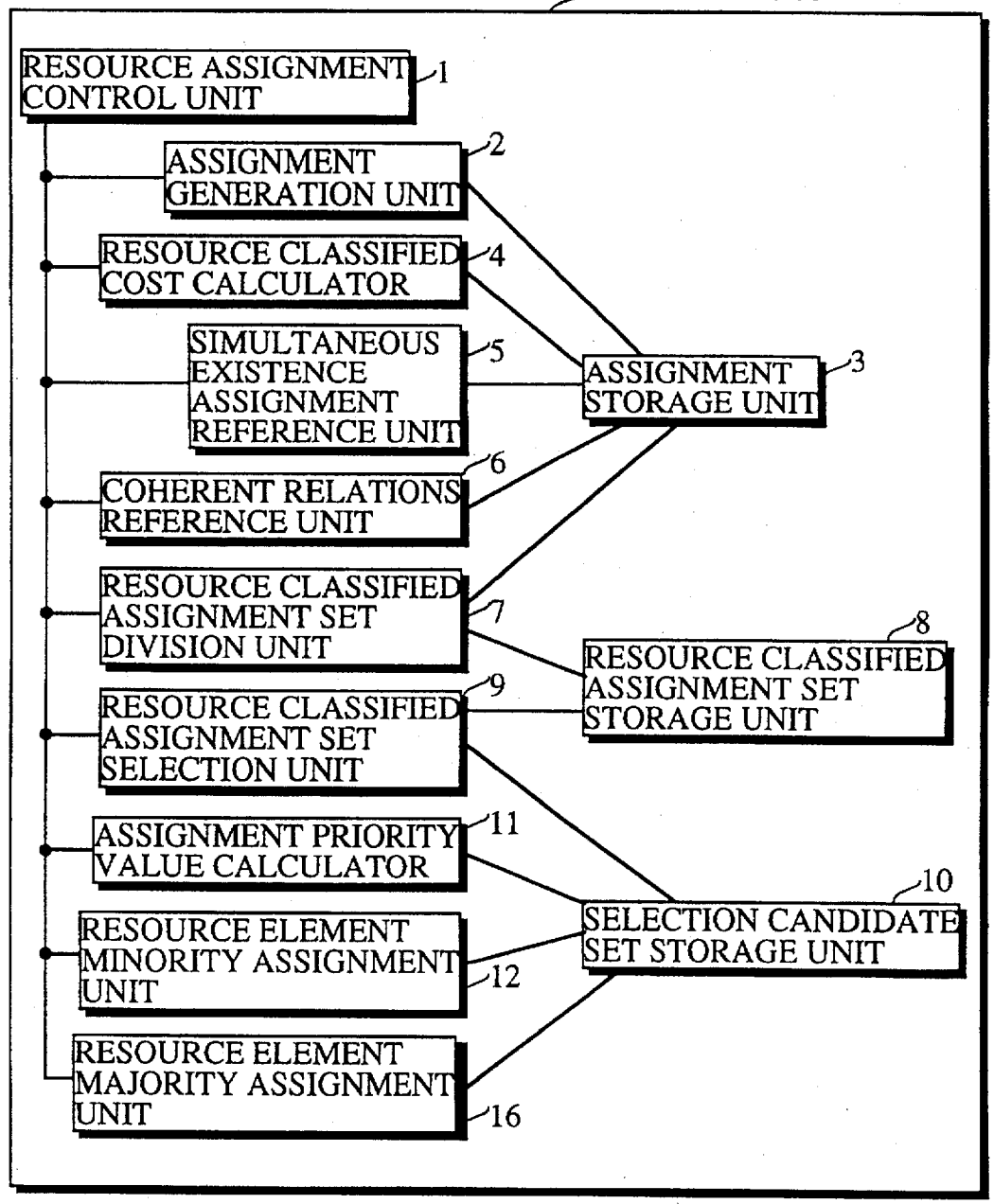
FIG. 7 is a drawing showing the construction of the resource assignment apparatus 33 in embodiment 1.

The present invention relates to resource assignment unit constructed as shown in FIG. 7. As shown in FIG. 7, the resource assignment unit 33 is comprised of a resource assignment control unit 1, an assignment generation unit 2, an assignment storage unit 3, a resource classified cost calculator 4, a simultaneous existence assignment reference unit 5, a coherent relations reference unit 6, a resource classified assignment set division unit 7, a resource classified assignment set storage unit 8, a resource classified assignment set selection unit 9, a selection candidate set storage unit 10, an assignment priority value calculator 11, an resource element minority assignment unit 12, and a resource element majority assignment unit 16. The resource assignment unit 33 is built into the compiler shown in FIG. 2 in place of the resource assignment unit 23.

The resource assignment control unit 1 controls the entire assignment process.

Figures 8A, 8B:
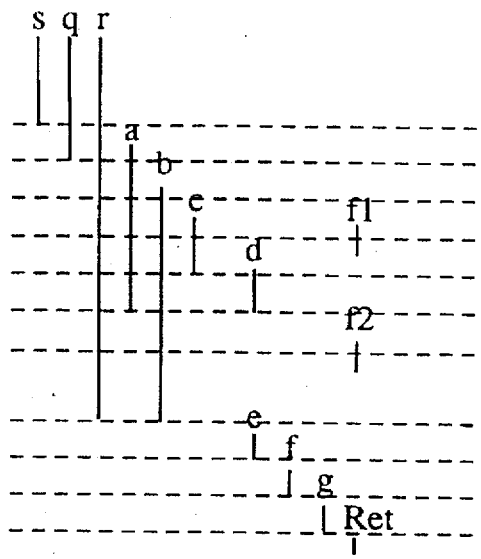
FIGS. 8A and 8B are tables showing the program to be processed by the resource assignment apparatus and the assignments corresponding to those in the program.

The assignment generation unit 2 generates the assignments, based on the results of the data flow analysis (hereinafter referred to as data flow information) and the results of the control flow analysis (hereinafter referred to as the control flow information) by the optimizing unit 32. The generated assignments are stored in the assignment storage unit 3. The following is an explanation of this process for the example program and the corresponding assignments shown in FIG. 8A. The [program] in FIG. 8A is split up into [basic block 1], [basic block 2], and [basic block 3] by the optimizing unit 32, and the data flow information and the control flow information are obtained. Based on this information, the assignment generation unit 2 then generates the information for the assignments in the basic blocks 1, 2 and 3 in FIG. 8A, and the corresponding live ranges. The information for these assignments and live ranges has been visually represented as [assignments] in FIG. 8B. The broken lines in this drawing correspond to each step in the intermediate language program, while the solid lines with variable names represent the starting and end points of the live ranges of each assignment, and also the way in which they interfere with each other.

For the example shown in FIG. 8A, the assignment generation unit 2 retrieves the variables s, q, r with [*] attached as the pointer variables, and stores these retrieved pointer variables as the assignments in the assignment storage unit 3. Pointer variables are the variables for indirect reference to the memory, and are usually assigned to resource elements in the same way as normal variables. Additionally, the assignment generation unit 2 retrieves [f1(c);] and [f2(b,*r);] from the example program of FIG. 8A, and determines that they are function calls (for simplicity, in order to express the registers used when the argument registers, the broken registers, and the return value registers are used by [f1(c);] and [f2(b,*r);], the variables f1, f2 which can be assigned to these registers have been introduced). Additionally, the assignment generation unit 2 on retrieving [Ret], determines that this is a variable storing a return value.

On the other hand, the assignment generation unit 2 stores the registers which are the argument registers, the broken registers and the return values registers in advance, and assigns the above variables to these registers. In this embodiment, the argument registers and the broken registers are assigned beforehand to the registers D0 and A0, with the return value registers also assigned to register D0. In accordance with this, the assignment generation unit 2 assigns the variables f1, f2 to registers D0 and A0 respectively, and also assigns the variable Ret to register D0.

The assignment storage unit 3 stores the information for the assignments generated by the assignment generation unit 2. The assignment storage unit 3 stores as the assignment information, in addition to the variable and live range information, the live range starting point and end point information, the information for the intermediate language steps which use the assignments inside the live ranges, the inference cost values described below, the simultaneously existing assignment information, and the information for the assignments which have been assigned to resource elements.

The resource classified cost calculator 4 executes the evaluation of to which resource's resource elements the assignments in each of the steps in the source program should be assigned, in order to reduce the size of the generated code.

This evaluation execution can be more specifically said to be the totalling of the inference values which show the execution time or the necessary memory size for every step in the program. These totalled values are called the inference cost values and are written into the assignment storage unit 3. Additionally, this totalling process is calculated according to the following {numerical equation 2}.

{Numerical Equation 2}

Cost $(R,x) = \Sigma C(x,R,i) * W(i)$ x: assignment i: steps in intermediate language program in the def and use parts of x R: resource in the target machine W(i): weight of loop-nesting depth in step i, with weight as heavy as an internal loop. For example, loop-nesting depth level. Provided that this uses the following $C(x,R,i)$ as the execution time.

$C(x,R,i)$: When x is assigned to R, the inference value of the average necessary execution time and the code size of the machine language instruction.

According to the above equation, it can be seen that the greater the number of steps in the live range of assignment x which execute multiplication or division using x, and the greater the number of steps having deep loop-nesting levels, the higher the cost (R,x).

When there are three kinds of resources present in the target machine, comprising address registers (abbreviated to AR), data registers (DR) and memory (Mem), the inference cost value for the voluntary assignment x will be calculating in the manner described below.

When the assignment x is assigned to AR, then all of the def and use parts are counted to give the inference value number: Cost (AR,x).

When the assignment x is assigned to DR, then all of the def and use parts are counted to give the inference value number: Cost (DR,x).

When the assignment x is assigned to Mem, then all of the def and use parts are counted to give the inference value number: Cost (Mem,x).

Since the weight of the loop-nesting depth has a great influence on the execution time, the weight of loop-nesting W(i) may be reflected as the W(i) multiplier for C(x,R,i).

Figure 10:
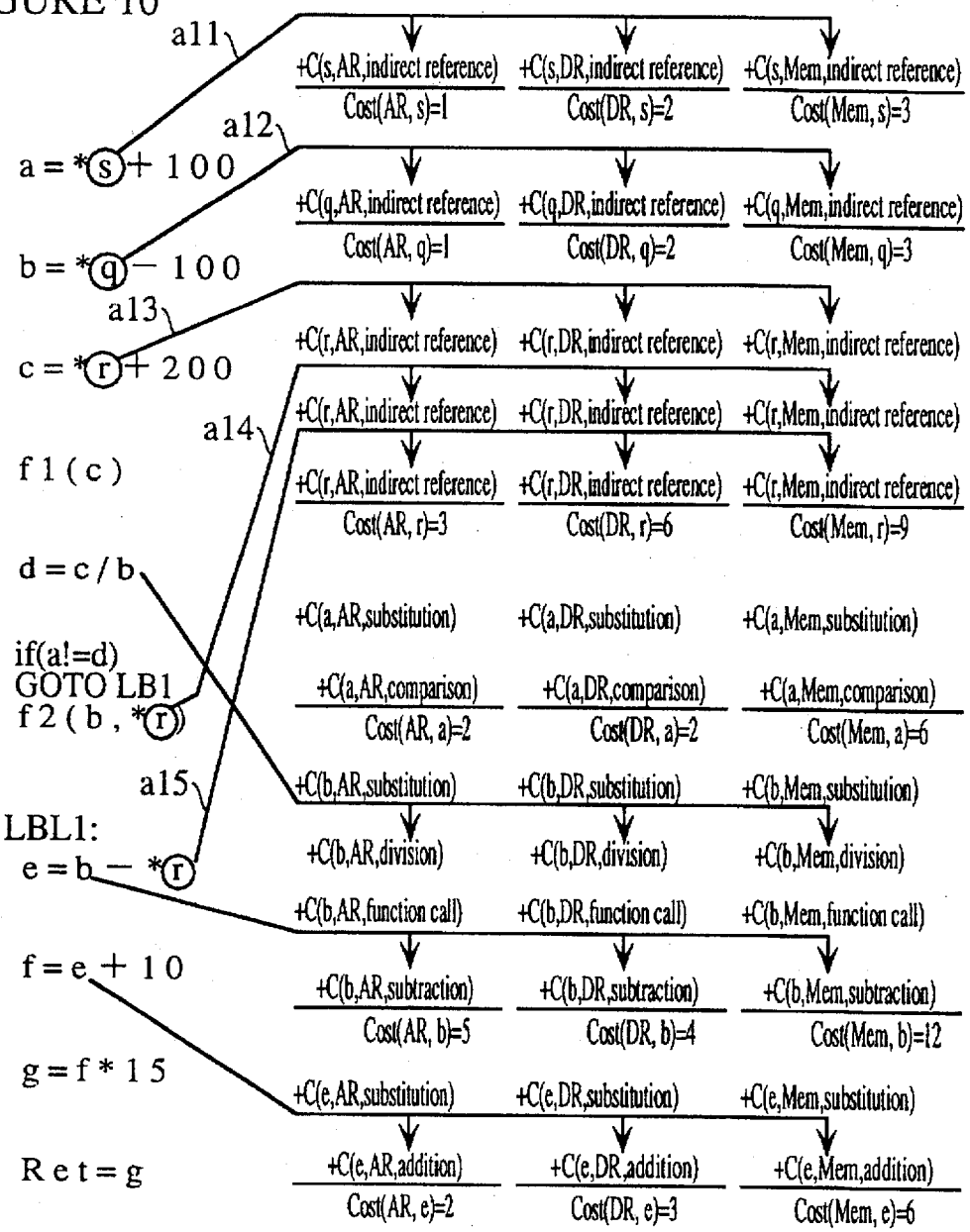
FIG. 10 is an table showing the aspects of the calculation of the inference cost value by the resource classifying calculator 4.

An example of a table in which the cost inference values C(x,R,i) are recorded is shown in FIG. 9, and an example of a table in which the cost inference values C(R,x) are recorded is shown in FIG. 10.

The following is an explanation of the evaluation process executed by the resource classified cost calculator 4 using the format of the inference value table shown in FIG. 9, and the table in FIG. 10.

The inference table is the information in which the aforementioned inference values are recorded.

In FIG. 9, the inference value table in construction of a plurality of cells, with a numerical expression such as [C(x,AR,indirect reference)=1], [C(x,DR,indirect reference)=2], [C(x,Mem,indirect reference)=3] being shown in each cell. These show which resource should be used when the machine language instruction [indirect reference] is executed.

[C(x,AR,indirect reference)=1] shows that when an instruction for indirect reference to the address register is executed, [1] will be added to the necessary memory size or to the execution time.

[C(x,DR,indirect reference)=2] shows that when an instruction for indirect reference to the data register is executed, [2] will be added to the necessary memory size or to the execution time.

[C(x,Mem,indirect reference)=3] shows that when an instruction for indirect reference to the memory is executed, [3] will be added to the necessary memory size or to the execution time.

Additionally, [C(x,Mem,addition)=3] in the same drawing shows that when an instruction for addition is executed at the memory, [3] will be added to the necessary memory size or to the execution time.

In the same way, [C(x,Mem,subtraction)=3] shows that when an instruction for subtraction is executed at the memory, [3] will be added to the necessary memory size or to the execution time.

The left side of FIG. 10 shows the example program of FIG. 8A. Several assignments in this program have been circled, and arrows have been added originating from these circled assignments. In the drawing, the arrow a11 (a-eleven) originates at assignment [s] and splits up indicating 3 positions. These positions [C(s,AR,indirect reference)], [C(s,DR,indirect reference)], [C(s,Mem,indirect reference)] show the totals of the inference values for the assignment s. These totals of the inference values for assignment s are shown below these positions in the drawing as [Cost(AR,s)=1], [Cost(DR,s)=2], and [Cost(Mem,s)=3]. That is to say, when assignment s is assigned to AR, the inference value is [1], when assignment s is assigned to DR, the inference value is [2], and, when assignment s is assigned to memory, the inference value is [3].

Additionally, the assignment r is present in 3 places in the example program, with each being circled. The arrows a13, a14, a15 originate at these assignments. Each of the arrows splits up indicating the following three positions each [C(r,AR,indirect reference)], [C(r,DR,indirect reference)], [C(r,Mem,indirect reference)], but, since this assignment appears 3 times within the program, the evaluation is shown as being made for these 3 places together. The total inference values for these 3 positions are [C(r,AR,)=3], [C(r,DR,)=6], [C(r,Mem,)=9].

In the process described above, the calculation of the totals of the inference values is executed as shown by the arrows a11, a12, a13 etc., and the inference cost values for all of the assignments with regard to each of the 3 resources, as shown in the table at the bottom of FIG. 10, are obtained.

Also, the aforementioned inference value table may be updated by the operator when necessary.

The simultaneous existence assignment reference unit 5 retrieves the interference of the live ranges for different assignments. The retrieved results, as shown in FIG. 11A, are given as the assignment set Ov(x) which is the set of assignments whose live ranges interfere with the voluntary assignment x. These retrieved results are stored in the assignment storage unit 3.

The coherent relations unit 6 retrieves the coherent relations. The coherent relations are the relations between assignments whereby the end of the live range for one assignment coincides with the starting point of the live range for another assignment as one step, which, by being assigned to the same resource element, can result in a reduction of transmission instructions. This retrieved result is given as the assignment set R1(x), as shown in FIG. 11B, which contains all of the assignments in the assignment storage unit 3 which have coherent relations with the voluntary assignment x. The agreement of the live ranges in 1 step is regarded as coherent relations because of the two address instruction format of the machine language instructions of the target machine. Since the operation results of 2 operand format operations, including unary operations such as reverse operations, commutative operations such as addition instructions, and non-commutative operations such as subtraction, are stored on the one hand in the operands shown in {numerical equation 3} below, then these operands, as shown in (a) through (c) below, are also the end point of assignment x (the operand before operation execution) and at the same time the starting point of another assignment y (the operand after the storage of the operation result) in the program. In other words, assignments x and y correspond to the same operand before and after operation. If it is opr2 in (c), then x and y do not display coherent relations.

{Numerical Equation 3}

(a) Rev opr1  ^opr1→opr1

(a machine language instruction, where ^ is the symbol for the symbolic reverse expression, storing the operation result in the operand of the reverse operation)

(b) ADD opr1, opr2  opr1+opr2→opr1

(a machine language instruction storing the operation result in the left operand of the addition operation)

(c) SUB opr1, opr2  opr1−opr2→opr1

(a machine language instruction storing the operation result in the left operand of the subtraction operation)

When the end point of the assignment x is a unary operation, then the starting point of this step is assignment y (for example, y=^x).

When the end point of the assignment x is a commutative operation, then the starting point of this step is assignment y (for example, y=x+10).

When the end point of the assignment x is a non-commutative operation, then the starting point of this step is assignment y (for example, y=x−10).

Also, when there are a plurality of coherent relations, for example, when the variables which form the operands for both sides of an addition together form the end point for that operation step, then the coherent relations reference unit 6 evaluates the strength of the relations. When this coherent relation is on the inner and outer side of a loop process, then the extent to which the coherent relation is regarded as being strong depends on the extent to which the coherent relation is on the inner side of the loop process, since the process count when executing the program is large. Additionally, the greater the number of assignments having coherent relations in a number of steps, the stronger the coherent relations are regarded. This strength of coherent relations is called the assignment relation strength. The more the pair of assignments lie on the inside of a loop, and also the greater the number of assignments having coherent relations, the greater this assignment relation strength becomes.

The resource classified assignment set division unit 7 refers to the inference cost values calculated by the resource classified cost calculator 4 and determines to which resource the assigning of the each of assignments would be appropriate, and divides the assignments into sets classified by resource. The following is an explanation of this process with reference to FIG. 12. In FIG. 12, the frame with the headings [AR(A0,A1,A2)] and [DR(D0,D1,D2)] shows the assignments divided into sets for each of the resources, respectively. Also, [AR(A0,A1,A2)] shows that the AR register contains the resource elements A0, A1, A2. In the same way, [DR(D0,D1,D2)] shows that the DR register contains the resource elements D0, D1, D2.

By referencing the inference cost values shown in FIG. 10, the resource classified assignment set division unit 7 allocates each assignment to the resource where the inference cost is the lower, as shown by the reference symbols b11, b12, b13, b14, b15, dividing up the assignments into an address register (AR) set and a data register (DR) set.

In FIG. 10, the inference cost of the assignment s is shown by [Cost(AR,s)=1] for AR and by [Cost(DR,s)=2] for DR, showing that the inference cost for AR is the lower. Accordingly, the assignment s is stored in the resource AR set, as shown by the arrow b11.

The inference cost of the assignment b is shown by [Cost(AR,b)=5] for AR and by [Cost(DR,b)=4] for DR, showing that the inference cost for DR is the lower. Accordingly, the assignment b is stored in the resource DR set, as shown by the arrow b15.

As a result of this dividing up, the assignments in the drawing s, q, r, a etc. are divided up between the AR(A0, A1,A2) set and the DR(D0,D1,D2) set. Consequently, by assigning the assignments to each resource in this way, a set of assignments whereby the cost is reduced is generated. These sets are called resource classified assignment sets. They are shown in the frame with the title [resource classified assignment sets] directly below the frame with the headings [AR(A0,A1,A2)] and [DR(D0,D1,D2)] as containing the frames [AR(A0,A1,A2)], [DR(D0,D1,D2)] and [Mem], with the resource classified assignment set division unit 7 storing the resource classified assignment sets it has generated in the way described above in the resource classified assignment set storage unit 8.

As shown in FIG. 12, the inference cost value for assignment a is the same for both AR and DR, as shown by [Cost (AR,a)=2], [Cost (DR,a)=2]. When the inference cost of an assignment is the same for 2 or more resources as with this assignment a, then the resource classified assignment set division unit 7 closely checks the strength of the inference cost of the assignments exhibiting coherent relations and, by referring to this in detail, carefully chooses the combination which will result in the lowest inference cost.

Figure 13:
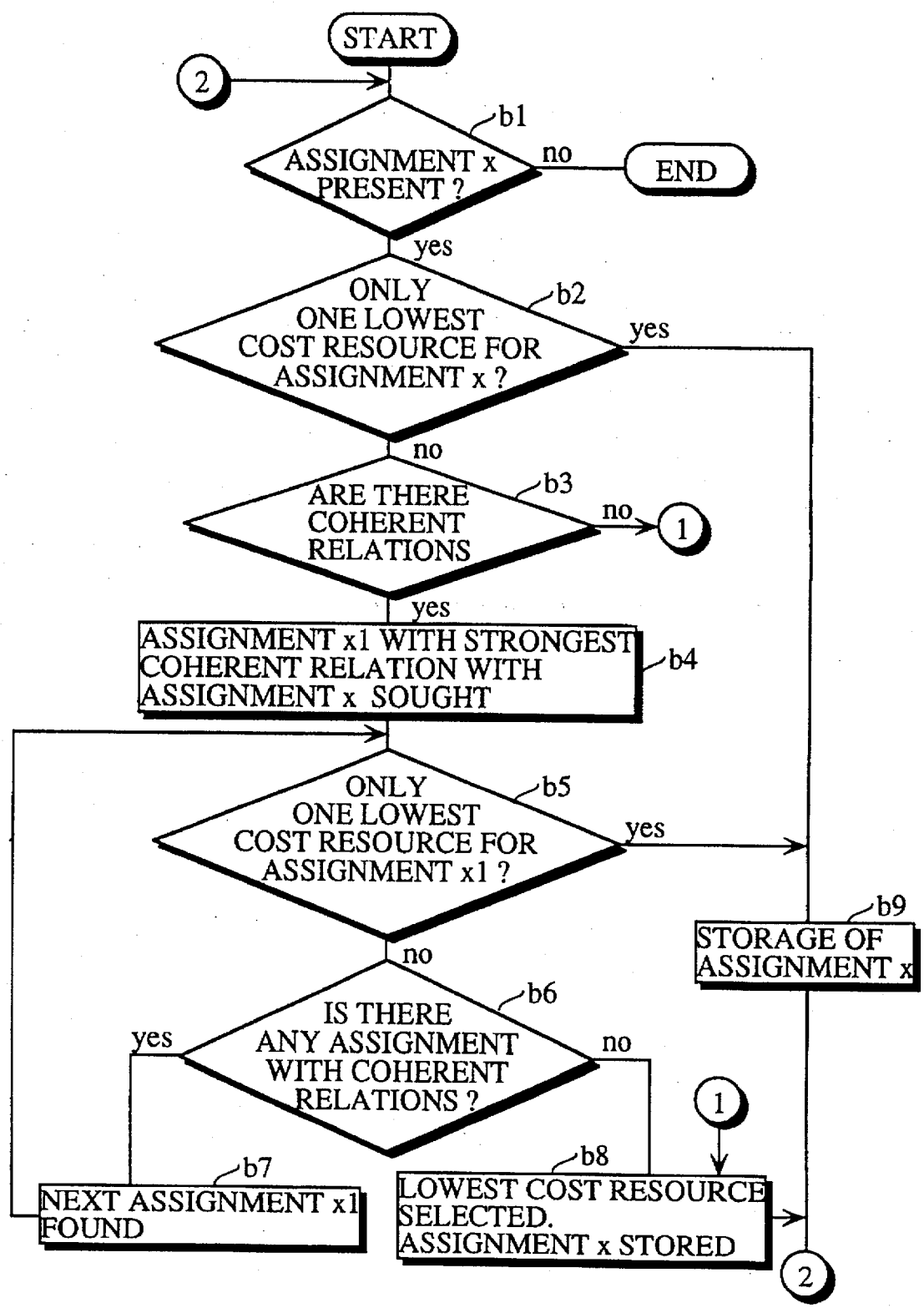
FIG. 13 is a flowchart showing the operational process of the resource classified assignment set division unit 7.

The following is an explanation of this selection with reference to the flowchart in FIG. 13.

First, it is determined whether there is an assignment x which is an assignment yet to be processed (Step b1 in FIG. 13), and, if there is an assignment x, then it is determined whether there is only one lowest cost resource which is the resource With the lowest inference cost for the assignment x, or whether there is a plurality of lowest cost resources (Step b2). When there is a plurality, it is then determined whether there are any assignments which exhibit coherent relations with the assignment x (Step b3). If there are, then the assignment x1 which exhibits the strongest coherent relations with x is sought from out all of the assignments which have coherent relations with assignment x (Step b4), and then it determined whether there is only one lowest cost resource for this assignment x1, or whether there are a plurality (Step b5). When there is a plurality of lowest cost resources, then, once again, it is determined whether there are any other assignments with coherent relations with assignment x (Step b6). When there are, then the assignment with the strongest coherent relations is sought, with this assignment becoming the new assignment x1. In this way, the process of b5–b7 is repeated and the lowest cost resource for assignment x and the various assignments exhibiting coherent relations with assignment x are investigated. If it cannot be determined in Step b6 that there is an assignment with coherent relations, then one out of the several lowest cost resources is selected with this selected resource then being matched to the assignments (Step b8).

The resource classified assignment set storage unit 8 then stores the resource classified assignment sets for all of the resources which it receives from the resource classified assignment set division unit 7.

The resource classified assignment set selection unit 9 decides the priority ranking of each set (this priority ranking being referred to hereafter as the resource selection priority ranking) by comparing the totals of the inference costs for every resource classified assignment set, and then writes these resource classified assignment sets one by one into the selection candidate set storage unit 10 according to their priority ranking. The following is an explanation of this process with reference to FIG. 12. In FIG. 12, the numerical equations [Cost(DR,a)+Cost(DR,b)+Cost(DR,c)+Cost(DR, d)+Cost(DR,e)+Cost(DR,f)+Cost(DR,g) . . . ], [Cost(AR,s) +Cost(AR,q)+Cost(AR,r)] are written below the frames which show the resource classified assignment sets [AR(A0, A1,A2)], [DR(D0,D1,D2)] and [Mem], showing the total inference cost of the various resource classified assignment sets. The equation [Cost(DR,a)+Cost(DR,b)+Cost(DR,c)+ Cost(DR,d)+Cost(DR,e)+Cost(DR,f)+Cost(DR,g) . . . ] below the resource classified assignment set [DR(D0,D1, D2)] shows the total inference cost for the resource classified assignment set [DR(D0,D1,D2)], while the equation [Cost(AR,s)+Cost(AR,q)+Cost(AR,r)] shows the inference cost of the resource classified assignment set [AR(A0,A1, A2)]. The frame representing the selection candidate set storage unit 10 is shown below and to the right of the frame representing the resource classified assignment set storage unit 8, with the arrow h11 drawn from the frame representing the resource classified assignment set [DR(D0,D1,D2)] to the frame representing the selection candidate set storage unit 10, showing the storage of the resource classified assignment set [DR(D0,D1,D2)] in the selection candidate set storage unit 10.

In this way, the resource classified assignment set selection unit 9 takes the total inference costs calculated by the resource classified assignment set division unit 7, and decides the priority ranking b21, b22, b23 of the resource classified assignment sets in order of size, starting with the highest total, storing, as shown by the arrow h11, the set with the highest priority ranking in the selection candidate set storage unit 10. Once the resource assignment process has been carried out for the stored set by the resource element minority assignment unit 12, then the priority ranking is again decided, and the set with the highest priority ranking is then stored in the resource classified assignment set storage unit 8. In deciding the resource selection priority ranking, in place of comparing every cost, the number of assignments, or the scarcity of resource elements may be used as parameters. Also, the resource selection priority ranking may be decided by using a combination of the total of the cost inference values, the number of assignments, and the scarcity of resource elements.

Figure 14:
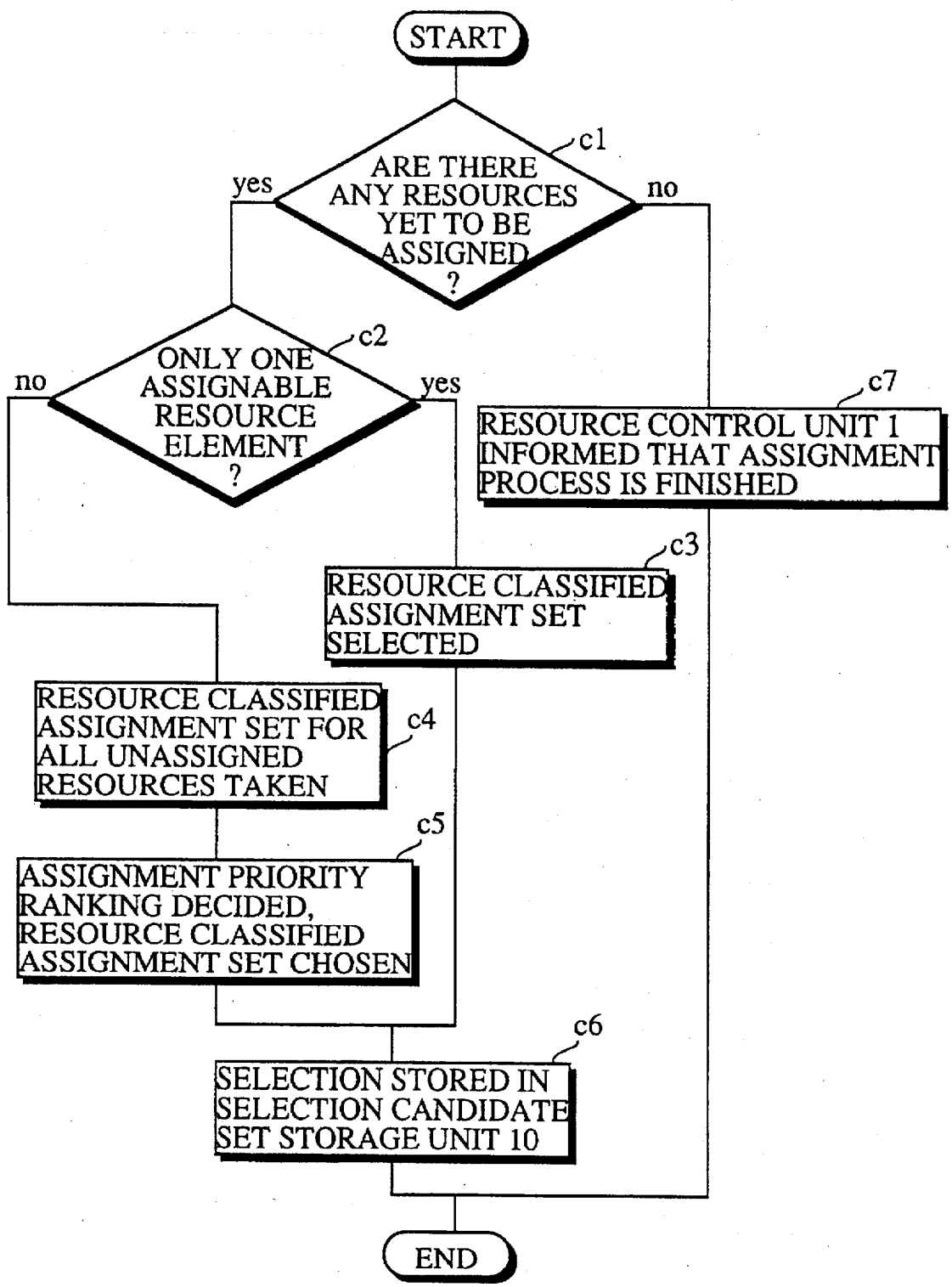
FIG. 14 is a flowchart for the resource classified assignment set selection unit 9.

The above process is shown in FIG. 14. The following is an explanation of the operational process of the resource classified assignment set selection unit 9 with reference to the flow chart in FIG. 14.

The resource classified assignment set selection unit 9 determines whether there are any resources to which assignments have yet to be assigned (Step c1). If there are such resources, then it determines whether there is just one or a plurality of such resources (Step c2). When there is just one, then it retrieves the resource classified assignment set for that resource from the resource classified assignment set storage unit 8 (Step c3). When there are a plurality, then it retrieves all the resource classified assignment sets for those resources from the resource classified assignment set storage unit 8 (Step c4), and decides the resource selection priority ranking for all of the resource classified assignment sets it has retrieved. In order to decide the resource selection priority ranking, it finds the totals of the inference value costs for the resource classified assignment sets. The higher the total of the inference cost values for a resource classified assignment set, the higher the resource selection priority ranking becomes. The resource classified assignment set with the highest resource selection priority ranking is then retrieved (Step c5).

The selection candidate set storage unit 10 then stores the resource classified assignment set selected by the resource classified assignment set selection unit 9.

The assignment priority value calculator 11 decides the priority value of the resource classified assignment set selected by the resource classified assignment set selection unit 9 and stored by the selection candidate set storage unit 10. This priority value reflects at least one of the inference cost value calculated by the resource classified cost calculator 4, the length of the live range and the interference of the live range. When only the inference cost value calculated by the resource classified cost calculator 4 is reflected, once the voluntary assignments in the assignment candidate set stored in the selection candidate set storage unit 10 have been made the assignment x, then the priority value of the assignment x is found by means of the following calculation. (Principle 1)

When assignment x is assigned to resource R, then the priority value is set in proportion to the size of the inference value cost.

Priority Value=Cost(R,x)/Ln(x)*K

Ln(x): length of live range for assignment x

R: resource stored in the selection candidate set storage unit 10

K: proportionality constant (an appropriate integer value assumed to improve the accuracy of the calculation)

According to the conditions implemented by the compiler, and the content of the program or suchlike, other parameters may be reflected in the priority value calculation method, in addition to Cost(R,x).

Also, any one out of the following calculation principles (Principles 2 through 5) may be used in chosen and used. (Principle 2)

When the resource S follows resource R in resource selection priority ranking, then, aside from Cost(R,x) calculated in (Principle 1), Cost (S,x) is found, and priority value is set to be proportional to Cost(R,x)–Cost (s,x). (Principle 2a)

When the resources of lower resource selection priority ranking than resource R are set as S1, . . . Sn, then by finding the average value of the cost as (Cost(R,x)+Cost(S1,x)+Cost (S2,x)+Cost(S3,x) . . . Cost(Sn,x))/(n+1), the priority value is set to be in proportion to this average value. (Principle 3)

The priority value found under principle 2, divided by the length of the live range of the assignment x.

(Principle 3a)

The priority value found under principle 2a, divided by the length of the live range of the assignment x.

(Principle 4)

The priority value is set to be in proportion to the number of assignments which have already been assigned to a resource element, out of the elements in the set Ov(x) of the assignments whose live ranges interfere with assignment x.

(Principle 5)

The priority value is set to be in proportion to the number of assignments which have already been assigned to a resource element, out of the elements in the set R1(x) of assignments which exhibit coherent relations with assignment x.

The resource element minority assignment unit 12 assigns the assignments stored in the selection candidate set storage unit 10 to the resource elements. The following is an explanation of this process with reference to the flowchart shown in FIG. 16.

The resource element minority assignment unit 12 retrieves the assignments in order of assignment priority ranking from the selection candidate set storage unit 10 (Steps d1, d2, d3 in FIG. 16), and, having found the resource elements to which the assignments can be assigned (these resource elements being called assignable resource elements), assigns them the assignments (Steps d7, d8). These resource elements are selected from out of the resource which corresponds to the resource classified assignment set to which the assignment belongs (Steps d4). When assignable resource elements cannot be selected for the presently corresponded resource, then the resource element minority assignment unit 12 searches out the resource having a higher inference cost value for this assignment but, moreover, having the lowest total inference cost, then, determining whether the resource classified assignment set of the searched out resource is yet to be assigned, stores the assignment in the resource classified assignment set of the resource determined as being not yet assigned (Steps d5,d6)

Also, when there are a plurality of assignable resource elements, then resource element is selected out of the assignable resource elements with regard to the effect this selection will have on the execution time and memory size of the object program. This effect, aside from the inference cost calculated by the resource classified cost calculator 4, is the increased amount due to the insertion of transmission instructions. In order to evaluate this increased amount, the present invention uses the two concepts of profit and loss in regard to assignment. Assignment-generated profit, as shown in (7) in FIG. 3C, is the reduction in memory size and execution time which is achieved by rendering unnecessary the generation of transmission instructions between resource elements. Assignment-generated loss is the increase in memory size and execution time which is necessitated by the increased generation of transmission instructions between resource elements. The values of these profits and losses are called local profit values and local loss values, and are used as evaluation parameters by the resource element minority assignment unit 12, with the selection of which assignable resource being made by comparing their difference (with the difference between the local profit values and local loss values being hereinafter referred to as the local absolute profit value).

Figure 15:
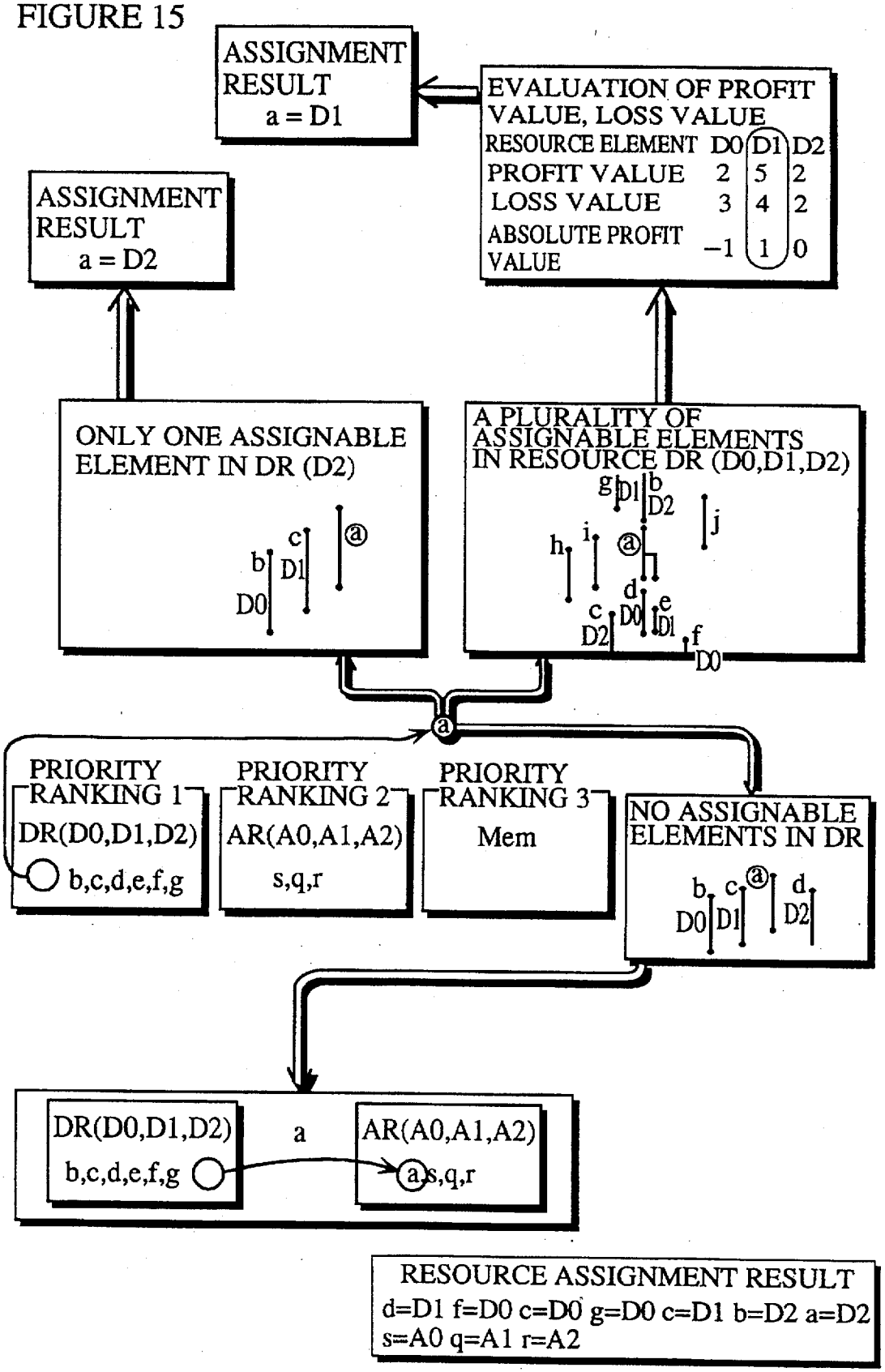
FIG. 15 is a drawing showing the stages of the resource assignment process carried out by the resource element minority assignment unit 12.

The following is an explanation of the details of the process of the aforementioned resource element minority assignment unit 12 with reference to FIG. 15.

In FIG. 15, assignments and their respective live ranges shown as a vertical line are written in as the contents of the frames with the headings [Only one assignable element in resource DR], [A plurality of assignable elements in resource DR], [No assignable elements in resource DR]. [b], [c], [d] . . . above and to the left of these vertical lines represent the names of the assignments for which these lines represent the live ranges, while [D0], [D1] to the left or right side of the lines show the name of the resource element to which the assignment has been assigned. Also, the circled [a] is the assignment which is now to be assigned, which is shown in FIG. 12 as a member of the resource classified assignment set [DR(D0,D1,D2)].

Since the assignments [b], [c] in the frame titled [Only one assignable element in resource DR] have already been assigned to the resource elements [D0], [D1], it can be seen that the assignment [a] whose live range interferes with them, can only be assigned to the resource element D2.

There is an arrow extending form the top of the same frame, with the frame titled [Assignment result a=D2] at the head of the arrow, with this frame showing that when only the resource element D2 is assignable, the assignment [a] will be assigned to the resource element D2 without further consideration.

Also, in the frame titled [A plurality of assignable elements in resource DR] in the same drawing, the assignment a is shown by the live range shaped like the letter [h]. Above and below this live range are the assignments [g], [b], [c], [d], [e], [f] which are assigned to the resource elements [D0, D1, D2], while to the left and right are the assignments [h], [i], [j] which are not yet assigned. In this case, the assignment [a] can be assigned to the resource elements [D0, D1, D2].

The arrow extending from the top of this frame points to a frame titled [Evaluation of profit value, loss value evaluation] (cost evaluation of transmission instruction insertion), with this frame featuring the rows [resource element], [profit value], [loss value], and [absolute profit value] stacked vertically. [D0], [D1, [D2] are written next to [resource element], the numerical values [2], [5], [2] are written next to [profit value], the numerical values [3], [4], [2] are written next to [loss value], and the numerical values [−1], [1], [0] are written next to [absolute profit value], showing that for resource element D0, the local profit value is 2, the local loss value is 3, and the absolute profit value is −1. The column [D1 5 4 1] has been circled, this highlighting that the absolute profit value for D1 is higher than that of D0 and of D2 (hereinafter the local profit value, the local loss value and the absolute profit value will be given in the same format as shown in FIG. 15).

An arrow extends from the left side of the frame titled [Evaluation of profit value, loss value] to a frame titled [Assignment result a=D1], this showing that the assignment a is assigned to the resource D1 which has the highest absolute local profit.

In the frame titled [No assignable elements in resource DR] in the same drawing, there are 3 vertical lines showing live ranges to the left and right of the vertical line which represents the assignment a. These vertical lines represent the live ranges of the assignments [b], [c], [d] and, from the letters to the left of each line, it can be seen that they are assigned to the resource elements [D0], [D1], and [D2], respectively. Since all of the resource elements for the resource DR have been assigned assignments whose live ranges interfere with assignment a, it shows that there is no resource element to which assignment a can be assigned.

At the head of the arrow which extends away from the left side of this frame is a frame showing the resource classified assignment sets for AR and DR, with an arrow labelled [a]

being drawn inside this frame, showing that this assignment [a] is transferred from the resource classified assignment set DR to the resource classified assignment set AR. This is because, whilst the inference cost for the resource AR [cost(AR,a)] is higher than that for the resource DR, the total inference cost for the resource AR is lowest. Even if the order of the resources in terms of total inference cost were DR, AR, Mem, then, if cost(Dr,a)<cost(Mem,a)<cost(AR,a), then the assignment a will be stored in the resource classified assignment set for the resource Mem.

Next, the following is an explanation as to how the local profit values and the local loss values are found.

The local profit values and the local loss values are found with respect to the priority value, the weight of loop-nesting depth and number of assignments. The following is an explanation of the calculation process of the local profit value and the local loss value for the assignment x which is to be assigned to a resource element.

(1) Using Priority Value as the Base for Finding Local Profit Values and Local Loss Values This process will be explained with reference to FIG. 17.

In this drawing the thick white lines show the live ranges of the assignments, with black dots showing their starting and end points. In the drawing, broken lines have been drawn level with these black dots, and these show where there is a coherence between the end point of a live range and the starting point of another, so that the assignments which have their starting/end points connected by these broken lines can be said to exhibit coherent relations. Character strings, such as [assignment x0], [assignment x1], [assignment x11], showing the assignment names have been added to the vertical lines showing the live ranges. Also, for the assignments which have already been assigned, a character string showing the name of the resource element to which the assignment has been assigned is written directly above the assignment name. Also, arrows have been drawn extending from these assignment and resource element names. In the drawing, the broken line arrows show what local profit value, local loss value and absolute profit value the resource element of that name has in the table, while the solid lines show with regard to which assignments local profit values and a local loss values are found. The table showing local profit values, local loss values and absolute profit values is in the same format as the table shown in FIG. 15, and shows in each column the local profit value, local loss value and absolute profit value for each resource element.

Figure 17:
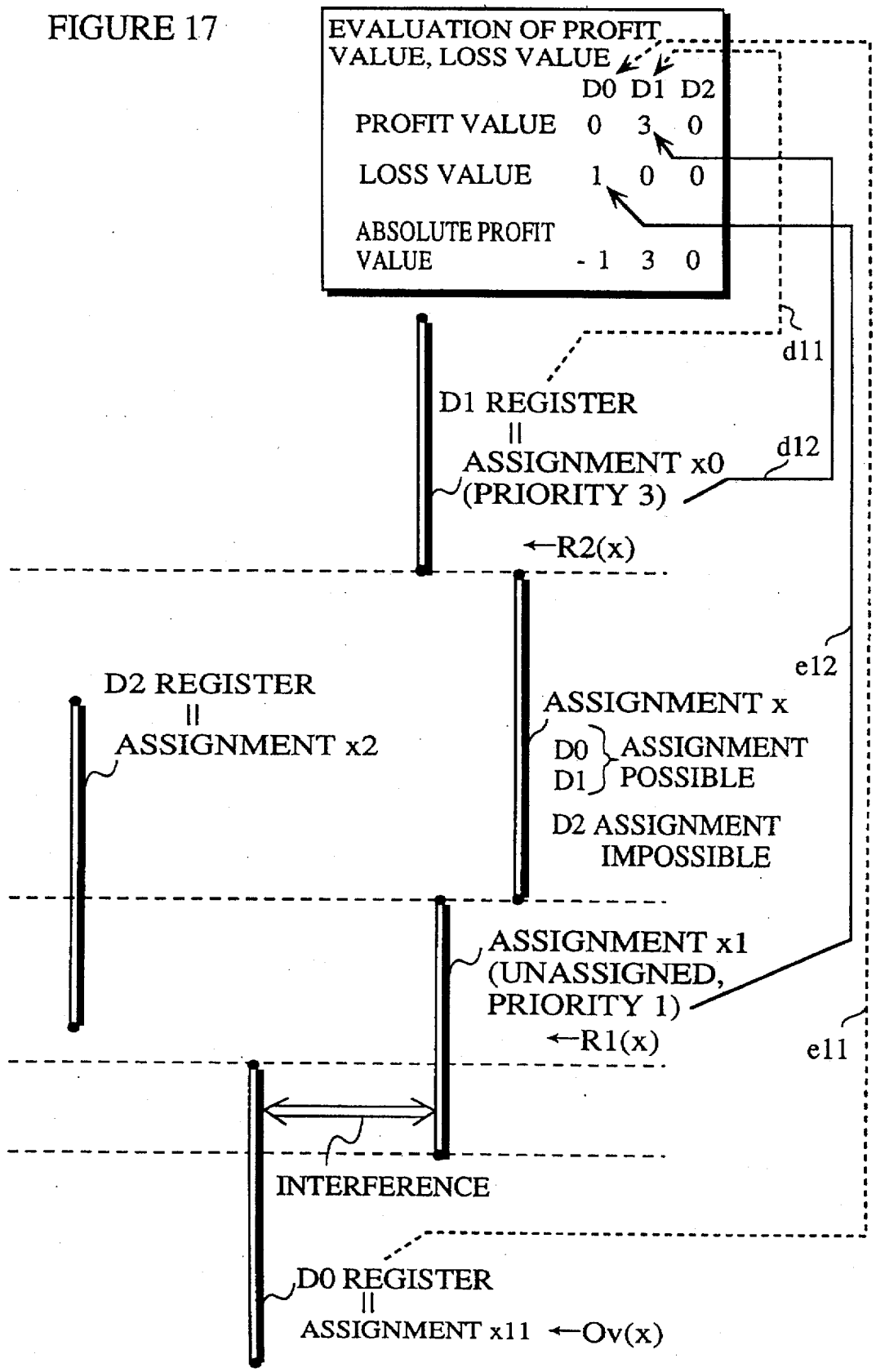
FIG. 17 is a drawing showing the procedure of the calculation of the profit value and the loss value based on the priority value of the assignments.

In FIG. 17, since the vertical lines which represent the live ranges of the assignment x1 and assignment x2 have an overlapping portion, it can be seen that their live ranges interfere with one another. In the same way, since the vertical lines which represent the live ranges of the assignment x1 and assignment x11 have an overlapping portion, it can be seen that their live ranges also interfere.

Also, since the starting point of the live range of the assignment x is connected to the end point of the live range of the assignment x0 by a broken line, it can be seen that assignments x and x0 exhibit coherent relations. In the same way, since the end point of the live range of the assignment x is connected to the starting point of the live range of the assignment x1 by a broken line, it can be seen that assignments x and x1 exhibit coherent relations. It can be seen in the figure that x0 has been assigned to the register D1 and that the assignment x1 is yet to be assigned. Assignments exhibiting coherent relations with assignment x, such as assignment x1, in the assignment set R1(x) which was shown in FIG. 11B are then further classified. That is to say, the set of all assignments that are yet to be assigned are called R1(x), with the set of already assigned assignments being called as R2(x).

The following is an explanation of the calculation of the local profit value and the local loss value by the resource element minority assignment unit 12.

First, all of the elements which exhibit coherent relations with assignment x in the assignment set R1(x) are taken out, and the already assigned assignments R2(x) are sought out. Here, the assignment x0 which appears as one element in the assignment set R1(x) is given as already being assigned to the register D1, so that, as shown by the arrows d11, d12 in FIG. 17, the local profit value of the register D1 is the priority value 3 of assignment x0.

Next, all of the elements in the which exhibit coherent relations with assignment x are taken out, and the set of assignments which are not assigned R1(x) are sought. The resource element minority assignment unit 12 then takes out the assignment x1 which is one element in R1(x) and again examines the elements in Ov(x1). It then assigns the assignment x11 which appears as one element in Ov(x1) to register D0. As shown by the arrows e11, e12, the resource element minority assignment unit 12 sets the priority value of the assignment x1 as the local loss value of register D0.

Figure 18:
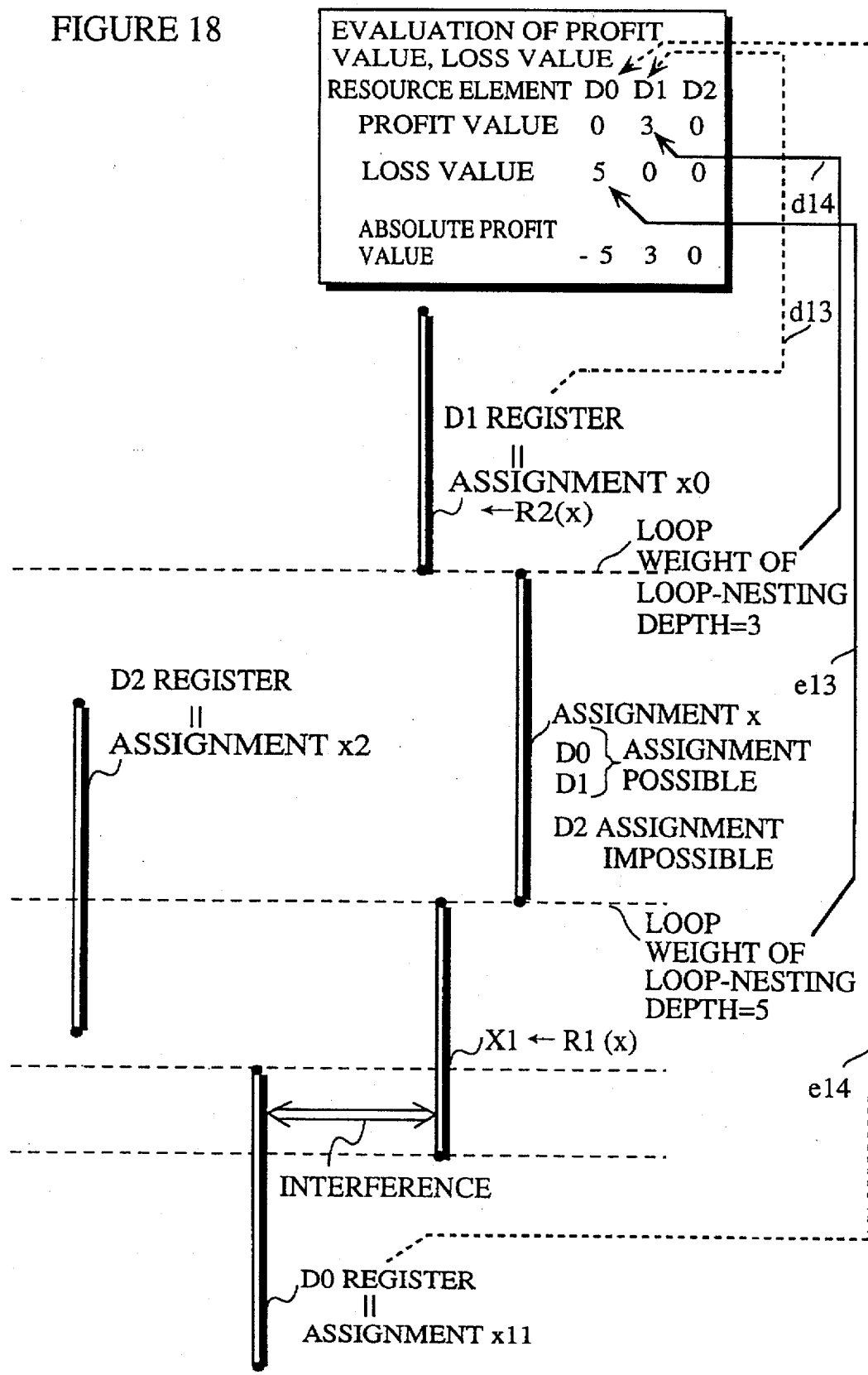
FIG. 18 is a drawing showing the procedure of the calculation of the profit value and the loss value based on the weight of loop-nesting depth.

(2) Using Weight of Loop-Nesting Depth as the Base for Finding Local Profit Values and Local Loss Values The following is an explanation of this process with reference to FIG. 18. FIG. 18 shows a program part expressed using the same method as was used in FIG. 17.

In FIG. 18, since the vertical line which represents the assignment x has an overlapping part with vertical line which represents the assignment x2, then it can be seen that the live range of assignment x interferes with that of assignment x2. In the same way, since the vertical line which represents the assignment x1 has an overlapping part with vertical line which represents the assignment x11, then it can be seen that the live range of assignment x1 interferes with that of assignment x11. Also, since the starting point of the live range of the assignment x is connected to the end point of the live range of the assignment x0 by a broken line, it can be seen that assignments x and x0 exhibit coherent relations. In the same way, since the end point of the live range of the assignment x is connected to the starting point of the live range of the assignment x1 by a broken line, it can be seen that assignments x and x1 exhibit coherent relations. It can be seen in the figure that x0 has been assigned to the register D1 and that the assignment x1 is yet to be assigned. In FIG. 18, the assignment x0 is set as one element in R2(x), and the assignment x1 as one element in R1(x).

In this diagram the assignment x0, said above to be 1 element in the assignment set R2(x), is assigned to the register D0. On this occasion, the resource element minority assignment unit 12 uses the weight of loop-nesting depth of the steps (hereinafter referred to as coherent steps) whose starting or end point is coherent with the starting or end point of the live range of the assignment x or the starting or ending point of the assignment x0 as the local profit value, as shown by the arrows d13, d14. When there is a plurality of coherent steps for the assignment x and the assignment x0, then the total weight of loop-nesting depth for all such steps is found and then set as the local profit value of the resource element D1.

Also, the resource element minority assignment unit 12 takes out the assignment x1 which is one element in the resource set R1(x) and investigates the elements in Ov(x1). Having assigned the assignment x11 which appears as 1 element in this Ov(x1) to the resource element D0, the resource element minority assignment unit 12, in the same way as with the local profit value, uses the weight of loop-nesting depth of the coherent steps for assignment x and assignment x11 as the local loss value of the resource element D0, as shown by the arrows e13, e14. When there is a plurality of coherent steps for assignment x and assignment x0, then the total weight of loop-nesting depth for all these steps is found and used as the local loss value for the resource element.

Figure 19:
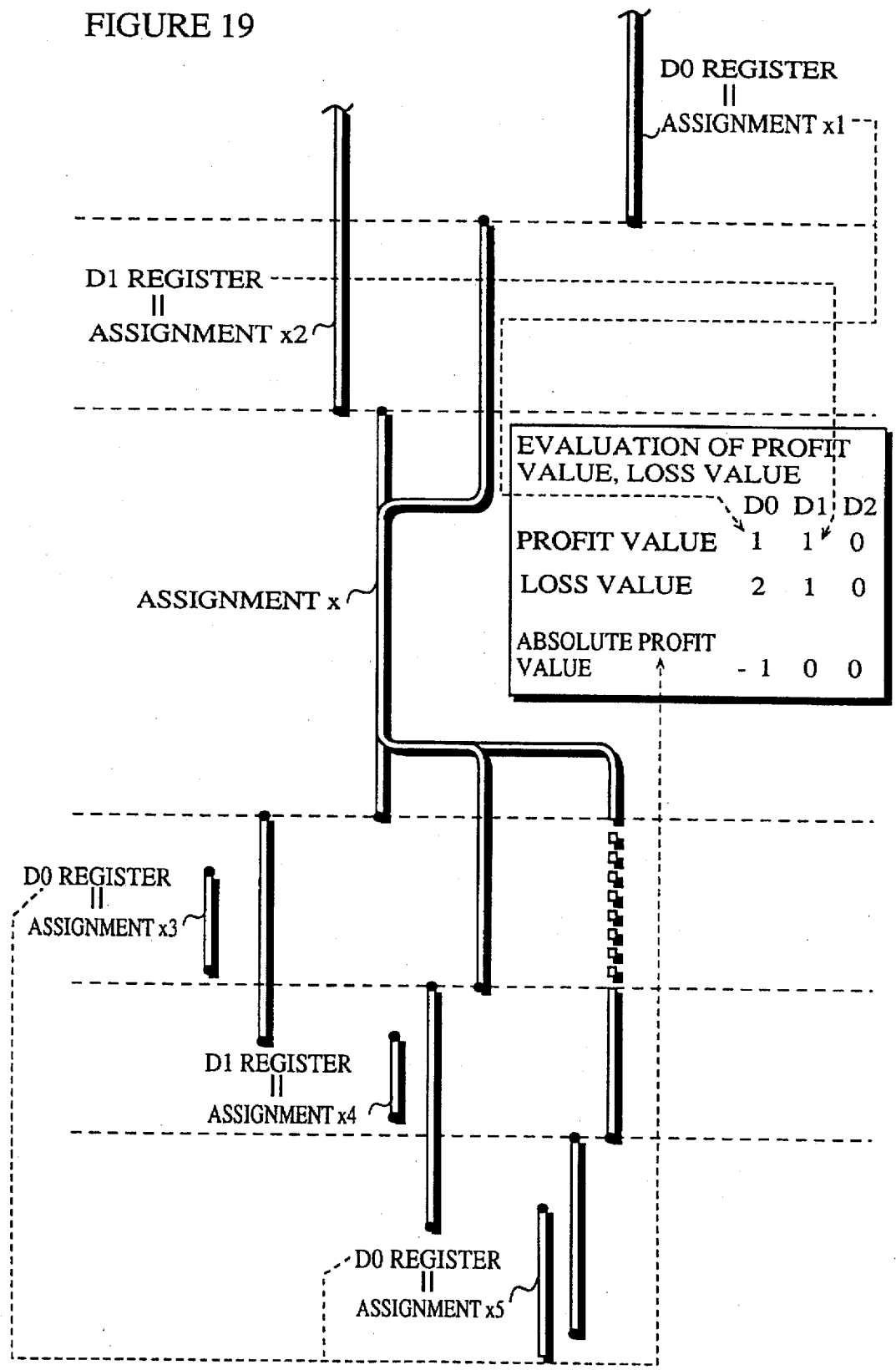
FIG. 19 is a drawing showing the procedure of the calculation of the profit value and the loss value based on the number of assignments with coherent relations.

(3) Using the Number of Assignments as a Base For Finding Local Profit Values and Local Loss Values The following is an explanation of this process with reference to FIG. 19. FIG. 19 shows a program part expressed using the same method as was used in FIGS. 17 and 18.

In FIG. 19, since the live range of the assignment x diverges, the vertical line which represents this live range also diverges. Since the upper end of the vertical line which represents the assignment x has an overlapping part with vertical line which represents the assignment x2, then it can be seen that the live range of assignment x interferes with that of assignment x2. Also, since the bottom part diverges into three parts which meet with three broken lines, it can be seen that 3 assignments have coherent relations with the assignment x. Also, interfering with live ranges of these assignments, there are the live ranges of the assignments x3, x4, x5 which are shown as being assigned to the resource elements D0, D1, D0, respectively. Assignments whose live ranges interfere with those of assignments with coherent relations, and are already assigned to resource elements, like these assignments x3, x4, x5, are called the loss assignment set Lo(x).

In this drawing, two of the elements in the assignment set of assignments with coherent relations with the assignment x are x1 and x2. Of these two, the assignment x1 has already been assigned to the resource element D0, while the assignment x2 has already been assigned to the resource element D1. On this occasion, the resource element minority assignment unit 12 sets the local profit value for the register D0 and the register D1 respectively at 1.

The resource element minority assignment unit 12 also finds Lo(x) for the assignment x. After finding Ov(x1) for the element x1 in R2(x) mentioned above, then it finds the elements in Ov(x1) which have already been assigned to a resource element. The assignments found in this way become Lo(x). Additionally, in FIG. 19, there are 3 elements, x3, x4, x5 in Lo(x), with x3 and x5 already being assigned to the register D0, and the assignment x4 being already assigned to the register D1. On such an occasion, the resource element minority assignment unit 12 sets the local loss value of the register D0 at 2 and the local loss value of the register D1 at 1.

Also, when the machine language instructions of the microprocessor of the target machine is of 2 operand format and the operands in the {numerical equation 3} above are for non-commutative operations such as subtraction or division, then the process for local loss value described above can be supplemented. This is because when the assignment which stores the operation result and the assignment on the right side of the operator (hereinafter referred to as the N-operand assignment) are assigned to the same resource element, then this generates a loss in that transmission instructions become further necessary when compared to the case when the assignment which stores the operation result and the assignment on the left side of the operator are assigned to the same resource element. The loss value for finding the extent of this kind of loss is calculated by the resource element minority assignment unit 12. More precisely, when the assignment x to be assigned is defined by a non-commutative operation, then the resource element minority assignment unit 12 retrieves the assignment x1 to be used as the N-operand. Also, the resource element minority assignment unit 12 retrieves the assignment x1 to be used as the assignment for storing the operation result. The resource element minority assignment unit 12 sets the retrieved assignments x1 as elements in the set T1(x) of assignments for non-commutative operations, and then finds the set T2(x) of elements out of the elements in T1(x) which have already been assigned to a resource element. When the one element in T2(x) is x1, then the resource element minority assignment unit 12 takes either the priority value of the assignment x1, or the weight of loop-nesting depth of step to which that non-commutative operand belongs, as the local loss value of the resource element to which x1 is assigned.

In the above calculation, the weight of loop-nesting depth is used. However, the operation frequency of each step may be used instead. On such an occasion, the inference values of the operation frequency of each step created by the programmer are stored in advance, and adding these values to the totals for each live range, are used as the parameters for the local profit value and the local loss value. Also, if the assignment process is repeated for the same resource, and an object program obtained by a previous resource assignment process is present, then it may use the operational frequency obtained by having that object program executed.

When the resource element majority assignment unit 16 finds that the number of resource elements, such as when the resource is memory, for the resources stored in the selection candidate set storage unit 10 is much larger than the number of assignments, then it assigns the assignments whose live ranges interfere separately to different resource elements.

Aside from the construction which has been so far explained, there are a number of functions necessary for the generation of a machine language program but, since they do not compose the gist of the present invention, their explanation has been omitted.

Figure 20:
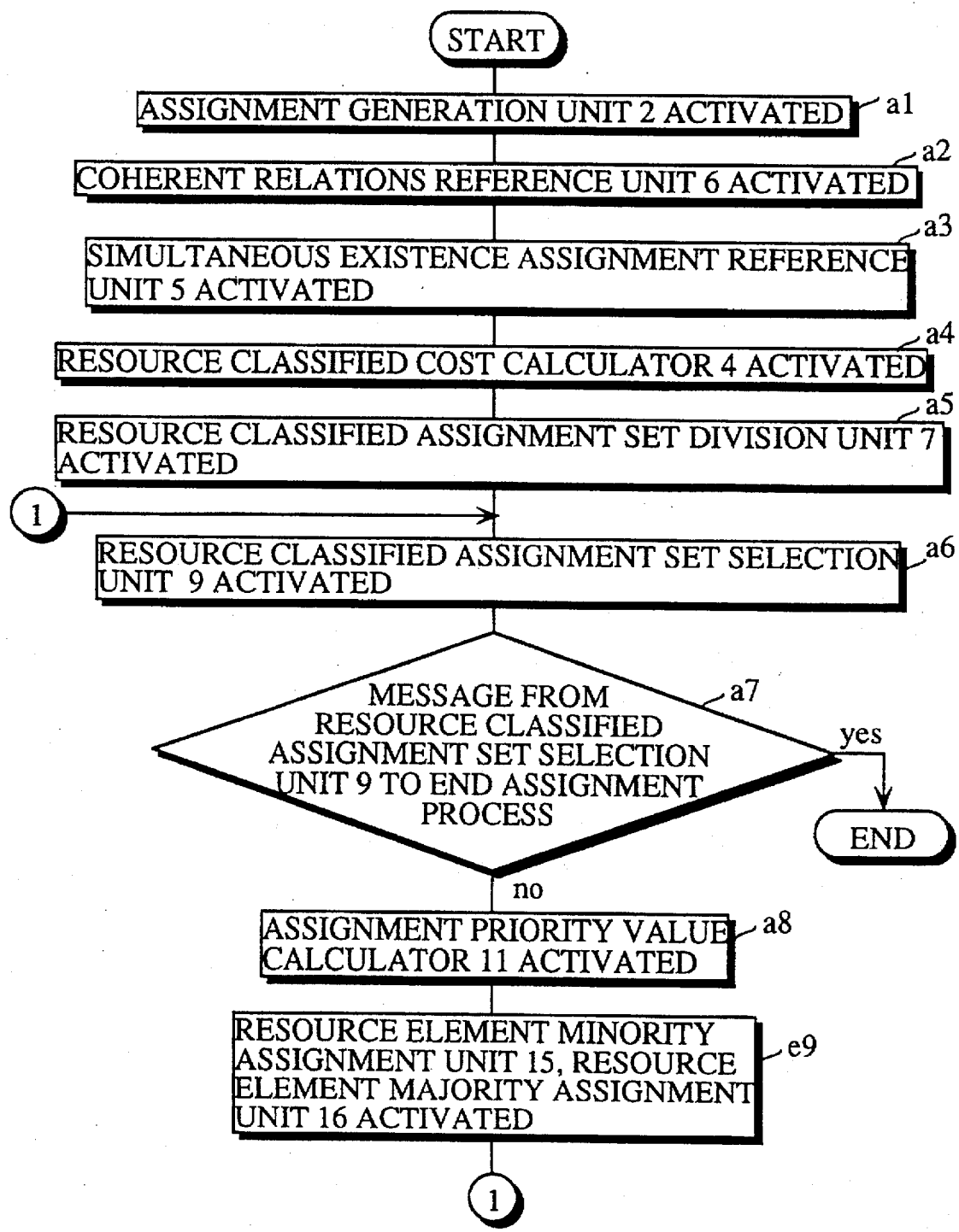
FIG. 20 is a flowchart showing the control process of the resource assignment control unit 1.

The following is an explanation of the precise operation of the resource assignment unit 33 constructed according to the present embodiment described above, with reference to the flowchart for the resource assignment control unit 1 shown in FIG. 20.

The resources of the target machine are comprised of an address register AR, a data register DR and a memory Mem. The resource AR is composed of the resource elements A0, A1, A2 while the resource DR is composed of the resource elements D0, D1, D2. Also, there are functional restrictions concerning each of the resources. The resource AR features an indirect reference function for the memory, while DR does not. Also, resource DR can be used as the operand for multiplication and division operations, while resource AR cannot. Registers D0 and A0 are established as the registers used as argument registers, return value registers and broken registers.

For the example program shown in FIG. 8, the basic blocks are extracted from the source program and the information for the variables and live ranges is obtained by the optimizing apparatus 22. The variables are shown in the same drawing as s, q, r, a, b, c, d, e, f, g, Ret, f1, and f2.

In this condition, the operation moves on to the resource assignment unit 33. The resource assignment control unit 1 then activates the assignment generation unit 2. The assignment generation unit 2 then generates the assignments (Step a1 in FIG. 20). As a result, the [assignments] information in FIG. 8B is obtained. Every variable and live range indicated by a black line is shown in the same drawing.

The assignment information shown in FIG. 8B is stored by the assignment storage unit which appears in FIG. 7. The resource assignment control unit 1 activates the coherent relations reference unit 6 and has the coherent relations of the various assignments investigated (Step a2 in FIG. 20).

As a result, the set R1(x) of assignments for a voluntary assignment x is obtained, as shown in FIG. 11B.

Next the resource assignment control unit 1 activates the simultaneous existence assignment reference unit 5. The simultaneous existence assignment reference unit 5 then finds out which assignments, out of the various assignments stored in the assignment storage unit 3, have live ranges that interfere (Step a3).

As a result, the information for Ov(x) which is the set of assignments whose live ranges interfere with the five range of a voluntary assignment x, as shown in FIG. 11A.

The resource classified cost calculator 4 is then activated, and the calculation (Step a4) of the inference cost values for each of the assignments x is executed based on the inference value table, before the resource classified assignment set division unit 7 is activated.

For the example shown in FIG. 8A, the resource classified assignment set division unit 7 takes out the assignment a (Step b1 in FIG. 13). Next, the resource AR and the resource DR are found as the lowest cost resources for the assignment a (Step b2). Since there is a plurality of lowest cost resources, the assignments which exhibit coherent relations with assignment a are found (Step b3). Since there are no such assignments, DR is selected as the lowest cost resource. Assignment a is then stored in the resource classified assignment set for resource DR (Step b8).

Next, the resource classified assignment set division unit 7 takes the assignment e (Step b1). It is then found that both AR and DR are the lowest cost resource for assignment e (Step b2). Since there are more than one lowest cost resource, the assignments which exhibit coherent relations with assignment a are found (Step b3), with the results being assignments b and f. Since there are assignments with coherent relations, then the assignment b which exhibits the strongest relation with assignment e is chosen (Step b4). The lowest cost resource for assignment b is then found, with the result being resource DR (Step b5). Since there is only one lowest cost resource, then the assignment e is stored in the resource classified assignment set for the resource DR (Step b9).

The above process is executed for all of the assignments. As a result, the resource classified assignment sets shown in FIG. 12 are obtained.

Next, the resource assignment control unit 1 activates the resource classified assignment set selection unit 9 and has the resource classified selection set executed (Step a6 in FIG. 20).

For the example shown in FIG. 12, since the resources to be assigned are DR, AR and Mem, then the resource classified assignment sets for them are all taken (Step c4 in FIG. 14). The resource selection priority ranking is then calculated. As a result of this calculation, the resource selection priority ranking of DR, AR, Mem is obtained. Since the resource with the highest resource selection priority ranking is DR, then the resource classified assignment set for the resource DR is selected (Step c5). The resource classified assignment set for the selected resource DR is then stored in the selection candidate set storage unit 10.

As a result of this operation, the resource classified assignment set (DR, {a, b, c, d, e, f, g}) is selected, and written into the selection candidate set storage unit 10.

Next, the resource assignment control unit 1 activates the assignment priority value calculator 11, and has the priority value and the assignment priority ranking for the various assignments decided (Step a8). In order to calculate the priority value, the Cost (DR,x) which is the inference cost for the voluntary assignment x and the live range information Ln(x) become necessary.

The lengths of the various live ranges of the assignments are shown by {numerical equation 4}.

{Numerical Equation 4}

$Ln(s)=4 \ Ln(q)=4 \ Ln(r)=9 \ Ln(a)=5$
$Ln(b)=6 \ Ln(c)=2 \ Ln(d)=1 \ Ln(e)=1$
$Ln(f)=1 \ Ln(g)=1$

From this information the priority values of the assignments are given in the following way.

| Assignment | d | f | e | g | c | b | a | Ret | f1 | f2 |
|---|---|---|---|---|---|---|---|---|---|---|
| Priority Value | 2 | 2 | 2 | 2 | 1.5 | 0.7 | 0.4 | 1 | 1 | 1 |

Assignments f1, f2, and Ret are all already assigned to a resource, but the weight of loop-nesting depth is given as the priority value of loop f1, f2, and Ret.

Next, the resource assignment control unit 1 activates the resource element minority assignment unit 12 and has the assignments assigned to the resource elements (Step a9). The assignments assigned here are those in the resource classified assignment set for the resource DR.

Figure 16:
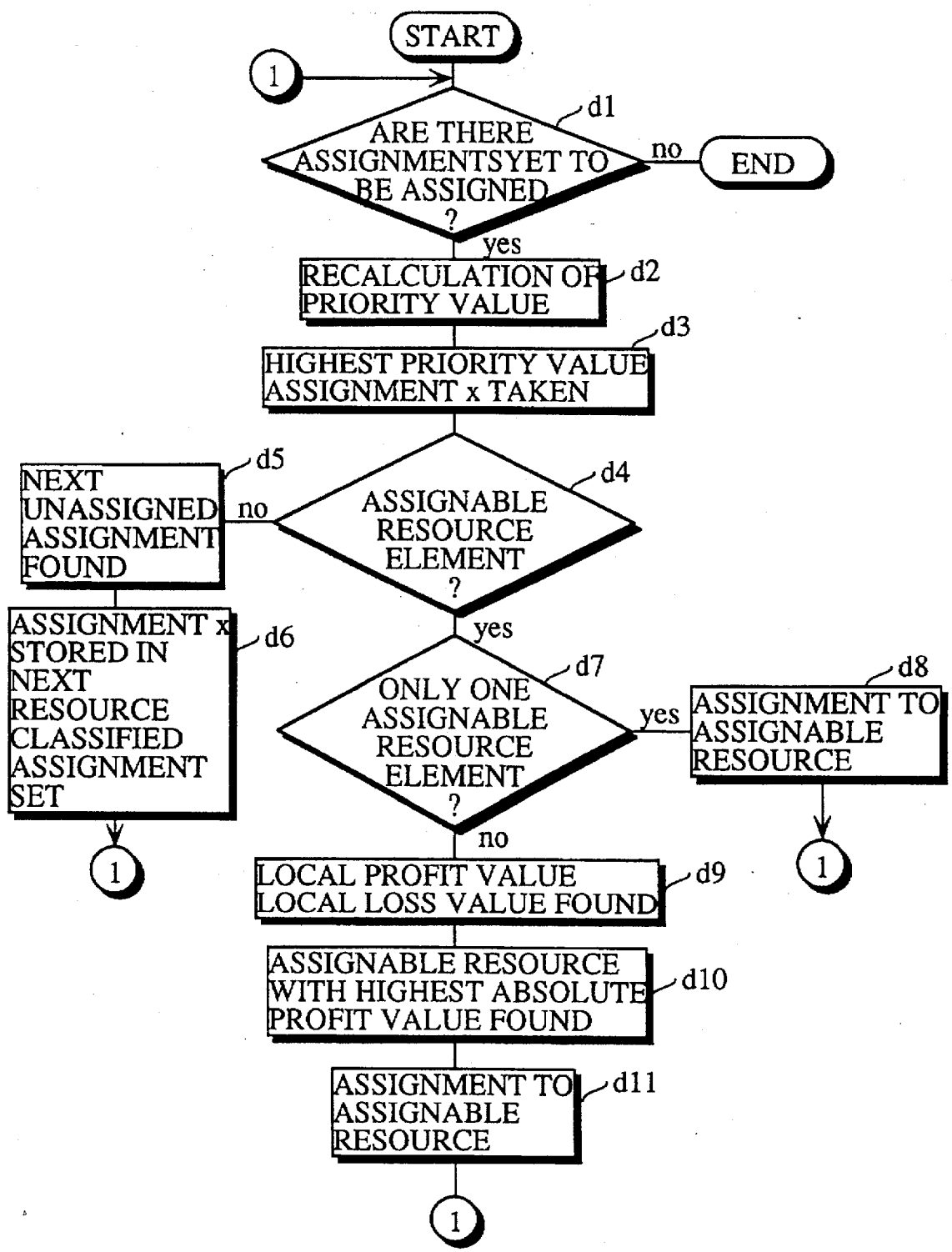
FIG. 16 is a flowchart for the showing the operational process of the resource element minority assignment unit 12.

The following is an explanation of the operational process of the resource element minority assignment unit 12 with reference to the flowchart shown in FIG. 16. In the following explanation, the priority values are used as they are to calculate the local profit values and local Loss values.

First, the resource element minority assignment unit 12 executes the determination as to whether there are any assignments yet to be assigned, and, from the assignments yet to be assigned, takes the assignment d which has the highest priority value (Step d3 in FIG. 16). Then it finds the assignments assigned to resource elements as Ov(d). Since there are no such elements, then it takes the resource elements D0, D1, D2 as the assignable resource elements (Step d4) (Step d7). Since there are 3 assignable resource elements, then, in order to find the local profit values and the local loss values for the various resource elements, it investigates whether there are any assignments which have already been assigned to resource elements are present in R1(d) which shows coherent relations. If there are none present, then the it investigates whether there are any present in the Ov(c) of the assignment c which is an element in R1(d). The resource element minority assignment unit 12 then searches out the assignment f1 from Ov(c). The priority value of the assignment c is then added to the local loss value of the resource element D0 to which the assignment f1 is assigned (Step d9). Since the resource elements D1 and D2 are the resource elements with high absolute profit values, then out of them resource element D1 is selected and the assignment d is assigned to it (Step d10).

Next, the resource element minority assignment unit 12 takes out the assignment f which has the second ranked priority value (Step d3). As with assignment d before, the assignments which have already been assigned to a resource element are sought from Ov(f). Since there are no such assignments, then it takes the resource elements D0, D1, D2 as the assignable resource elements (Step d4),(Step d7). Since there are 3 assignable resources, then, in order to find the local profit values and the local loss values for the various resource elements, it investigates whether there are any assignments which have already been assigned present in R1(f). Since none are present in R1(f), then it does not change the local profit values or the local loss values (Step d9). Since the local profit values and the local loss values are the same, then the assignment f is assigned to the resource element D0 (Step d10–d11).

Next, the resource element minority assignment unit 12 takes out the assignment e which has the third ranked priority value (Step d3). The assignments which have already been assigned to a resource element are sought from Ov(e). Since there are no such assignments, then it takes the resource elements D0, D1, D2 as the assignable resource elements (Step d4),(Step d7). Since there are several assignable resources, then, in order to find the local profit values and the local loss values, the assignments which have already been assigned to a resource element in R1(e) are first investigated. On this occasion there is no such assignment. Next, the assignments which have not been assigned to a resource element in R1(e) are investigated. Subsequently, the resource element minority assignment unit 12 takes out the assignment b. Since the live range of the assignment b interferes with those of the assignments f1, f2 which have already been assigned to D0, then the priority value of assignment b is added to the local loss value of the resource element D0 (Step d9). Next, the resource element minority assignment unit 12 takes out the assignment f. Since assignment f has been assigned to the resource element D0, then the priority value of assignment f is added to the local profit value. Since the local absolute profit values for the resource elements are ranked 1.3, 0, 0, then the assignment e is assigned to the resource element D0 which has the highest absolute local profit.

Next, the resource element minority assignment unit 12 takes out the assignment g which has the fourth ranked priority value (Step d3). The assignments which have already been assigned to a resource element are sought from Ov(g). Since there are no such assignments, then it takes the resource elements D0, D1, D2 as the assignable resource elements (Step d4),(Step d7). Then, in order to find the local profit values and the local loss values, the assignments which have already been assigned to a resource element in R1(g) are investigated. As a result, assignments f and Ret are found. Since the assignments f, Ret have already been assigned to the resource element D0, then the priority values of the assignments f, Ret are added to the local profit value of the resource element D0 (Step d9). The assignment g is then assigned to the resource element D0 which has the highest absolute profit value.

Next, the resource element minority assignment unit 12 takes out the assignment c which has the fifth ranked priority value(Step d3). The assignments which have already been assigned to a resource element are sought from Ov(c), with the assignment f1 being thus found. Since the assignment f1 has been assigned to the resource element D0, then the resource elements D1, D2 are taken as the assignable resource elements (Step d4) (Step d7). Then, in order to find the local profit values and the local loss values for the resource elements D1,D2, the assignments which have already been assigned to a resource element in R1(c) are investigated. As a result, the resource element minority assignment unit 12 finds the assignment d. Since assignment d has already been assigned to the resource element D1, then the priority value of the assignment d is added to the local profit value of the resource element D1 (Step d9). The assignment c is then assigned to the resource element D1 which has the highest absolute profit value.

Next, the resource element minority assignment unit 12 takes out the assignment b which has the sixth ranked priority value (Step d3). The assignments which have already been assigned to a resource element are sought from Ov(b), with the assignments f1, f2, c, d being thus found. Since assignments f1, f2, c, d have already been assigned to the resource elements D0 and D1, then resource element D2 is taken as the assignable resource element for assignment b (Step d4) (Step d7). The assignment b is then assigned to the resource element D2 (Step d8).

Next, the resource element minority assignment unit 12 takes out the assignment a which has the seventh ranked priority value (Step d3). The assignments which have already been assigned to a resource element are sought from Ov(a), with the assignments f1, b, c, d being thus found. These assignments f1, b, c, d have already been assigned to the resource elements D0, D1, and D2 (Step d4). Since there is no assignable resource element, then the resource AR is found as the next unassigned resource (Step d5). Assignment a is then stored in the resource classified assignment set for the resource AR (Step d6). The resource classified assignment set for the resource AR then becomes (AR,{a, s, q, r}).

By means of the operation described above, the assignment operation for the resource classified assignment set for the resource DR is executed, and the various assignments are assigned as shown below.

| Assignment | d | f | e | 9 | c | b |
|---|---|---|---|---|---|---|
| Resource element | D1 | D0 | D0 | D0 | D1 | D2 |

In the same way, the assignment operation for the resource classified assignment set for the resource AR is executed, and the various resource elements of the resource AR are assigned.

Having assigned the assignments to the resource elements of DR, AR, then, in order to assign the remaining assignments to the resource elements of the Mem resource, the resource assignment control unit 1 activates the resource element majority assignment unit 16. The resource element majority assignment unit 16 assigns assignments to the resource elements of the Mem resource. In doing this, if the resource classified assignment set selection unit 9 has selected the resource classified assignment sets of all the resources, then it notifies the resource assignment control unit 1 of process completion (Step a16), and, on receiving this, the resource assignment control unit 1 terminates the operation of the resource assignment apparatus.

By using the present invention in this way, then, by means of the assignment process for assigning assignments to resource elements, it becomes possible to decide very precisely the assignment state of the resource elements to which the assignments are assigned, with a thorough cost evaluation being carried out. As a result the number of assignments which are assigned to the memory becomes remarkably small, with the number of transmission instructions between the memory and the registers and between the registers themselves being reduced, so that it is possible to improve the program size and the execution time of the machine language program which is finally generated. When the target machine has only a small number of registers, then the improvements in program size and in execution time are especially noticeable.

Additionally, when there are resources which are split into three or more kinds of function, then since it can select the suitable number of resource elements for assigning the assignments, then, for the program development of integrated use microprocessors which are equipped with a plurality of resources with different functions for reducing limiting the hardware cost, by using the compiler of the present invention, it becomes possible to generate a machine language program which makes full use of the different functions featured in such a microprocessor.

Embodiment 2

Figure 21:
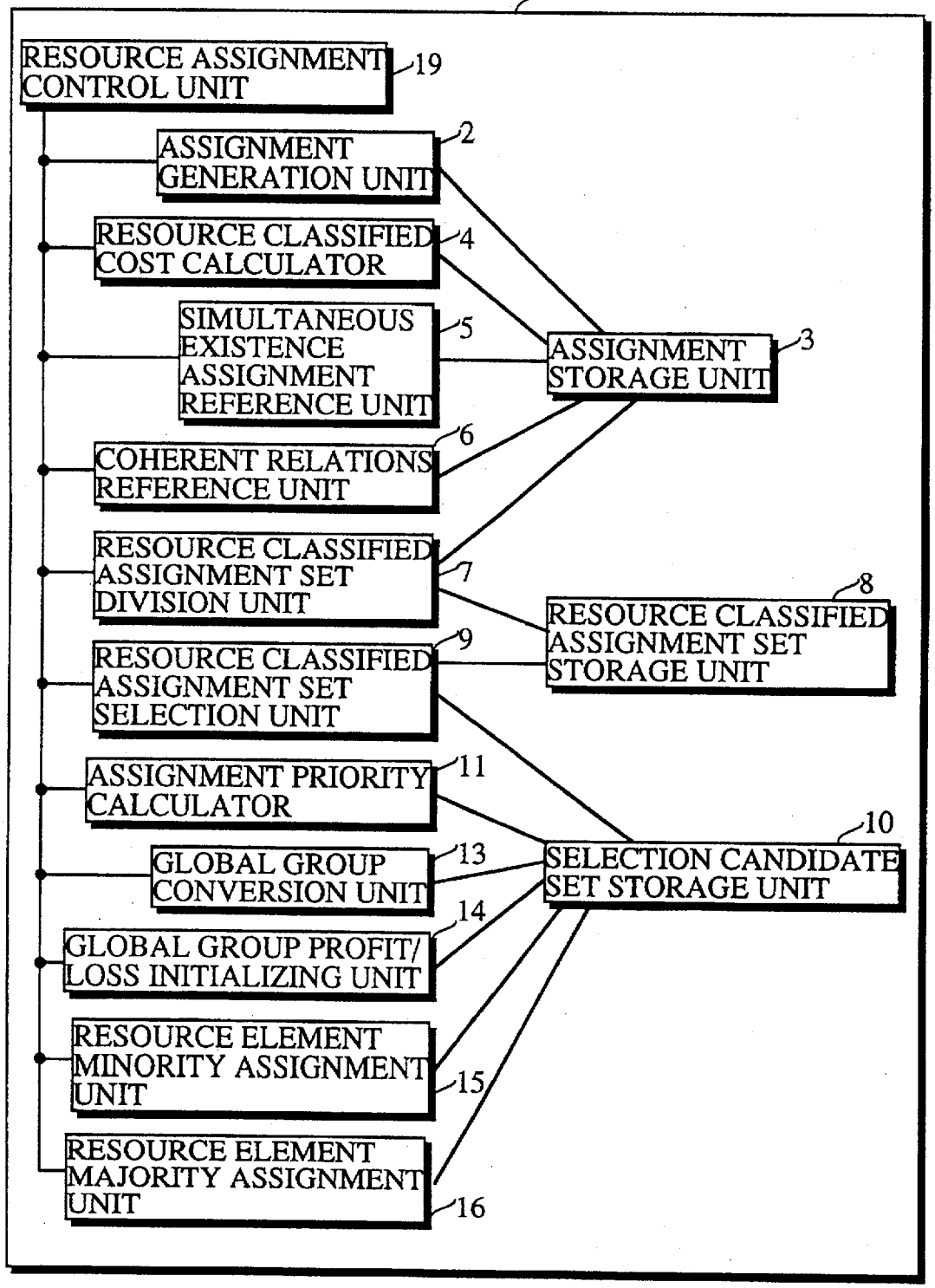
FIG. 21 is a drawing showing a construction of the resource assignment apparatus 35 in embodiment 2.

FIG. 21 shows the construction of a resource assignment apparatus 35 according to the embodiment 2 of the present invention. In this drawing, the construction elements which are the same as those featured in the resource assignment apparatus 33 of the first embodiment have been given the same reference numbers and their explanation has been omitted, so that only the differences will be described.

In addition to the construction of the resource assignment apparatus 33, the resource assignment apparatus 35 also features a global group conversion unit 13, and a global profit/loss value initializing unit 14. Also, the resource assignment apparatus 19 has been installed in place of the resource assignment apparatus 1, and the resource element minority assignment unit 15 has been installed in place of the resource element minority assignment unit 12.

The global group conversion unit 13 takes the assignments converted into sets by the resource classified assignment set division unit 7 and further groups them together. The groups created by this grouping are the groups of assignments out of the resource classified assignment sets whose live ranges continue one after the other, and are called global groups. The following is an explanation of the operational process of the global group conversion unit 13 with reference to the drawing in FIG. 22. In the example program shown in FIG. 22 (the same as that shown in FIG. 8) the global groups are shown as the groups comprised of the assignments b, e, f, g, Ret and of the assignments c, d shown as being encircled by the lines e11 and e12.

The above global group conversion sets, as one member of the group, the assignment x1 which exhibits coherent relations, found by referencing the coherent relations R1(x), then, for this assignment taken into the group, again refers to the coherent relations R1(x1), setting the assignment x2 included therein as a member of the group. From here on the same process is repeated, and with regard to the assignment taken into the group, the coherent relations R1(x2), R1(x3), R1(x4) . . . are referenced, and the assignments x1, x2, x3, x4 . . . are set as members of the group in the order they are obtained.

The global profit/loss value initializing unit 14 creates the global profit value table and the global loss value table corresponding to the various global groups created by the global group conversion unit 13, and executes the initializing. The global profit value table and the global loss value table, as shown in FIG. 22, store the information corresponding the resource elements to which the assignments in the global group can be assigned and the global profit value and global loss value of these resource elements.

Here, the global profit value is the total of the global profits. The global profit can reduce the number of transmission instructions in the program, and hence reduce the memory size and execution time of object program, by assigning the assignments belonging to the global groups to the same resource element.

On the other hand, the global loss value is the total of the global losses. The global loss is the increase in the total number of transmission instructions in the program, caused by assigning the assignments belonging to the global groups to the same resource element, meaning an increase in the memory size and the execution time of the object program.

Examples of the global groups, the global profit value tables, and the global loss value tables are shown in FIG. 22.

The member composition of every global group is shown in the frames in this drawing, with the character rows [Global group G1], [Global group G2], [Global group G3] being written directly below. The contents of the frame labelled [Global group G1] are [c], [d] showing that assignments [c], [d] are members of global group G1. In the same way, the contents of the frame labelled [Global group G2] are [b], [e], [f], [g], [Ret] showing that assignments [b], [e], [f], [g], [Ret] are members of global group G2. Above these frames in FIG. 22, there is a frame showing the resource classified assignment set for the resource DR, with assignments [c], [d] and [b], [e], [f], [g], [Ret] being surrounded by curved lines, with these curved lines showing the members of the global groups out of the assignments in the resource classified assignment set.

To the top right and the bottom right of the frame labelled [Global group G1] are two tables, each composed of six cells, which are the global profit value table and the global loss value table for the [Global group G1]. In these tables, the upper row of cells shows the resource elements in the aforementioned resource classified assignment set, while the lower row shows the global profit or loss values of each of the resource elements. The lower row of the global profit value table G1 is written as [0] [0] [0], showing that the global profit values of [D0], [D1], and [D2], are all [0]. Also, in the lower row of the global loss value table G1, the value [1.5] is written in below the cell for the resource element [D0], showing that the global loss value for the resource element D0 is [1.5].

The following is an explanation of the operational process of the global profit/loss value initializing unit 14. The global profit/loss value initializing unit 14 creates a tables containing only the number of cells equal to the number of resource elements in the target machine. Next, it writes in the initial values of the global profit values and the global loss values, this being the initializing of the global profit values and the global loss values of the resource elements to which assignments have already been assigned, such as the registers used as argument registers, broken registers or return value registers and suchlike, for the groups containing such resource elements.

This initializing process will be explained by means of an example of a voluntary assignment x. The global profit/loss value initializing unit 14 first takes out the assignment x which is a member of the global group G. If this assignment x has already been assigned to a resource element, then the priority value Of the assignment x is written in as the global profit of that resource element. Next, it searches out any assignments which have already been assigned to a resource element and whose live range interferes with that of assignment x. If such an assignment is found, then the priority value of the assignment x is written in as the global loss value of that resource element. Aside from the resource elements described above, the global profit values and global loss values of the resource elements to which assignments have not been assigned are all set to an initial value of 0.

Figure 25:
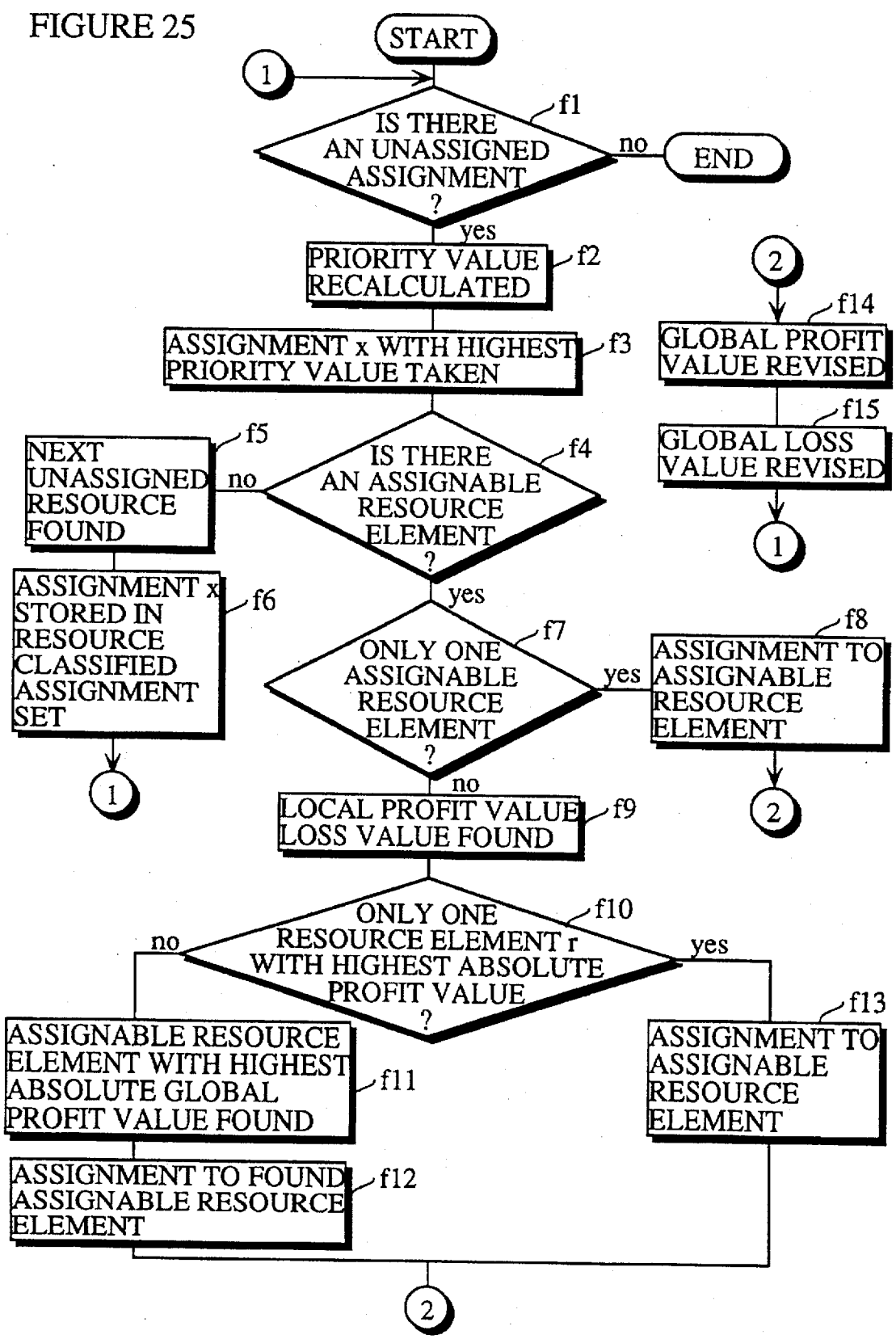
FIG. 25 is a flowchart for the assignment resource assigning unit 15.

The resource element minority assignment unit 15 executes the same operation as the resource element minority assignment unit 12. The difference, as shown in the flowchart in FIG. 25, is that when there is a plurality of resource elements to which assignments can be assigned and the local absolute profit values of these resource elements are equal (Steps f4, f7, f9, f10 in FIG. 25), then it finds the difference between the between the global profit value and the global loss value given in the global profit value table and the global loss value table, and assigns the assignment to the resource element with the highest absolute profit given by this difference (Steps f11, f12 in FIG. 25). Also, when the assignments are assigned to resource elements, then it will revise the global profit values and the global loss values. (Step f14,f15).

Figure 23:
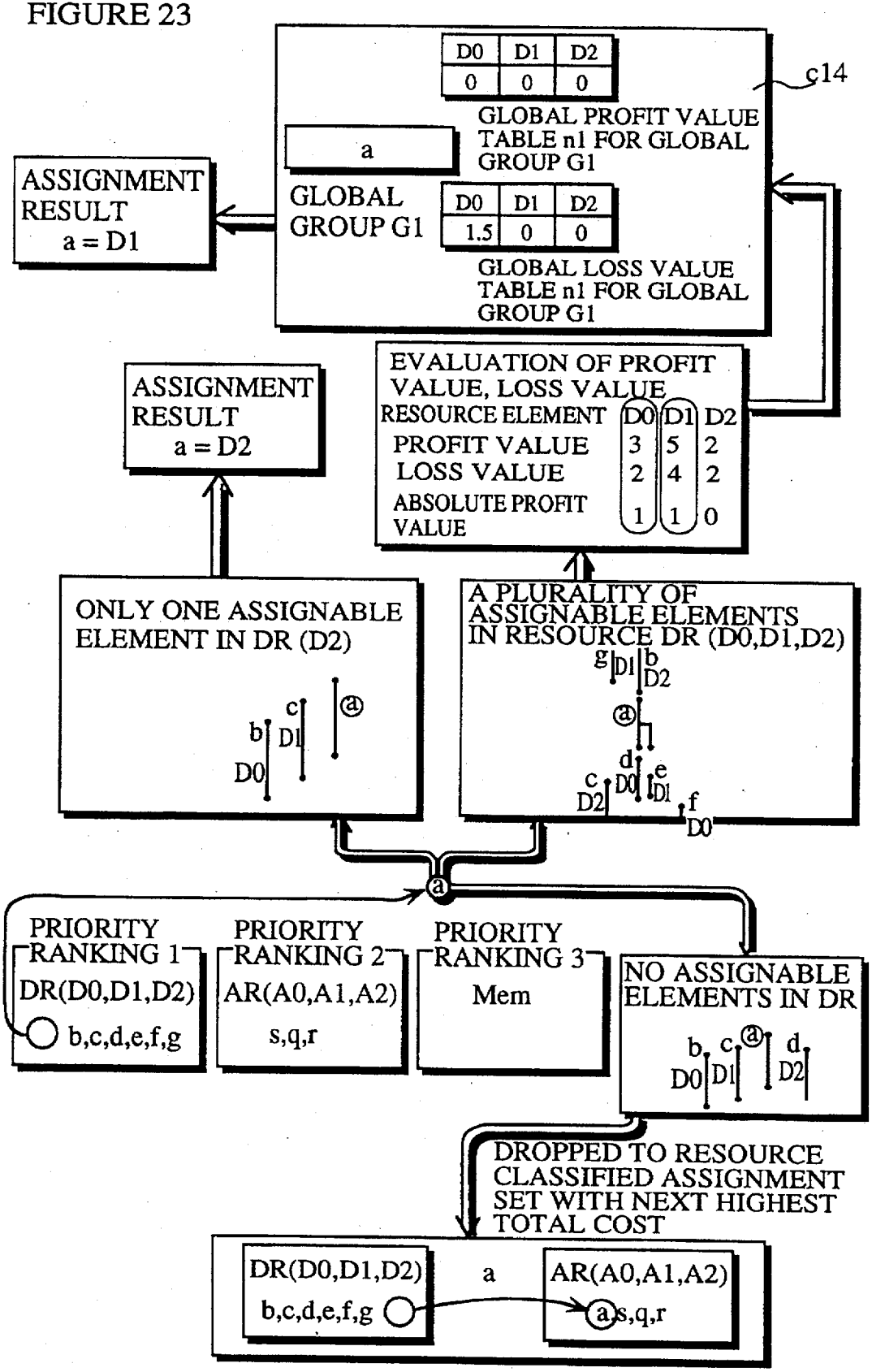
FIG. 23 is a drawing showing the procedural stages of the assignment resource assigning unit 15.

The above process is shown in FIG. 23. The following is an explanation of this FIG. 23. FIG. 23 resembles the drawing shown in FIG. 15, but an additional arrow and frame have been added at the top. In this drawing, the local absolute profit value of the resource element D0 is shown to be [1] and the local absolute profit value of the resource element D1 is also shown to be [1] in the frame labelled [Evaluation of Profit Value/Loss Value]. Also, an arrow extends away from the right of this frame to a frame in which the global group, the global profit value table and the global loss value table shown in FIG. 22 are recorded. This shows that since the local absolute profit value for D0 and the local absolute profit value for D1 are both [1], the resource element minority assignment unit 15 refers to the global profit value table and the global loss value table. In this figure, the global profit values for the resource elements D0, D1, D2 are all respectively [0], while the global loss values are [1.5], [0], [0]. Since D1 and D2 have the largest absolute global profits, then the resource element minority assignment unit 15 assigns the assignment a to the resource element D1.

Figure 24:
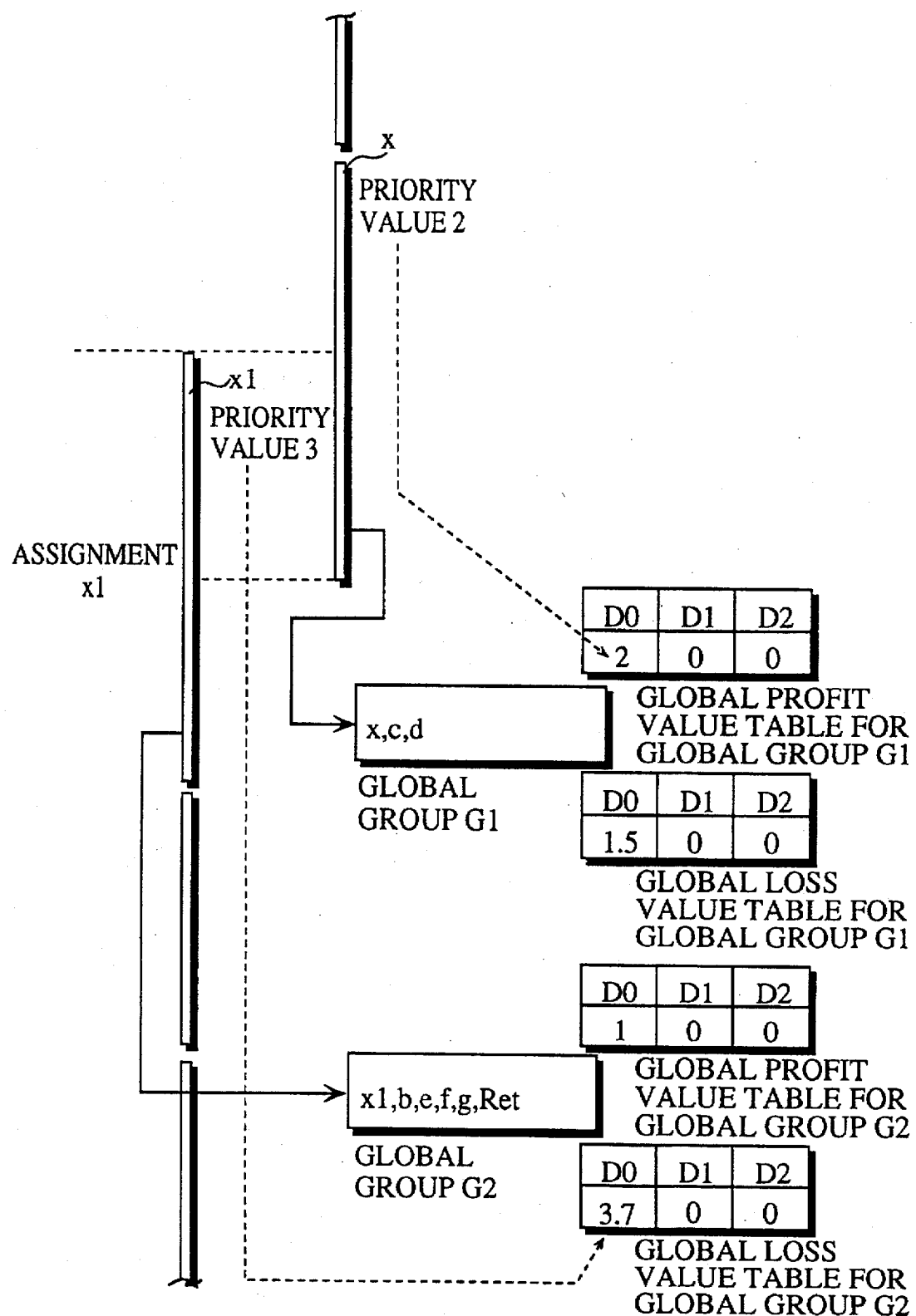
FIG. 24 is a drawing showing the calculation of the global profit value and the global loss value.

The following is an explanation of the revision of the global profit values table and the global loss value tables with reference to the drawing in FIG. 24.

In this drawing, the assignment x is set as the assignment which has just been assigned to a resource element D0, with x1 set as the assignment whose live range interferes with that of assignment x.

The live ranges of the assignments are shown in this drawing by the thick white lines, while the thick solid line indicates the live range of the assignment x which has just been assigned. An arrow extends away from the vertical line for assignment x, with the frame representing the global group G1 lying at the head of the arrow, showing at the assignment x is a member of the global group G1. Also, it can be seen that the vertical line which represents the live range of assignment x interferes with the vertical line which represents the live range of the assignment x1, with an arrow also extending away from this second vertical line representing the assignment x1 to the frame representing the global group G2. This shows that the assignment x1 is a member of the global group G2. In the same drawing, a broken line arrow has been drawn from the numeral [2] representing the priority value of assignment x to the cell in the global profit value table for the global group G1, which shows that the priority value [2] of assignment x is added to the global profit value of the resource element to which assignment x is assigned.

A broken line arrow has been drawn from the numeral [3] representing the priority value of assignment x1 to the cell in the global profit value table for the global group G2, which shows that the priority value [3] of assignment x1 is added to the global profit value of the resource element to which assignment x1 is assigned.

The resource element minority assignment unit 15, as shown in this drawing, finds the global group G1 to which assignment x belongs, after assigning the assignment x to a resource element. Next, it takes the global profit value table for the global group G1, and adds the priority value of the assignment x to the global profit value of the resource element to which assignment x has been assigned. It then takes the assignment x1 whose live range interferes with that of assignment x. It then takes the global profit value table for the global group G2 to which the assignment x1 belongs, and adds the priority value of the assignment x1 to the global loss value of the resource element to which x was assigned in the table. Also, when the assignment x is used as an N operand of a non-commutative operation as described above, then it retrieves the assignment x1 used for storing the operational result of that operation, or when the operational result is to be stored by the assignment x, then it retrieves the assignment x1 which is to become the N operand, before in both cases adding the priority value of the assignment x1 to the global loss value of the global group G1 to which the assignment x1 belongs.

Alternatively, the number of assigned assignments in an above global group may also be used in calculating the global profit values and the global loss values.

In such a case, the global profit values are calculated so as to equal the number of assignments which have been assigned to each resource element in the global group to which the assignment x belongs, while the global loss values are calculated so as to equal the number of assignments which have been assigned to each resource element in the global group to which the assignment x1 belongs.

Also, the global profit value may be used as the total of the local profit value.

Figure 26:
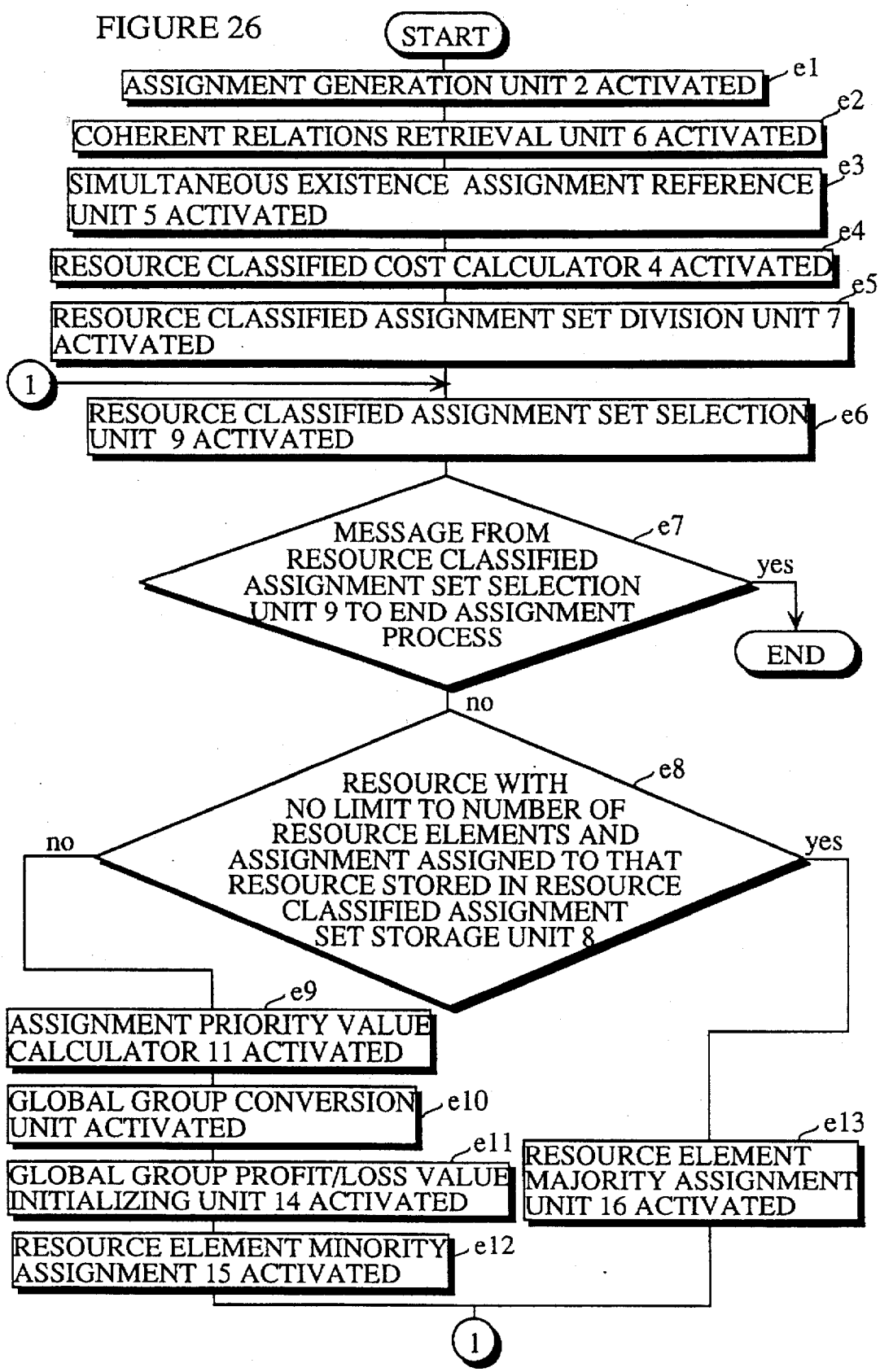
FIG. 26 is a flowchart for the resource assignment control unit 19.

The following is an explanation of the operation of the resource allocation apparatus 35 constructed in the manner described above, with reference to the flowchart in FIG. 26. FIG. 26 is the flowchart for the resource assignment control unit 19.

The explanation of the components which are equivalent to those in the resource assignment unit 33 has been omitted and only the differences will be explained. For the program shown in FIG. 8, through the operation of the resource assignment unit 35 the resource classified assignment sets described above are obtained, and then the resource classified assignment set (DR, {a, b, c, d, e, f, g}) is selected by the resource classified assignment set selection unit 9 (Steps e1 through e6 in FIG. 26).

The resource assignment control unit 19 then investigates the number of resource elements in the resource DR (Step e8). Since the resource Mem will usually have far more resource elements then the number of assignments, then it may be regarded as a resource with unlimited resource elements. That is to say, the resource Mem is operated by the resource element majority assignment unit 16. Since the assignable resource is DR, which has only a limited number of resource elements, the resource assignment control unit 19 then activates the assignment priority value calculator 11 (Step e8) (Step e9).

After it has activated the assignment priority value calculator 11, the resource assignment control unit 19 activates the global group conversion unit 13 (Step e10). The global group conversion unit 13 forms the 3 global groups shown by {numerical equation 5}. These groups are outputted as the global group table.

{numerical equation 5}

$$G1=\{c,d\}, G2=\{b, e, f, g, Ret\}, G3=\{a\}$$

Next, the resource assignment control unit 19 activates the global profit/loss value initializing unit 14. The global profit/loss value initializing unit 14 then creates the global profit value tables and the global loss value tables for the various global groups, and writes in the initial values. The following is an explanation of the operation for the global groups G1 and G2.

The global profit/loss value initializing unit 14 first selects the global group G1, and takes out the assignment c. It then investigates whether the assignments f1, f2, or Ret, which are assignments which have already been assigned to resource elements, are present as elements in Or(c) shown in FIG. 11A. As a result, the global profit/loss value initializing unit 14 finds the assignment f1, and accordingly writes in the priority value of assignment c [1.5] as the global loss value for the resource element D0 for the global group G1. Next, it takes out the assignment d, and, as with the assignment c, investigates Ov(d). Since none of the above assignments appear as elements in Ov(d), the global profit values and global loss values are not revised. The remaining global cost values and global loss values are then written in as 0, and the initial values of the global profit value table and the global loss value table are given as shown below.

Global profit value table for global group G1

| Resource element | D0 | D1 | D2 |
|---|---|---|---|
| Global profit value | 0 | 0 | 0 |

Global loss value table for global group G1

| Resource element | D0 | D1 | D2 |
|---|---|---|---|
| Global loss value | 1.5 | 0 | 0 |

Next, global profit/loss value initializing unit 14 selects the global group G2 and takes out the assignment b. In the same way as with assignments c and d, it investigates the elements of Ov(b), finding f1, f2, and Ret. Since assignments f1 and f2 have been found, then the priority value of assignment b [0.7] is written in as the global loss value of the resource element D0. Subsequently, the assignments e, f, g are taken and Or(e), Ov(f) and O(G) are investigated. Since the assignments f1, f2, Ret are not present in these sets of elements, then the global profit values and global loss values are not revised. Next, global profit/loss value initializing unit 14 takes the assignment Ret. Since this assignment Ret has already been assigned to the resource element D0, then the priority value of the assignment Ret [1] is written in as the global profit value for the resource element D0. [0] is then written into the remaining cells for the other resource elements. As a result of the above operation, the initial values of the global profit value table and the global loss value table for the global group G2 are given as shown below (Step e11).

Global profit value table for global group G2

| Resource element | D0 | D1 | D2 |
|---|---|---|---|
| Global profit value | 1 | 0 | 0 |

Global loss value table for global group G2

| Resource element | D0 | D1 | D2 |
|---|---|---|---|
| Global loss value | 0.7 | 0 | 0 |

After this, the same process is executed for global group G3, and the global profit value tables and the global loss value tables are outputted as shown in FIG. 22.

Next, the resource assignment control unit 19 activates the resource element minority assignment unit 15 and the assignments are assigned to resource elements. The assignment process that is executed here is for the resource classified assignment set for resource DR. The following is as explanation of the resource assignment process carried out by the resource element minority assignment unit 15, with reference to the flowchart in FIG. 25.

First the resource element minority assignment unit 15 takes the assignment d with the highest priority value and, executing the same process as the resource element minority assignment unit 12, finds that the assignable resource elements with the highest local absolute profit value are D1, D2 (Steps f1, f3–f10). Since there are two assignable resource elements which have the same local absolute profit value, then it finds the resource element with the highest global profit value (Step f11). It searches out the global group G1 to which the assignment d belongs, and by referring to the global profit value table and the global loss value table for the global group G1, finds that the resource element D1 has the highest absolute global profit (Step f12). Since the assignment the assignment d was assigned to the resource element D1, then the priority value of the assignment d is added to the global profit value for the resource element D1 in the global group G1 to which the assignment d belongs (Step f14). In order to revise the global loss value tables of the other global groups, the resource element minority assignment unit 15 investigates to which global groups the assignments r, a, b which are shown in FIG. 11A to be elements in Ov(d) belong. On finding that the assignment b belongs to global group G2, the resource element minority assignment unit 15 adds the priority value of the assignment b to the global loss value for the global group G2 (Step f15). Accordingly, when the assignment d is assigned to the resource element D1, then the global profit value table of the global group G1 and the global loss value table of the global group G2 are given as shown below.

Global profit value table for global group G1

| Resource element | D0 | D1 | D2 |
|---|---|---|---|
| Global profit value | 0 | 2 | 0 |

Global loss value table for global group G2

| Resource element | D0 | D1 | D2 |
|---|---|---|---|
| Global loss value | 0.7 | 0.7 | 0 |

Next, the resource element minority assignment unit 15 takes the assignment f with the second highest priority value, and, by executing the same process as the resource element minority assignment unit 12, finds that the assignable resource elements are D0, D1, D2 (Steps f3–f10). Since there are three assignable resource elements which have the same local absolute profit value, then it searches out the global group G2 to which the assignment f belongs, and finds that the resource element D0 has the highest absolute global profit. The assignment f is then assigned to this resource element DO (Step f12). Since it has been assigned to resource element D0, the resource element minority assignment unit 15 adds the priority value of the assignment f to the global profit value of the resource element D0 in the global group G2 to which assignment f belongs (Step f14). In order to revise the global loss value tables for the other global groups, then it investigates Ov (f) in the same way as with assignment d before, but, since there are no elements in Ov(f), does not revise the global loss value table for any of the global groups (Step f15). The global profit table for when assignment f has been assigned is shown below.

Global profit value table for global group G2

| Resource element | D0 | D1 | D2 |
|---|---|---|---|
| Global profit value | 3 | 0 | 0 |

Next, the resource element minority assignment unit 15 takes the assignment e with the third highest priority value, and, by executing the same process as the resource element minority assignment unit 12, assigns the assignment e to the resource element D0 (Steps f3–f13). Finding that assignment e belongs to the global group G2, it adds the priority value of assignment e to the global profit value for resource element D0 (Step f14). In order to revise the global loss value tables for the other global groups, then it investigates Ov (e) in the same way as with assignments d, f before, but, since there are no elements in Ov(e), does not revise the global loss value table for any of the global groups (Step f15). The global profit table for when assignment e has been assigned is shown below.

Global profit value table for global group G2

| Resource element | D0 | D1 | D2 |
|---|---|---|---|
| Global profit value | 5 | 0 | 0 |

Next, the resource element minority assignment unit 15 takes the assignment g with the fourth highest priority value, and, by executing the same process as the resource element minority assignment unit 12, assigns the assignment g to the resource element D0 (Steps f3–f13). Finding that assignment g belongs to the global group G2, it adds the priority value of assignment g to the global profit value for resource element D0 (Step f14). In order to revise the global loss value tables for the other global groups, then it investigates Ov (g) in the same way as with assignments d, f, e before, but, since there are no elements in Ov(g), does not revise the global loss value table for any of the global groups (Step f15). The global profit table for when assignment g has been assigned is shown below.

Global profit value table for global group G2

| Resource element | D0 | D1 | D2 |
|---|---|---|---|
| Global profit value | 7 | 0 | 0 |

Next, the resource element minority assignment unit 15 takes the assignment c with the fifth highest priority value, and, by executing the same process as the resource element minority assignment unit 12, assigns the assignment c to the resource element D1 (Steps f3–f13). Finding that assignment c belongs to the global group G1, it adds the priority value of assignment c to the global profit value for resource element D1 (Step f14). In order to revise the global loss value tables for the other global groups, then it investigates which global groups the elements in Ov(c) belong to, in the same way as with assignments d, f, e, g before. Since assignment b belongs to global group G2, then priority value of assignment b is added to the global loss value of the resource element D1 for the global group G2 (Step f15). The global profit table for global group G1 and the global loss table for global group G2 when assignment c has been assigned are shown below.

Global profit value table for global group G1

| Resource element | D0 | D1 | D2 |
|---|---|---|---|
| Global profit value | 0 | 3.5 | 0 |

Global loss value table for global group G2

| Resource element | D0 | D1 | D2 |
|---|---|---|---|
| Global loss value | 0.7 | 1.4 | 0 |

Next, the resource element minority assignment unit 15 takes the assignment b with the sixth highest priority value, and, by executing the same process as the resource element minority assignment unit 12, assigns the assignment b to the resource element D2 (Steps f3–f8). Finding that assignment b belongs to the global group G2, it adds the priority value of assignment b to the global profit value for resource element D2 (Step f14). In order to revise the global loss value tables for the other global groups, then it investigates which global groups the elements in Ov(b) belong to, in the same way as with assignments d, f, e, g, c before. Since the assignments c, d belong to global group G1, the priority values of assignments c, d are added to the global loss value for resource element D1 (Step f15). The global profit table for global group G2 and the global loss table for global group G1 when assignment c has been assigned are shown below.

Global profit value table for global group G2

| Resource element | D0 | D1 | D2 |
|---|---|---|---|
| Global profit value | 7 | 0 | 0.7 |

Global loss value table for global group G1

| Resource element | D0 | D1 | D2 |
|---|---|---|---|
| Global loss value | 1.5 | 0 | 3.5 |

Next, the resource element minority assignment unit 15 takes the assignment a with the seventh highest priority value, and executes the same process as the resource element minority assignment unit 12 (Steps f3–f6).

As a result of the above assignment operation, the resource elements of the resource DR are paired with assignments in the way shown below.

| Assignment | d | f | e | g | c | b |
|---|---|---|---|---|---|---|
| Resource element | D1 | D0 | D0 | D0 | D1 | D2 |

Also, if the assignment process is executed for the resource AR, then the pairings of resource elements and assignments will be formed as shown below.

| Assignment | a | s | p | r |
|---|---|---|---|---|
| Resource element | A1 | A0 | A1 | A2 |

The resource classified assignment set selection unit 9 then takes the resource classified assignment set for the resource Mem (Step e6). Since the resource Mem has an abundance of resource elements, the resource assignment control unit 16 activates the resource element majority assignment unit 16 (Step e13). The resource classified assignment set selection unit 9 then informs the resource assignment control unit 19 that there are no more resources to select (Step e6). On receiving the notification from the resource classified assignment set selection unit 9, the resource assignment control unit 19 then terminates the process (step e7).

By using the present invention in this way, by referring over a wide range as to how the coherent ranges are for all of the assignments in the program, resource assignment can be executed in a efficient manner. As a result, there is considerable improvement in the program size and execution time of the machine language program which is finally generated.

Although the present invention has been fully described by way of examples with reference to the accompanying drawings, it is to be noted that various changes and modifications will be apparent to those skilled in the art. Therefore, unless such changes and modifications depart from the scope of the present invention, they should be construed as being include therein.

What is claimed is:

1. A resource assignment apparatus used by a compiler which compiles programs written in a high-level language into programs written in machine language for assigning assignments which are a pairing of variables and live ranges in a program to separate resource elements which make up resources, divided up according to function, such as registers and memory, according to a priority value of the assignment, comprising:

assignment storage means for storing the assignments in a program and their priority values;

first resource element assigning means for taking an assignment with a highest priority value from the assignment storage means and assigning the assignment with the highest priority value to a resource element;

assigning result storage means for storing assigning results;

assignment retrieval means for retrieving from the assignment storage means an assignment which has a next highest priority value after a priority value of an assignment which has just been assigned;

interfering assignment extraction means for extracting assignments whose live ranges interfere with a live range of the assignment retrieved by the assignment retrieval means;

same resource remaining resource element determination means for determining whether there are any resource elements of resources which perform a same function as each of the resource elements to which the assignments extracted by the interfering assignment extraction means have been assigned by referring to the assigning result storage means;

coherent assignment retrieval means for retrieving the assignments for which, by referring to the starting point and end point of the live range, a starting point is coincident with the end point of the assignment retrieved by the assignment retrieval means and assignments for which an end point is coincident with the starting point of the assignment retrieved by the assignment retrieval means;

succession resource element determination means for determining the resource element to which the assignments retrieved by the coherent assignment retrieval means are assigned, by referring to the assigning result storage means;

second resource element assigning means for assigning, when there is only one resource element determined by the same resource remaining element determination means, the assignment retrieved by the assignment retrieval means to the resource element, for assigning the assignment taken by the assignment retrieval means to any resource element which is the determination result of the same resource remaining resource element determination means and, moreover, the determination result of the succession resource element determination means, when there is a plurality of resource elements determined by the same resource remaining resource element determination means and a resource element determined by the succession resource element determination means exists, and for storing the assigning result in the assigning result storage means;

control means for repeatedly having the assignment retrieval means activated, until all of the assignments have been assigned;

profit value calculation means for calculating a profit value which shows how memory size and/or execution time are reduced for a machine language program after compiling if an assignment is assigned to one of the resource elements determined by the same resource remaining resource element determination means, for each of the resource elements determined by the same resource remaining resource element determination means;

loss value calculation means for calculating a loss value which shows how memory size and/or execution time are increased for a machine language program after compiling if an assignment is assigned to one of the resource elements determined by the same resource remaining resource element determination means for each of the resource elements determined by the same resource remaining resource element determination means;

secondary interfering assignment extraction means for retrieving assignments which have live ranges which interfere with the live ranges of the assignments retrieved by the coherent assignment retrieval means, but are not the retrieved results of the interfering assignment extraction means; and first loss occurring resource element determination means for determining to which resource elements the assignments which are the retrieval results of the secondary interfering assignment retrieval means are assigned, by referring to the assigning result storage means;

wherein the loss value calculation means calculates loss values of the resource elements determined by the first loss occurring resource element determination means based on the priority values of the assignments determined by the coherent assignment determination means and, moreover, whose live range interferes with the live range of the assignment which is assigned to each of the resource elements, with the loss values of all of the resource elements aside from the resource element determined by the first loss occurring resource element determination means being set at 0.

2. The resource assignment apparatus of claim 1, wherein the second resource element assigning means comprises:

first assigning means for assigning, when there is only one resource element determined by the same resource remaining resource element determination means, the assignment taken by the assignment retrieval means to the resource element;

second assigning means for assigning the assignment taken by the assignment retrieval means to any of the resource elements determined by the same resource remaining resource element determination means when there is a plurality of resource elements determined by the same resource remaining resource element determination means and there is no corresponding resource element determined by the succession resource element determination means; and third assigning means for assigning the assignment taken by the assignment retrieval means to any of the resource elements determined as the determination result of the same resource remaining resource element determination means and, moreover, determined as the determination result of the succession resource element determination means, when there is a plurality of resource elements determined by the same resource remaining resource element determination means and a resource element determined by the succession resource element determination means exists.

3. The resource assignment apparatus of claim 2, further comprising:

profit value calculation means for calculating the profit value which shows how memory size and/or execution time are reduced for a machine language program after compiling if an assignment is assigned to one of the resource elements determined by the same resource remaining resource element determination means, for each of the resource elements determined by the same resource remaining resource element determination means;

loss value calculation means for calculating the loss value which shows how memory size and/or execution time are increased for a machine language program after compiling if an assignment is assigned to one of the resource elements determined by the same resource remaining resource element determination means, for each of the resource elements determined by the same resource remaining resource element determination means; and greatest difference resource element determination means for calculating a difference between the profit value and the loss value and determining which resource elements have a greatest difference;

wherein the third assigning means assigns the assignments retrieved by the assignment retrieval means to one of the resource elements determined by the greatest difference resource element determination means.

4. The resource assignment apparatus of claim 3, wherein the profit value calculation means calculates the profit value for the resource element determined by the succession resource element determination means based on the priority values of the assignments assigned to the resource element, with the profit values of the resource elements aside from the resource element determined by the succession resource element determination means being set to equal 0.

5. A resource assignment apparatus used by a compiler which compiles programs written in a high-level language into programs written in machine language for assigning assignments which are a pairing of variables and live ranges in a program to separate resource elements which make up resources, divided up according to function, such as registers and memory, according to a priority value of the assignment, comprising:

assignment storage means for storing the assignments in a program and their priority values;

first resource element assigning means for taking an assignment with a highest priority value from the assignment storage means and assigning the assignment with the highest priority value to a resource element;

assigning result storage means for storing assigning results;

assignment retrieval means for retrieving from the assignment storage means an assignment which has a next highest priority value after a priority value of an assignment which has just been assigned;

interfering assignment extraction means for extracting assignments whose live ranges interfere with a live range of the assignment retrieved by the assignment retrieval means;

same resource remaining resource element determination means for determining whether there are any resource elements of resources which perform a same function as each of the resource elements to which the assignments extracted by the interfering assignment extraction means have been assigned by referring to the assigning result storage means;

coherent assignment retrieval means for retrieving the assignments for which, by referring to the starting point and end point of the live range, a starting point is coincident with the end point of the assignment retrieved by the assignment retrieval means and assignments for which an end point is coincident with the starting point of the assignment retrieved by the assignment retrieval means;

succession resource element determination means for determining the resource element to which the assignments retrieved by the coherent assignment retrieval means are assigned, by referring to the assigning result storage means;

second resource element assigning means for assigning, when there is only one resource element determined by the same resource remaining element determination means, the assignment retrieved by the assignment retrieval means to the resource element, for assigning the assignment taken by the assignment retrieval means to any resource element which is the determination result of the same resource remaining resource element determination means and, moreover, the determination result of the succession resource element determination means, when there is a plurality of resource elements determined by the same resource remaining resource element determination means and a resource element determined by the succession resource element determination means exists, and for storing the assigning result in the assigning result storage means, the second resource element assigning means comprising:

first assigning means for assigning, when there is only one resource element determined by the same resource remaining resource element determination means, the assignment taken by the assignment retrieval means to the resource element;

second assigning means for assigning the assignment taken by the assignment retrieval means to any of the resource elements determined by the same resource remaining resource element determination means when there is a plurality of resource elements determined by the same resource remaining resource element determination means and there is no corresponding resource element determined by the succession resource element determination means; and third assigning means for assigning the assignment taken by the assignment retrieval means to any of the resource elements determined as the determination result of the same resource remaining resource element determination means and, moreover, determined as the determination result of the succession resource element determination means, when there is a plurality of resource elements determined by the same resource remaining resource element determination means and a resource element determined by the succession resource element determination means exists;

control means for repeatedly having the assignment retrieval means activated, until all of the assignments have been assigned;

profit value calculation means for calculating a profit value which shows how memory size and/or execution time are reduced for a machine language program after compiling if an assignment is assigned to one of the resource elements determined by the same resource remaining resource element determination means, for each of the resource elements determined by the same resource remaining resource element determination means;

loss value calculation means for calculating a loss value which shows how memory size and/or execution time are increased for a machine language program after compiling if an assignment is assigned to one of the resource elements determined by the same resource remaining resource element determination means, for each of the resource elements determined by the same resource remaining resource element determination means;

greatest difference resource element determination means for calculating a difference between the profit value and the loss value and determining which resource elements have a greatest difference, wherein the third assigning means assigns the assignments retrieved by the assignment retrieval means to one of the resource elements determined by the greatest difference resource element determination means, and wherein the profit value calculation means calculates the profit value for the resource element determined by the succession resource element determination means based on the priority values of the assignments assigned to the resource element, with the profit values of the resource elements aside from the resource element determined by the succession resource element determination means being set to equal 0;

secondary interfering assignment extraction means for retrieving assignments which have live ranges which interfere with the live ranges of the assignments retrieved by the coherent assignment retrieval means, but are not the retrieved results of the interfering assignment extraction means; and first loss occurring resource element determination means for determining to which resource elements the assignments which are the retrieval results of the secondary interfering assignment retrieval means are assigned, by referring to the assigning result storage means, wherein the loss value calculation means calculates loss values of the resource elements determined by the first loss occurring resource element determination means based on the priority values of the assignments determined by the coherent assignment determination means and, moreover, whose live range interferes with the live range of the assignment which is assigned to each of the resource elements, with the loss values of all of the resource elements aside from the resource element determined by the first loss occurring resource element determination means being set at 0.

6. The resource assignment apparatus of claim 5, further comprising:

non-commutative operation definition determination means for determining whether the assignment taken by the assignment retrieval means is defined by a non-commutative operation such as subtraction and division; and second loss occurring resource element retrieval means for retrieving, when the non-commutative operation definition determination means determines that the assignment is defined as a non-commutative operation, a resource element to which an assignment which is on a right side of an operator of the non-commutative operation is assigned, wherein, once the second loss occurring resource element retrieval means has retrieved the resource element, the loss calculation means adds the priority values of the assignments which is assigned to the resource element to the loss value of the resource element which is the determination result of the second loss occurring resource element retrieval means.

7. The resource assignment apparatus of claim 5, further comprising:

non-commutative operation operand determination means for determining whether the assignment taken by the assignment retrieval means is on a right side of an operator of a non-commutative operation such as subtraction and division; and third loss occurring resource element retrieval means for retrieving a resource element to which the assignment defined by the non-commutative operation is assigned, once the non-commutative operation operand determination means has determined that the assignment is on the right side;

wherein, once the third loss occurring resource element retrieval means has retrieved the resource element, the loss calculation means adds the priority values of the assignments which are assigned to the resource element to the loss value of the resource element which is the retrieved result of the third loss occurring resource element retrieval means.

8. A resource assignment apparatus used by a compiler which compiles programs written in a high-level language into programs written in machine language for assigning assignments which are a pairing of variables and live ranges in a program to separate resource elements which make up resources, divided up according to function, such as registers and memory, according to a priority value of the assignment, comprising:

assignment storage means for storing the assignments in a program and their priority values;

first resource element assigning means for taking an assignment with a highest priority value from the assignment storage means and assigning the assignment with the highest priority value to a resource element;

assigning result storage means for storing assigning results;

assignment retrieval means for retrieving from the assignment storage means an assignment which has a next highest priority value after a priority value of an assignment which has just been assigned;

interfering assignment extraction means for extracting assignments whose live ranges interfere with a live range of the assignment retrieved by the assignment retrieval means:

same resource remaining resource element determination means for determining whether there are any resource elements of resources which perform a same function as each of the resource elements to which the assignments extracted by the interfering assignment extraction means have been assigned by referring to the assigning result storage means;

coherent assignment retrieval means for retrieving the assignments for which, by referring to the starting point and end point of the live range, a starting point is coincident with the end point of the assignment retrieved by the assignment retrieval means and assignments for which an end point is coincident with the starting point of the assignment retrieved by the assignment retrieval means;

succession resource element determination means for determining the resource element to which the assignments retrieved by the coherent assignment retrieval means are assigned, by referring to the assigning result storage means;

second resource element assigning means for assigning, when there is only one resource element determined by the same resource remaining element determination means, the assignment retrieved by the assignment retrieval means to the resource element, for assigning the assignment taken by the assignment retrieval means to any resource element which is the determination result of the same resource remaining resource element determination means and, moreover, the determination result of the succession resource element determination means, when there is a plurality of resource elements determined by the same resource remaining resource element determination means and a resource element determined by the succession resource element determination means exists, and for storing the assigning result in the assigning result storage means, the second resource element assigning means comprising:

first assigning means for assigning, when there is only one resource element determined by the same resource remaining resource element determination means, the assignment taken by the assignment retrieval means to the resource element;

second assigning means for assigning the assignment taken by the assignment retrieval means to any of the resource elements determined by the same resource remaining resource element determination means when there is a plurality of resource elements determined by the same resource remaining resource element determination means and there is no corresponding resource element determined by the succession resource element determination means; and third assigning means for assigning the assignment taken by the assignment retrieval means to any of the resource elements determined as the determination result of the same resource remaining resource element determination means and, moreover, determined as the determination result of the succession resource element determination means, when there is a plurality of resource elements determined by the same resource remaining resource element determination means and a resource element determined by the succession resource element determination means exists;

control means for repeatedly having the assignment retrieval means activated until all of the assignments have been assigned;

profit value calculation means for calculating a profit value which shows how memory size and/or execution time are reduced for a machine language program after compiling if an assignment is assigned to one of the resource elements determined by the same resource remaining resource element determination means, for each of the resource elements determined by the same resource remaining resource element determination means;

loss value calculation means for calculating a loss value which shows how memory size and/or execution time are increased for a machine language program after compiling if an assignment is assigned to one of the resource elements determined by the same resource remaining resource element determination means, for each of the resource elements determined by the same resource remaining resource element determination means:

greatest difference resource element determination means for calculating difference between the profit value and the loss value and determining which resource elements have a greatest difference;

wherein the third assigning means assigns the assignments retrieved by the assignment retrieval means to one of the resource elements determined by the greatest difference resource element determination means; and loop-nesting depth level retrieval means for retrieving a loop-nesting depth level of each of the loops in the program;

wherein the profit value calculation means calculates the profit value for the resource element determined by the succession resource element determination means based on the loop-nesting depth levels of the assignments assigned to the resource element, with the profit values of the resource elements aside from the resource element determined by the succession resource element determination means being set to equal 0.

9. The resource assignment apparatus of claim 8, further comprising:

secondary interfering assignment extraction means for retrieving assignments which have live ranges which interfere with the live ranges of the assignments retrieved by the coherent assignment retrieval means, but are not the retrieved results of the interfering assignment extraction means; and first loss occurring resource element determination means for determining to which resource elements the assignments which are the retrieval results of the secondary interfering assignment retrieval means are assigned, by referring to the assigning result storage means, wherein the loss value calculation means calculates loss values of the resource elements determined by the first loss occurring resource element determination means based on the loop-nesting depth levels of each of the assignments determined by the coherent assignment determination unit and, moreover, whose live range interferes with the live range of the assignment which are assigned to the resource element, with the loss values of all of the resource elements aside from the resource element determined by the loss occurring resource element determination means being set at 0.

10. The resource assignment apparatus of claim 9, further comprising:

non-commutative operation definition determination means for determining whether the assignment taken by the assignment retrieval means is defined by a non-commutative operation such as subtraction and division; and second loss occurring resource element retrieval means for retrieving, when the non-commutative operation definition determination means determines that the assignment is defined as a non-commutative operation, a resource element to which an assignment which is on a right side of an operator of the non-commutative operation is assigned;

wherein, once the second loss occurring resource element retrieval means has retrieved the resource element, the loss calculation means adds the loop-nesting depth levels of the assignments which are assigned to the resource elements to the loss value of the resource element which is the determination result of the second loss occurring resource element retrieval means.

11. The resource assignment apparatus of claim 10, further comprising:

non-commutative operation operand determination means for determining whether the assignment taken by the assignment retrieval means is on a right side of an operator of a non-commutative operation such as subtraction and division; and third loss occurring resource element retrieval means for retrieving a resource element to which the assignment defined by the non-commutative operation is assigned, once the non-commutative operation operand determination means has determined that the assignment is on the right side;

wherein, once the third loss occurring resource element retrieval means has retrieved the resource element, the loss calculation means adds the loop-nesting depth levels of the assignments which are assigned to the resource element to the loss value of the resource element which is the retrieved result of the third loss occurring resource element retrieval means.

12. A resource assignment apparatus used by a compiler which compiles programs written in a high-level language into programs written in machine language for assigning assignments which are a pairing of variables and live ranges in a program to separate resource elements which make up resources, divided up according to function, such as registers and memory, according to a priority value of the assignment, comprising:

assignment storage means for storing the assignments in a program and their priority values;

first resource element assigning means for taking an assignment with a highest priority value from the assignment storage means and assigning the assignment with the highest priority value to a resource element;

assigning result storage means for storing assigning results;

assignment retrieval means for retrieving from the assignment storage means an assignment which has a next highest priority value after a priority value of an assignment which has just been assigned;

interfering assignment extraction means for extracting assignments whose live ranges interfere with a live range of the assignment retrieved by the assignment retrieval means;

same resource remaining resource element determination means for determining whether there are any resource elements of resources which perform a same function as each of the resource elements to which the assignments extracted by the interfering assignment extraction means have been assigned by referring to the assigning result storage means;

coherent assignment retrieval means for retrieving the assignments for which, by referring to the starting point and end point of the live range, a starting point is coincident with the end point of the assignment retrieved by the assignment retrieval means and assignments for which an end point is coincident with the starting point of the assignment retrieved by the assignment retrieval means;

succession resource element determination means for determining the resource element to which the assignments retrieved by the coherent assignment retrieval means are assigned, by referring to the assigning result storage means;

second resource element assigning means for assigning, when there is only one resource element determined by the same resource remaining element determination means, the assignment retrieved by the assignment retrieval means to the resource element, for assigning the assignment taken by the assignment retrieval means to any resource element which is the determination result of the same resource remaining resource element determination means and, moreover, the determination result of the succession resource element determination means, when there is a plurality of resource elements determined by the same resource remaining resource element determination means and a resource element determined by the succession resource element determination means exists, and for storing the assigning result in the assigning result storage means, the second resource element assigning means comprising:

first assigning means for assigning, when there is only one resource element determined by the same resource remaining resource element determination means, the assignment taken by the assignment retrieval means to the resource element;

second assigning means for assigning the assignment taken by the assignment retrieval means to any of the resource elements determined by the same resource remaining resource element determination means when there is a plurality of resource elements determined by the same resource remaining resource element determination means and there is no corresponding resource element determined by the succession resource element determination means;

third assigning means for assigning the assignment taken by the assignment retrieval means to any of the resource elements determined as the determination result of the same resource remaining resource element determination means and, moreover, determined as the determination result of the succession resource element determination means, when there is a plurality of resource elements determined by the same resource remaining resource element determination means and a resource element determined by the succession resource element determination means exists;

control means for repeatedly having the assignment retrieval means activated, until all of the assignments have been assigned;

profit value calculation means for calculating a profit value which shows how memory size and/or execution time are reduced for a machine language program after compiling if an assignment is assigned to one of the resource elements determined by the same resource remaining resource element determination means, for each of the resource elements determined by the same resource remaining resource element determination means;

loss value calculation means for calculating a loss value which shows how memory size and/or execution time are increased for a machine language program after compiling if an assignment is assigned to one of the resource elements determined by the same resource remaining resource element determination means, for each of the resource elements determined by the same resource remaining resource element determination means; and greatest difference resource element determination means for calculating a difference between the profit value and the loss value and determining which resource elements have a greatest difference;

wherein the third assigning means assigns the assignments retrieved by the assignment retrieval means to one of the resource elements determined by the greatest difference resource element determination means; and wherein the profit value calculation means calculates the profit value for the resource element determined by the succession resource element determination means, based on a number of assignments out of the retrieved results of the coherent assignment retrieval means which are assigned to the resource element, with the profit values of the resource elements aside from the resource element determined by the succession resource element determination means being set to equal 0.

13. The resource assignment apparatus of claim 12, further comprising:

secondary interfering assignment extraction means for retrieving assignments which have live ranges which interfere with the live ranges of the assignments retrieved by the coherent assignment retrieval means, but are not the retrieved results of the interfering assignment extraction means; and first loss occurring resource element determination means for determining to which resource elements the assignments which are the retrieval results of the secondary interfering assignment retrieval means are assigned, by referring to the assigning result storage means;

wherein the loss value calculation means calculates loss values of the resource elements determined by the first loss occurring resource element determination means based on the number of assignments which are assigned determined by the coherent assignment determination unit and, moreover, whose live range interferes with the live ranges of the assignments which are assigned to the resource element, with the loss values of all of the resource elements aside from the resource element determined by the loss occurring resource element determination means being set at 0.

14. A resource assignment apparatus used by a compiler which compiles programs written in a high-level language into programs written in machine language for assigning assignments which are a pairing of variables and live ranges in a program to separate resource elements which make up resources, divided up according to function, such as registers and memory, according to a priority value of the assignment, comprising:

assignment storage means for storing the assignments in a program and their priority values;

first resource element assigning means for taking an assignment with a highest priority value from the assignment storage means and assigning the assignment with the highest priority value to a resource element;

assigning result storage means for storing assigning results;

assignment retrieval means for retrieving from the assignment storage means an assignment which has a next highest priority value after a priority value of an assignment which has just been assigned;

interfering assignment extraction means for extracting assignments whose live ranges interfere with a live range of the assignment retrieved by the assignment retrieval means:

same resource remaining resource element determination means for determining whether there are any resource elements of resources which perform a same function as each of the resource elements to which the assignments extracted by the interfering assignment extraction means have been assigned by referring to the assigning result storage means;

coherent assignment retrieval means for retrieving the assignments for which, by referring to the starting point and end point of the live range, a starting point is coincident with the end point of the assignment retrieved by the assignment retrieval means and assignments for which an end point is coincident with the starting point of the assignment retrieved by the assignment retrieval means;

succession resource element determination means for determining the resource element to which the assignments retrieved by the coherent assignment retrieval means are assigned, by referring to the assigning result storage means;

second resource element assigning means for assigning, when there is only one resource element determined by the same resource remaining element determination means, the assignment retrieved by the assignment retrieval means to the resource element, for assigning the assignment taken by the assignment retrieval means to any resource element which is the determination result of the same resource remaining resource element determination means and, moreover, the determination result of the succession resource element determination means, when there is a plurality of resource elements determined by the same resource remaining resource element determination means and a resource element determined by the succession resource element determination means exists, and for storing the assigning result in the assigning result storage means, the second resource element assigning means comprising:

first assigning means for assigning, when there is only one resource element determined by the same resource remaining resource element determination means, the assignment taken by the assignment retrieval means to the resource element;

second assigning means for assigning the assignment taken by the assignment retrieval means to any of the resource elements determined by the same resource remaining resource element determination means when there is a plurality of resource elements determined by the same resource remaining resource element determination means and there is no corresponding resource element determined by the succession resource element determination means; and third assigning means for assigning the assignment taken by the assignment retrieval means to any of the resource elements determined as the determination result of the same resource remaining resource element determination means and, moreover, determined as the determination result of the succession resource element determination means, when there is a plurality of resource elements determined by the same resource remaining resource element determination means and a resource element determined by the succession resource element determination means exists;

control means for repeatedly having the assignment retrieval means activated, until all of the assignments have been assigned;

profit value calculation means for calculating a profit value which shows how memory size and/or execution time are reduced for a machine language program after compiling if an assignment is assigned to one of the resource elements determined by the same resource remaining resource element determination means, for each of the resource elements determined by the same resource remaining resource element determination means;

loss value calculation means for calculating a loss value which shows how memory size and/or execution time are increased for a machine language program after compiling if an assignment is assigned to one of the resource elements determined by the same resource remaining resource element determination means, for each of the resource elements determined by the same resource remaining resource element determination means;

greatest difference resource element determination means for calculating a difference between the profit value and the loss value and determining which resource elements have a greatest difference;

wherein the third assigning means assigns the assignments retrieved by the assignment retrieval means to one of the resource elements determined by the greatest difference resource element determination means; and execution frequency storage means for storing a frequency which shows how often each step in the program is executed corresponding to every step in the program; and execution frequency totalling means for totalling the frequencies of steps in the program for every assignment stored in the assignment storage means, setting the corresponding totalled values as the execution frequency of every assignment;

wherein the profit value calculation means calculates the profit value for the resource element determined by the succession resource element determination means based on the execution frequencies of the assignments assigned to the resource element, with the profit values of the resource elements aside from the resource element determined by the succession resource element determination means being set to equal 0.

15. The resource assignment apparatus of claim 14, further comprising:

secondary interfering assignment extraction means for retrieving assignments which have live ranges which interfere with the live ranges of the assignments retrieved by the coherent assignment retrieval means, but are not the retrieved results of the interfering assignment extraction means; and first loss occurring resource element determination means for determining to which resource elements the assignments which are the retrieval results of the secondary interfering assignment retrieval means are assigned, by referring to the assigning result storage means, wherein the loss value calculation means calculates loss values of the resource elements determined by the first loss occurring resource element determination means based on the execution frequencies of each of the assignments determined by the coherent assignment determination means and whose live range interferes with the live range of the assignment which is assigned to each of the resource elements, with the loss values of all of the resource elements aside from the resource element determined by the loss occurring resource element determination means being set at 0.

16. A resource assignment apparatus used by a compiler which compiles programs written in a high-level language into programs written in machine language for assigning assignments which are a pairing of variables and live ranges in a program to separate resource elements which make up resources, divided up according to function, such as registers and memory, according to a priority value of the assignment, comprising:

assignment storage means for storing the assignments in a program and their priority values;

first resource element assigning means for taking an assignment with a highest priority value from the assignment storage means and assigning the assignment with the highest priority value to a resource element;

assigning result storage means for storing assigning results;

assignment retrieval means for retrieving from the assignment storage means an assignment which has a next highest priority value after a priority value of an assignment which has just been assigned;

interfering assignment extraction means for extracting assignments whose live ranges interfere with a live range of the assignment retrieved by the assignment retrieval means;

same resource remaining resource element determination means for determining whether there are any resource elements of resources which perform a same function as each of the resource elements to which the assignments extracted by the interfering assignment extraction means have been assigned by referring to the assigning result storage means;

coherent assignment retrieval means for retrieving the assignments for which, by referring to the starting point and end point of the live range, a starting point is coincident with the end point of the assignment retrieved by the assignment retrieval means and assignments for which an end point is coincident with the starting point of the assignment retrieved by the assignment retrieval means;

succession resource element determination means for determining the resource element to which the assignments retrieved by the coherent assignment retrieval means are assigned, by referring to the assigning result storage means;

second resource element assigning means for assigning, when there is only one resource element determined by the same resource remaining element determination means, the assignment retrieved by the assignment retrieval means to the resource element, for assigning the assignment taken by the assignment retrieval means to any resource element which is the determination result of the same resource remaining resource element determination means and, moreover, the determination result of the succession resource element determination means, when there is a plurality of resource elements determined by the same resource remaining resource element determination means and a resource element determined by the succession resource element determination means exists, and for storing the assigning result in the assigning result storage means, the second resource element assigning means comprising:

first assigning means for assigning, when there is only one resource element determined by the same resource remaining resource element determination means, the assignment taken by the assignment retrieval means to the resource element;

second assigning means for assigning the assignment taken by the assignment retrieval means to any of the resource elements determined by the same resource remaining resource element determination means when there is a plurality of resource elements determined by the same resource remaining resource element determination means and there is no corresponding resource element determined by the succession resource element determination means; and third assigning means for assigning the assignment taken by the assignment retrieval means to any of the resource elements determined as the determination result of the same resource remaining resource element determination means and, moreover, determined as the determination result of the succession resource element determination means, when there is a plurality of resource elements determined by the same resource remaining resource element determination means and a resource element determined by the succession resource element determination means exists;

control means for repeatedly having the assignment retrieval means activated, until all of the assignments have been assigned;

profit value calculation means for calculating a profit value which shows how memory size and/or execution time are reduced for a machine language program after compiling if an assignment is assigned to one of the resource elements determined by the same resource remaining resource element determination means, for each of the resource elements determined by the same resource remaining resource element determination means;

loss value calculation means for calculating a loss value which shows how memory size and/or execution time are increased for a machine language program after compiling if an assignment is assigned to one of the resource elements determined by the same resource remaining resource element determination means, for each of the resource elements determined by the same resource remaining resource element determination means.;

greatest difference resource element determination means for calculating a difference between the profit value and the loss value and determining which resource elements have a greatest difference;

wherein the third assigning means assigns the assignments retrieved by the assignment retrieval means to one of the resource elements determined by the greatest difference resource element determination means;

global group creation means for retrieving a plurality of assignments whose live ranges are connected one after another, out of the assignments stored in the assignment storage means, and setting the retrieved assignments as a global group;

global group retrieval means for retrieving a global group which contains the assignment retrieved by the assignment retrieval means, when there are a plurality of resource elements determined by the greatest resource element determination means; and global profit value calculation means for calculating a global profit value which shows how memory size and/or execution time are reduced if an as yet unassigned assignment is assigned to a common resource element, for each of the resource elements determined by the same resource remaining resource element determination means; and global loss calculation means for calculating a global loss value which shows how memory size and/or execution time are increased if an as yet unassigned assignment is assigned to a common resource element, for each of the resource elements determined by the same resource remaining resource element determination means;

wherein for a case when a plurality of resource elements are determined by the greatest difference resource element determination means, the third assigning means calculates a difference between the global profit value and the global loss value, and then assigns the taken assignment to a resource element for which the difference is greatest.

17. The resource assignment apparatus of claim 16, wherein the global profit value calculation means comprises:

a first global group retrieval unit for retrieving, once the assignment retrieval means has retrieved an assignment, a global group to which the retrieved assignment belongs;

a global profit value storage unit for storing a total of the profit values for every resource element corresponding to a global group as the global profit value; and a first total value managing unit for adding, once the profit value calculation means has calculated the profit value of a resource element for the assignment, the profit value to the global profit value of the resource element.

18. The resource assignment apparatus of claim 17, wherein the global loss calculation means comprises:

an interfering global group retrieval unit for retrieving, once the assignment retrieval means has retrieved an assignment, global groups which contain the assignments which are the retrieval results of the interfering assignment retrieval means in regard to the taken assignment;

a second total storage unit for storing the total of the priority values of the assignments belonging to the global group as the global loss value corresponding to every resource element; and a second total managing unit for adding, once the profit value calculation means has calculated the profit value of the resource element for the assignment retrieved by the assignment retrieval means, the priority value of assignment for the resource element which is the retrieval result of the interfering assignment retrieval means to the total of the global loss value for the resource element.

19. The resource assignment apparatus of claim 16, wherein the global profit value calculation means comprise:

a first global group retrieval unit for retrieving, once the assignment retrieval means has retrieved an assignment, the global group to which the assignment belongs;

a first total storage unit for storing the number of assignments in a global group assigned to a resource element as the global profit value corresponding to each of the resource elements; and a first total managing unit for adding, once the profit value calculation means has calculated the profit value of a resource element for an assignment, 1 to the global profit value of the resource element.

20. The resource assignment apparatus of claim 19, wherein the global loss value calculation means comprises:

an interfering global group retrieval unit for retrieving, once the assignment retrieval means has retrieved an assignment, the global groups which contain the assignments which are the retrieval result of the interfering assignment retrieval means in regard to the taken assignment;

a second total storage unit for storing a number of assignments assigned to resource elements belonging to a global group as the global loss value corresponding to every resource element; and a second total managing unit for adding 1 to the global loss value of the resource element, once the profit value calculation means has calculated the profit value of a resource element for an assignment retrieved by the assignment retrieval means.

21. The resource assignment apparatus of claim 18, wherein the profit value calculation means calculates the profit value for the resource element determined by the succession resource element determination means based on the priority values of the assignments assigned to the resource element, with the profit values of the resource elements aside from the resource element determined by the succession resource element determination means being set to equal 0.

22. The resource assignment apparatus of claim 21, further comprising:

secondary interfering assignment retrieval means for retrieving assignments which have live ranges which interfere with the live ranges of the assignments retrieved by the coherent assignment retrieval means, but are not the retrieved results of the interfering assignment retrieval means; and first loss occurring resource element determination means for determining to which resource elements the assignments which are the retrieval results of the secondary interfering assignment retrieval means are assigned, by referring to the assigning result storage means;

wherein the loss value calculation means calculates loss values of the resource elements determined by the first loss occurring resource element determination means based on the priority values of each of the assignments determined by the coherent assignment determination unit and, moreover, whose live range interferes with the live range of the assignment which is assigned to each of the resource elements, with the loss values of all of the resource elements aside from the resource element determined by the loss occurring resource element determination means being set at 0.

23. The resource assignment apparatus of claim 22, further comprising:

non-commutative operation definition determination means for determining whether the assignment taken by the assignment retrieval means is defined by a non-commutative operation such as subtraction and division; and second loss occurring resource element retrieval means for retrieving, when the non-commutative operation definition determination means determines that the assignment is defined as a non-commutative operation, a resource element to which an assignment which is on a right side of an operator of the non-commutative operation is assigned;

wherein, once the second loss occurring resource element retrieval means has retrieved the resource element, the loss calculation means adds the priority values of the assignments which are assigned to the resource element to the loss value and the global loss value of the resource element which is the determination result of the second loss occurring resource element retrieval means.

24. The resource assignment apparatus of claim 23, further comprising:

non-commutative operation operand determination means for determining whether the assignment taken by the assignment retrieval means is on a right side of an operator of a non-commutative operation such as subtraction and division; and third loss occurring resource element retrieval means for retrieving a resource element to which the assignment defined by the non-commutative operation is defined, once the non-commutative operation operand determination means has determined that the assignment is on the right side;

wherein, once the third loss occurring resource element retrieval means has retrieved the resource element, the loss calculation means adds the priority values of the assignments which are assigned to the resource element to the loss value and global loss value of the resource element which is the retrieved result of the third loss occurring resource element retrieval means.

25. The resource assignment apparatus of claim 18, further comprising:

loop-nesting depth level retrieval means for retrieving a loop-nesting depth level of each of the loops in the program;

wherein the profit value calculation means calculates the profit value for the resource element determined by the succession resource element determination means based on the loop-nesting depth levels of the assignments assigned to the resource element, with the profit values of the resource elements aside from the resource element determined by the succession resource element determination means being set to equal 0.

26. The resource assignment apparatus of claim 25, further comprising:

secondary interfering assignment extraction means for retrieving assignments which have live ranges which interfere with the live ranges of the assignments retrieved by the coherent assignment retrieval means, but are not the retrieved results of the interfering assignment extraction means; and first loss occurring resource element determination means for determining to which resource elements the assignments which are the retrieval results of the secondary interfering assignment retrieval means are assigned, by referring to the assigning result storage means;

wherein the loss value calculation means calculates loss values of the resource elements determined by the first loss occurring resource element determination means based on the loop-nesting depth levels of each of the assignments determined by the coherent assignment determination unit and, moreover, whose live range interferes with the live range of the assignment which are assigned to the resource element, with the loss values of all of the resource elements aside from the resource element determined by the loss occurring resource element determination means being set at 0.

27. The resource assignment apparatus of claim 26, further comprising:

non-commutative operation definition determination means for determining whether the assignment taken by the assignment retrieval means is defined by a non-commutative operation such as subtraction and division; and second loss occurring resource element retrieval means for retrieving, when the non-commutative operation definition determination means determines that the assignment is defined as a non-commutative operation, a resource element to which an assignment which is on a right side of an operator of the non-commutative operation is assigned;

wherein, once the second loss occurring resource element retrieval means has retrieved the resource element, the loss calculation means adds the loop-nesting depth levels of the assignments which are assigned to the resource elements to the loss value of the resource element which is the determination result of the second loss occurring resource element retrieval means.

28. The resource assignment apparatus of claim 27, further comprising:

non-commutative operation operand determination means for determining whether the assignment taken by the assignment retrieval means is on a right side of an operator of a non-commutative operation such as subtraction and division; and third loss occurring resource element retrieval means for retrieving a resource element to which the assignment defined by the non-commutative operation is assigned, once the non-commutative operation operand determination means has determined that the assignment is on the right side;

wherein, once the third loss occurring resource element retrieval means has retrieved the resource element, the loss calculation means adds the loop-nesting depth levels of the assignments which are assigned to the resource element to the loss value of the resource element which is the retrieved result of the third loss occurring resource element retrieval means.

29. A resource assignment apparatus used by a compiler which compiles programs written in a high-level language into programs written in machine language for assigning assignments which are a pairing of variables and live ranges in a program written in programming language to separate resource elements which make up resources, divided up according to function, such as registers and memory, according to a priority value of the assignment, comprising:

cost storage means for storing for every resource a cost which shows code size and/or execution time of every instruction used by the resource;

cost retrieval means for retrieving the cost for every resource by referring to the cost storage means, for each of the instructions in a program which are used in the live range of a variable in one assignment;

cost totalling means for totalling the costs retrieved by the cost retrieval means of each of the assignments for each resource;

priority value calculation means for calculating the priority value based on the cost total value calculated for each of the assignments and the live ranges of the various assignments;

assignment storage means for storing the assignments in a program and their priority values;

first resource element assigning means for taking an assignment with a highest priority value from the assignment storage means and assigning the assignment with the highest priority value to a resource element;

assigning result storage means for storing assigning results;

assignment retrieval means for retrieving from the assignment storage means an assignment which has a next highest priority value after a priority value of an assignment which has just been assigned;

interfering assignment extraction means for extracting assignments whose live ranges interfere with a live range of the assignment retrieved by the assignment retrieval means;

same resource remaining resource element determination means for determining whether there are any resource elements of resources which perform the same function as each of the resource elements to which the assignment extracted by the interfering assignment extraction means has been assigned by referring to the assigning result storage means;

coherent assignment retrieval means for retrieving the assignments for which, by referring to the starting point and end point of the live range, a starting point is coincident with the end point of the assignment taken by the assignment retrieval means and assignments for which an end point is coincident with the same starting point of the assignment taken by the assignment retrieval means;

succession resource element determination means for determining the resource elements to which the assignments retrieved by the coherent assignment retrieval means are assigned, by referring to the assigning result storage means;

second resource element assigning means for assigning, when there is only one resource element determined by the same resource remaining element determination means, the assignment retrieved by the assignment retrieval means to the resource element, for assigning the assignment taken by the assignment retrieval means to any resource element which is the determination result of the succession resource element determination means and, moreover, the determination result of the same resource remaining resource element determination means, when there is a plurality of resource elements determined by the same resource remaining resource element determination means and a resource element determined by the succession resource element determination means exists, and for storing the assigning result in the assigning result storage means; and control means for repeatedly having the assignment retrieval means activated, until all of the assignments have been assigned.

30. A resource assignment apparatus used by a compiler which compiles programs written in a high-level language into programs written in machine language for assigning assignments which are a pairing of variables and live ranges in a program written in programming language to separate resource elements which make up resources, divided up according to function, such as registers and memory, according to a priority value of the assignment, comprising:

cost storage means for storing for every resource a cost which shows code size and/or execution time of every instruction used by the resource;

cost retrieval means for retrieving the cost for every resource by referring to the cost storage means, for each of the instructions in a program which are used in the live range of a variable in one assignment;

cost totalling means for totalling the costs retrieved by the cost retrieval means of each of the assignments for each resource;

priority value calculation means for calculating the priority value based on the cost total value calculated for each of the assignments and the live ranges of the various assignments;

assignment storage means for storing the assignments in a program and their priority values;

first resource element assigning means for taking an assignment with a highest priority value from the assignment storage means and assigning the assignment with the highest priority value to a resource element;

assigning result storage means for storing assigning results;

assignment retrieval means for retrieving from the assignment storage means an assignment which has a next highest priority value after a priority value of an assignment which has just been assigned;

interfering assignment extraction means for extracting assignments whose live ranges interfere with a live range of the assignment retrieved by the assignment retrieval means;

same resource remaining resource element determination means for determining whether there are any resource elements of resources which perform the same function as each of the resource elements to which the assignment extracted by the interfering assignment extraction means has been assigned by referring to the assigning result storage means;

coherent assignment retrieval means for retrieving the assignments for which, by referring to the starting point and end point of the live range, a starting point is coincident with the end point of the assignment taken by the assignment retrieval means and assignments for which an end point is coincident with the same starting point of the assignment taken by the assignment retrieval means;

succession resource element determination means for determining the resource elements to which the assignments retrieved by the coherent assignment retrieval means are assigned, by referring to the assigning result storage means;

second resource element assigning means for assigning, when there is only one resource element determined by the same resource remaining element determination means, the assignment retrieved by the assignment retrieval means to the resource element, for assigning the assignment taken by the assignment retrieval means to any resource element which is the determination result of the succession resource element determination means and, moreover, the determination result of the same resource remaining resource element determination means, when there is a plurality of resource elements determined by the same resource remaining resource element determination means and a resource element determined by the succession resource element determination means exists, and for storing the assigning result in the assigning result storage means;

control means for repeatedly having the assignment retrieval means activated, until all of the assignments have been assigned; and resource classified assignment supply means for supplying all of the assignments which can be assigned to the same resource to the assignment storage means, wherein the resource classified assignment supply means comprises:

resource determination means for determining which resource has a lowest total cost, out of the totalled costs for the various assignments calculated by the cost totalling means;

resource classified group conversion means for referring to the various assignments and the resources which correspond to the assignments determined by the resource determination means and converting into groups the assignments obtained as having the same determination results to form resource classified groups;

resource classified group selection means for selecting one group out of the several resource classified groups formed by the resource classified group conversion means;

resource classified group writing means for writing the resource classified group selected by the resource classified group selection means into the assignment storage means; and control means for indicating a selection of a next resource classified group, when all the assignments stored in the assignment storage means have been taken by the assignment retrieval means.

31. The resource assignment apparatus of claim 30, further comprising:

resource classified group cost totalling means for totalling the total cost values of the assignments found by the cost totalling means for each of the resource classified groups formed by the resource classified group conversion means;

wherein the resource classified group selection means selects a resource classified group with a highest total cost totalled by the group cost totalling means, out of as yet unselected resource classified groups.

32. The resource assignment apparatus of claim 31, wherein the same resource remaining resource element determination means further comprises:

first resource classified group determination means for determining the resource classified group to which the assignment retrieved by the assignment retrieval means belongs;

second resource classified group determination means for determining, when all of the resource elements of the resource corresponding to the resource classified group have been assigned assignments retrieved by the interfering assignment retrieval means, the resource classified group for an assignment with a higher cost value total for the assignment than the first determined resource but, moreover, with a lowest total cost value; and first transference means for transferring, once the second resource classified group determination means has determined a resource classified group, an assignment retrieved by the assignment retrieval means from the resource classified group determined by the first resource classified group determination means to the resource classified group determined by the second resource classified group determination means.

33. The resource assignment apparatus of claim 32, wherein the cost totalling means further comprises:

loop-nesting depth level retrieval means for retrieving the loop-nesting depth level of the loop processes for the various instructions using the variable in one assignment;

wherein the cost totalling means adds the loop-nesting depth level to the cost retrieved by the cost retrieval means.

34. The resource assignment apparatus of claim 30, further comprising:

group element count retrieval means for retrieving a number of the assignments belonging to one resource classified group;

wherein the resource classified group selection means selects the resource classified group with a highest number of assignments retrieved by the group element count retrieval means, out of the as yet unselected resource classified groups.

35. The resource assignment apparatus of claim 34, wherein the same resource remaining resource element determination means further comprises:

first resource classified group determination means for determining the resource classified group to which the assignment retrieved by the resource retrieval means belongs;

second resource classified group determination means for determining the resource classified group with a next highest number of assignments, when all of the resource elements of the resource corresponding to the resource classified group which is the determination result of the first resource classified group determination means have been assigned assignments retrieved by the interfering assignment retrieval means; and a first transference means for transferring, once the second resource classified group determination means has determined a resource classified group, an assignment retrieved by the assignment retrieval means from the resource classified group determined by the first resource classified group determination means to the resource classified group determined by the second resource classified group determination means.

36. The resource assignment apparatus of claim 30, further comprising:

resource element number retrieval means for retrieving a number of resource elements in a resource corresponding to a resource classified group;

wherein the resource classified group selection means selects the resource classified groups in order of the number of resource elements retrieved by the resource element number retrieval means starting with a lowest number.

37. The resource assignment apparatus of claim 36, wherein the same resource remaining resource element determination means further comprises:

first resource classified group determination means for determining the resource classified group to which an assignment retrieved by the assignment retrieval means belongs;

second resource classified group determination means for determining the resource classified group with a next lowest number of resource elements, when all of the resource elements of the resource corresponding to a resource classified group have been assigned assignments retrieved by the interfering assignment retrieval means; and a first transference means for transferring, once the second resource classified group determination means has determined a resource classified group, an assignment retrieved by the assignment retrieval means from the resource classified group determined by the first resource classified group determination means to the resource classified group determined by the second resource classified group determination means.

38. The resource assignment apparatus of claim 29, further comprising:

resource element number determination means for referring to the assigning result storage means and finding a number of resource elements which have already been assigned, out of the retrieval result of the interfering assignment retrieval means in regard to the assignment retrieved by the assignment retrieval means, wherein the priority value calculation means recalculates the priority value of the assignments stored by the assignment storage means, based on the determination results of the resource element number determination means.

39. The resource assignment apparatus of claim 29, further comprising:

resource element number determination means for referring to the assigning result storage means and finding a number of resource elements which have already been assigned, out of the retrieval results of the coherent assignment retrieval means in regard to the assignment extracted by the assignment extraction means, wherein the priority value calculation means recalculates the priority value of the assignments stored by the assignment storage means, based on the determination results of the resource element number determination means.

40. A resource assignment apparatus used by a compiler which compiles programs written in a high-level language into programs written in machine language for assigning assignments which are a pairing of variables and live ranges in a program written in programming language to resource elements which make up resources, divided up according to function, such as registers and memory, according to a priority value of the assignment, comprising:

reserved assignment extraction means for extracting assignments in the program which should be assigned to a previously determined resource element;

reserved resource element storage means for storing the resource elements to which the assignments extracted by the reserved assignment extraction means should be assigned;

reserved assigning means for assigning the assignments extracted by the reserved assignment extraction means to the corresponding resource elements out of the resource elements stored by the reserved resource element storage means, and having the assigning results stored by the assigning result storage means;

assignment storage means for storing the assignments in a program and their priority values;

first resource element assigning means for taking an assignment with a highest priority value from the assignment storage means and assigning an assignment with the highest priority value to a resource element;

assigning result storage means for storing assigning results;

assignment retrieval means for retrieving from the assignment storage means an assignment which has a next highest priority value after a priority value of an assignment which has just been assigned;

interfering assignment extraction means for extracting assignments whose live ranges interfere with a live range of the assignment retrieved by the assignment retrieval means;

same resource remaining resource element determination means for determining whether there are any resource elements of resources which perform a same function as each of the resource elements to which the assignments extracted by the interfering assignment extraction means have been assigned by referring to the assigning result storage means;

coherent assignment retrieval means for retrieving the assignments for which, by referring to the starting point and end point of the live range, a starting point is coincident with the end point of the assignment taken by the assignment retrieval means and assignments for which an end point is coincident with the starting point of the assignment taken by the assignment retrieval means;

succession resource element determination means for determining the resource elements to which the assignments retrieved by the coherent assignment retrieval means can be assigned, by referring to the assigning result storage means;

second resource element assigning means for assigning, when there is only one resource element determined by the same resource remaining element determination means, the assignment retrieved by the assignment retrieval means to the resource element, for assigning the assignment taken by the assignment retrieval means to any resource element which is the determination result of the same resource remaining resource element determination means and, moreover, the determination result of the succession resource element determination means, when there is a plurality of resource elements determined by the same resource remaining resource element determination means and a resource element determined by the succession resource element determination means exists, and for storing the assigning result in the assigning result storage means; and control means for repeatedly having the assignment retrieval means activated, until all of the assignments have been assigned.

41. A resource assignment apparatus used by a compiler which compiles programs written in a high-level language into programs written in machine language for assigning assignments which are a pairing of variables and live ranges in a program written in programming language to resource elements which make up resources, divided up according to function, such as registers and memory, according to a priority value of the assignment, comprising:

reserved assignment extraction means for extracting assignments in the program which should be assigned to a previously determined resource element;

reserved resource element storage means for storing the resource elements to which the assignments extracted by the reserved assignment extraction means should be assigned;

reserved assigning means for assigning the assignments extracted by the reserved assignment extraction means to the corresponding resource elements out of the resource elements stored by the reserved resource element storage means, and having the assigning results stored by the assigning result storage means;

assignment storage means for storing the assignments in a program and their priority values;

first resource element assigning means for taking an assignment with a highest priority value from the assignment storage means and assigning an assignment with the highest priority value to a resource element;

assigning result storage means for storing assigning results;

assignment retrieval means for retrieving from the assignment storage means an assignment which has a next highest priority value after a priority value of an assignment which has just been assigned;

interfering assignment extraction means for extracting assignments whose live ranges interfere with a live range of the assignment retrieved by the assignment retrieval means;

same resource remaining resource element determination means for determining whether there are any resource elements of resources which perform a same function as each of the resource elements to which the assignments extracted by the interfering assignment extraction means have been assigned by referring to the assigning result storage means;

coherent assignment retrieval means for retrieving the assignments for which, by referring to the starting point and end point of the live range, a starting point is coincident with the end point of the assignment taken by the assignment retrieval means and assignments for which an end point is coincident with the starting point of the assignment taken by the assignment retrieval means;

succession resource element determination means for determining the resource elements to which the assignments retrieved by the coherent assignment retrieval means can be assigned, by referring to the assigning result storage means;

second resource element assigning means for assigning, when there is only one resource element determined by the same resource remaining element determination means the assignment retrieved by the assignment retrieval means to the resource element, for assigning the assignment taken by the assignment retrieval means to any resource element which is the determination result of the same resource remaining resource element determination means and, moreover, the determination result of the succession resource element determination means, when there is a plurality of resource elements determined by the same resource remaining resource element determination means and a resource element determined by the succession resource element determination means exists, and for storing the assigning result in the assigning result storage means; and control means for repeatedly having the assignment retrieval means activated, until all of the assignments have been assigned;

the second resource element assigning means comprising:

first assigning means for assigning, when there is only one resource element determined by the same resource remaining resource element determination means, the assignment taken by the assignment retrieval means to the resource element;

second assigning means for assigning the assignment taken by the assignment retrieval means to any of the resource elements determined by the same resource remaining resource element determination means when there is a plurality of resource elements determined by the same resource remaining resource element determination means and there is no corresponding resource element determined by the succession resource element determination means; and third assigning means for assigning the assignment taken by the assignment retrieval means to any of the resource elements determined as the determination result of the same resource remaining resource element determination means and, moreover, determined as the determination result of the succession resource element determination means, when there is a plurality of resource elements determined by the same resource remaining resource element determination means and a resource element determined by the succession resource element determination means exists.

42. The resource assignment apparatus of claim 41, further comprising:

profit value calculation means for calculating the profit value which shows how memory size and/or execution time are reduced for a machine language program after compiling if an assignment is assigned to one of the resource elements determined by the same resource remaining resource element determination means, for each of the resource elements determined by the same resource remaining resource element determination means;

loss value calculation means for calculating the loss value which shows how memory size and/or execution time are increased for a machine language program after compiling if an assignment is assigned to one of the resource elements determined by the same resource remaining resource element determination means, for each of the resource elements determined by the same resource remaining resource element determination means; and greatest difference resource element determination means for calculating a difference between the profit value and the loss value and determining which resource elements have a greatest difference;

wherein the third assigning means assigns the assignments retrieved by the assignment retrieval means to one of the resource elements determined by the greatest difference resource element determination means.

43. The resource assignment apparatus of claim 42, wherein the profit value calculation means calculates the profit value for the resource element determined by the succession resource element determination means based on the priority values of the assignments assigned to the resource element, with the profit values of the resource elements aside from the resource element determined by the succession resource element determination means being set to equal 0.

44. The resource assignment apparatus of claim 43, further comprising:

secondary interfering assignment extraction means for retrieving assignments which have live ranges which interfere with the live ranges of the assignments retrieved by the coherent assignment retrieval means, but are not the retrieved results of the interfering assignment extraction means; and first loss occurring resource element determination means for determining to which resource elements the assignments which are the retrieval results of the secondary interfering assignment retrieval means are assigned, by referring to the assigning result storage means;

wherein the loss value calculation means calculates loss values of the resource elements determined by the first loss occurring resource element determination means based on the priority values of the assignments determined by the coherent assignment determination means and, moreover, whose live range interferes with the live range of the assignment which is assigned to each of the resource elements, with the loss values of all of the resource elements aside from the resource element determined by the loss occurring resource element determination means being set at 0.

45. The resource assignment apparatus of claim 44, further comprising:

non-commutative operation definition determination means for determining whether the assignment taken by the assignment retrieval means is defined by a non-commutative operation such as subtraction and division; and second loss occurring resource element retrieval means for retrieving, when the non-commutative operation definition determination means determines that the assignment is defined as a non-commutative operation, a resource element to which an assignment which is on a right side of an operator of the non-commutative operation is assigned;

wherein, once the second loss occurring resource element retrieval means has retrieved the resource element, the loss calculation means adds the priority values of the assignments which is assigned to the resource element to the loss value of the resource element which is the determination result of the second loss occurring resource element retrieval means.

46. The resource assignment apparatus of claim 45, further comprising:

secondary interfering assignment extraction means for retrieving assignments which have live ranges which interfere with the live ranges of the assignments retrieved by the coherent assignment retrieval means, but are not the retrieved results of the interfering assignment extraction means; and first loss occurring resource element determination means for determining to which resource elements the assignments which are the retrieval results of the secondary interfering assignment retrieval means are assigned, by referring to the assigning result storage means;

wherein the loss value calculation means calculates loss values of the resource elements determined by the first loss occurring resource element determination means based on the execution frequencies of each of the assignments determined by the coherent assignment determination means and whose live range interferes with the live range of the assignment which is assigned to each of the resource elements, with the loss values of all of the resource elements aside from the resource element determined by the loss occurring resource element determination means being set at 0.

47. The resource assignment apparatus of claim 46, further comprising:

global group creation means for retrieving a plurality of assignments whose live ranges are connected one after another, out of the assignments stored in the assignment storage means, and setting the retrieved assignments as a global group;

global group retrieval means for retrieving a global group which contains the assignment retrieved by the assignment retrieval means, when there are a plurality of resource elements determined by the greatest resource element determination means;

global profit value calculation means for calculating a global profit value which shows how memory size and/or execution time are reduced if an as yet unassigned assignment is assigned to a common resource element, for each of the resource elements determined by the same resource remaining resource element determination means; and global loss calculation means for calculating a global loss value which shows how memory size and/or execution time are increased if an as yet unassigned assignment is assigned to a common resource element, for each of the resource elements determined by the same resource remaining resource element determination means;

wherein for a case when a plurality of resource elements are determined by the greatest difference resource element determination means, the third assigning means calculates a difference between the global profit value and the global loss value, and then assigns the taken assignment to a resource element for which the difference is greatest.

48. The resource assignment apparatus of claim 47, wherein the global profit value calculation means comprises:

a first global group retrieval unit for retrieving, once the assignment retrieval means has retrieved an assignment, a global group to which the retrieved assignment belongs;

a global profit value storage unit for storing a total of the profit values for every resource element corresponding to a global group as the global profit value; and a first total value managing unit for adding, once the profit value calculation means has calculated the profit value of a resource element for the assignment, the profit value to the global profit value of the resource element.

49. The resource assignment apparatus of claim 48, wherein the global loss calculation means comprises:

an interfering global group retrieval unit for retrieving, once the assignment retrieval means has retrieved an assignment, global groups which contain the assignments which are the retrieval results of the interfering assignment retrieval means in regard to the taken assignment;

a second total storage unit for storing the total of the priority values of the assignments belonging to the global group as the global loss value corresponding to every resource element; and a second total managing unit for adding, once the profit value calculation means has calculated the profit value of the resource element for the assignment retrieved by the assignment retrieval means, the priority value of assignment for the resource element which is the retrieval result of the interfering assignment retrieval means to the total of the global loss value for the resource element.

50. The resource assignment apparatus of claim 49, wherein the global profit value calculation means comprises:

a first global group retrieval unit for retrieving, once the assignment retrieval means has retrieved an assignment, the global group to which the assignment belongs;

a first total storage unit for storing the number of assignments in a global group assigned to a resource element as the global profit value corresponding to each of the resource elements; and a first total managing unit for adding, once the profit value calculation means has calculated the profit value of a resource element for an assignment, 1 to the global profit value of the resource element.

51. The resource assignment apparatus of claim 50, wherein the global loss value calculation means comprises:

an interfering global group retrieval unit for retrieving, once the assignment retrieval means has retrieved an assignment, the global groups which contain the assignments which are the retrieval result of the interfering assignment retrieval means in regard to the taken assignment;

a second total storage unit for storing a number of assignments assigned to resource elements belonging to a global group as the global loss value corresponding to every resource element; and a second total managing unit for adding 1 to the global loss value of the resource element, once the profit value calculation means has calculated the profit value of a resource element for an assignment retrieved by the assignment retrieval means.

52. The resource assignment apparatus of claim 51, wherein the profit value calculation means calculates the profit value for the resource element determined by the succession resource element determination means based on the priority values of the assignments assigned to the resource element, with the profit values of the resource elements aside from the resource element determined by the succession resource element determination means being set to equal 0.

53. The resource assignment apparatus of claim 52, further comprising:

secondary interfering assignment retrieval means for retrieving assignments which have live ranges which interfere with the live ranges of the assignments retrieved by the coherent assignment retrieval means, but are not the retrieved results of the interfering assignment retrieval means; and first loss occurring resource element determination means for determining to which resource elements the assignments which are the retrieval results of the secondary interfering assignment retrieval means are assigned, by referring to the assigning result storage means;

wherein the loss value calculation means calculates loss values of the resource elements determined by the first loss occurring resource element determination means based on the priority values of each of the assignments determined by the coherent assignment determination unit and, moreover, whose live range interferes with the live range of the assignment which is assigned to each of the resource elements, with the loss values of all of the resource elements aside from the resource element determined by the loss occurring resource element determination means being set at 0.

54. The resource assignment apparatus of claim 53, further comprising:

non-commutative operation definition determination means for determining whether the assignment taken by the assignment retrieval means is defined by a non-commutative operation such as subtraction and division; and second loss occurring resource element retrieval means for retrieving, when the non-commutative operation definition determination means determines that the assignment is defined as a non-commutative operation, a resource element to which an assignment which is on a right side of an operator of the non-commutative operation is assigned;

wherein, once the second loss occurring resource element retrieval means has retrieved the resource element, the loss calculation means adds the priority values of the assignments which are assigned to the resource element to the loss value and the global loss value of the resource element which is the determination result of the second loss occurring resource element retrieval means.

55. The resource assignment apparatus of claim 54, further comprising:

non-commutative operation operand determination means for determining whether the assignment taken by the assignment retrieval means is on a right side of an operator of a non-commutative operation such as subtraction and division; and third loss occurring resource element retrieval means for retrieving a resource element to which the assignment defined by the non-commutative operation is defined, once the non-commutative operation operand determination means has determined that the assignment is on the right side;

wherein, once the third loss occurring resource element retrieval means has retrieved the resource element, the loss calculation means adds the priority values of the assignments which are assigned to the resource element to the loss value and global loss value of the resource element which is the retrieved result of the third loss occurring resource element retrieval means.

56. The resource assignment apparatus of claim 55, wherein the reserved assignment extraction means extracts assignments which store arguments for function calls from the program, and the reserved resource element storage means stores argument registers to which the assignments should be assigned.

57. The resource assignment apparatus of claim 55 wherein the reserved assignment extraction means extracts assignments which store return values for function calls from the program, and the reserved resource element storage means stores return value registers to which the assignments should be assigned.

58. The resource assignment apparatus of claim 55 wherein the reserved assignment extraction means extracts the assignments whose values may be changed from the program, and the reserved resource element storage means stores broken registers to which the assignments should be assigned.

* * * * *